US012502418B2

(12) United States Patent
Qin et al.

(10) Patent No.: US 12,502,418 B2
(45) Date of Patent: Dec. 23, 2025

(54) METHOD FOR TREATING MUSCULAR DYSTROPHY BY TARGETING LAMA1 GENE

(71) Applicant: Modalis Therapeutics Corporation, Chuo-ku (JP)

(72) Inventors: Yuanbo Qin, Waltham, MA (US); Tetsuya Yamagata, Waltham, MA (US)

(73) Assignee: Modalis Therapeutics Corporation, Chuo-ku (JP)

( * ) Notice: Subject to any disclaimer, the term of this patent is extended or adjusted under 35 U.S.C. 154(b) by 791 days.

(21) Appl. No.: 17/635,608

(22) PCT Filed: Aug. 14, 2020

(86) PCT No.: PCT/JP2020/030864
§ 371 (c)(1),
(2) Date: Feb. 15, 2022

(87) PCT Pub. No.: WO2021/033635
PCT Pub. Date: Feb. 25, 2021

(65) Prior Publication Data
US 2023/0173036 A1  Jun. 8, 2023

Related U.S. Application Data

(60) Provisional application No. 63/008,059, filed on Apr. 10, 2020, provisional application No. 62/887,863, filed on Aug. 16, 2019.

(51) Int. Cl.
| | | |
|---|---|---|
| *A61P 21/00* | (2006.01) | |
| *A61K 31/7088* | (2006.01) | |
| *A61K 38/46* | (2006.01) | |
| *A61K 48/00* | (2006.01) | |
| *C12N 9/22* | (2006.01) | |
| *C12N 15/11* | (2006.01) | |
| *C12N 15/86* | (2006.01) | |

(52) U.S. Cl.
CPC ........ *A61K 38/465* (2013.01); *A61K 31/7088* (2013.01); *A61K 48/0058* (2013.01); *A61P 21/00* (2018.01); *C12N 9/22* (2013.01); *C12N 15/11* (2013.01); *C12N 15/86* (2013.01); *C12N 2310/20* (2017.05); *C12N 2740/15043* (2013.01); *C12N 2740/15071* (2013.01); *C12N 2800/80* (2013.01)

(58) Field of Classification Search
CPC ...................................................... A61P 21/00
See application file for complete search history.

(56) References Cited

PUBLICATIONS

Kemaladewi et al. Development of therapeutic genome engineering in laminin-α2-deficient congenital muscular dystrophy. Emerging Topics in Life Sciences 3: 11-18. (Year: 2019).*
Kemaladewi, D. U. et al., "A mutation-independent approach for muscular dystrophy via upregulation of a modifier gene", Aug. 1, 2019, Nature, vol. 572, No. 7767, pp. 125-130, total 21 pages, XP036848585.
Perrin, A. et al., "Increased Expression of Laminin Subunit Alpha 1 Chain by dCas9-VP160", 2016, Molecular Therapy Nucleic Acids, vol. 6, pp. 68-79, XP055742450.
Prabhpreet, S. B., "Assessing the Therapeutic Potential of CRISPR/Cas9-Mediated Gene Modulation in Merosin-Deficient Congenital Muscular Dystrophy Type 1A", 2017, pp. 1-76, URL: http://hdl.handle.net/1807/79294, XP055742489.
Gilbert, L.A. et al., "Genome-Scale CRISPR-Mediated Control of Gene Repression and Activation", Oct. 23, 2014, Cell, vol. 159, No. 3, pp. 647-661, XP055247644.
Konermann, S. et al., "Genome-scale transcriptional activation by an engineered CRISPR-Cas9 complex", Jan. 29, 2015, Nature, vol. 517, No. 7536, pp. 583-588, total 19 pages, XP055585957.
International Search Report mailed on Oct. 30, 2020 in PCT/JP2020/030864 filed on Aug. 14, 2020 (2 pages).

* cited by examiner

*Primary Examiner* — James D Schultz
*Assistant Examiner* — Keenan A Bates
(74) *Attorney, Agent, or Firm* — Oblon, McClelland, Maier & Neustadt, L.L.P.

(57) ABSTRACT

The present invention aims to provide a novel therapeutic approach to human muscular dystrophy (particularly MDC1A). The present invention provide a polynucleotide comprising the following base sequences: (a) a base sequence encoding a fusion protein of a nuclease-deficient CRISPR effector protein and a transcription activator, and (b) a base sequence encoding (i) a guide RNA targeting a continuous region set forth in SEQ ID NO: 15, 20, 25, 50, 56, or 61, (ii) a guide RNA targeting a continuous region set forth in SEQ ID NO: 124, or (iii) a guide RNA targeting a continuous region set forth in SEQ ID NO: 178, 193, or 195, in the expression regulatory region of human LAMA1 gene.

13 Claims, 12 Drawing Sheets
Specification includes a Sequence Listing.

[Fig. 7A]
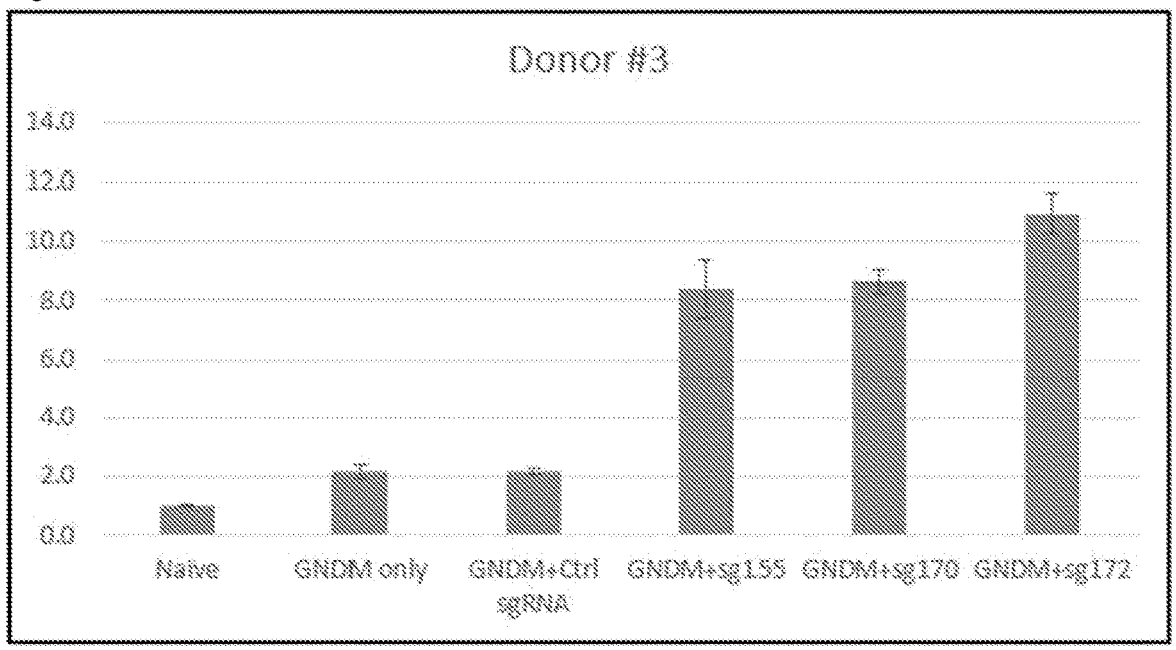
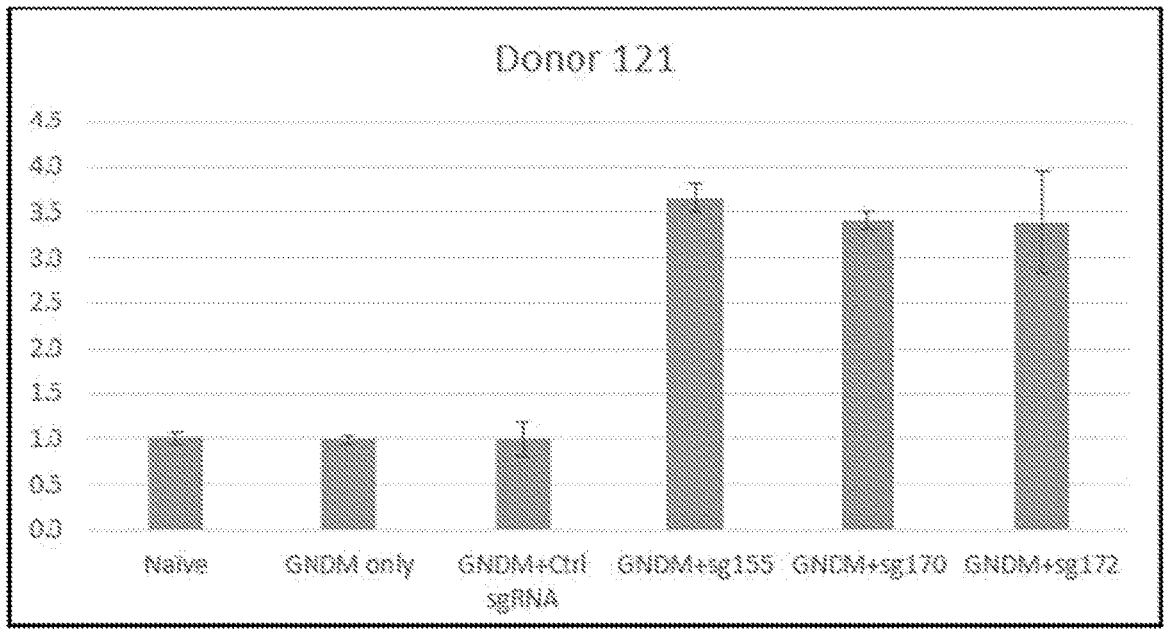

[Fig. 7B]
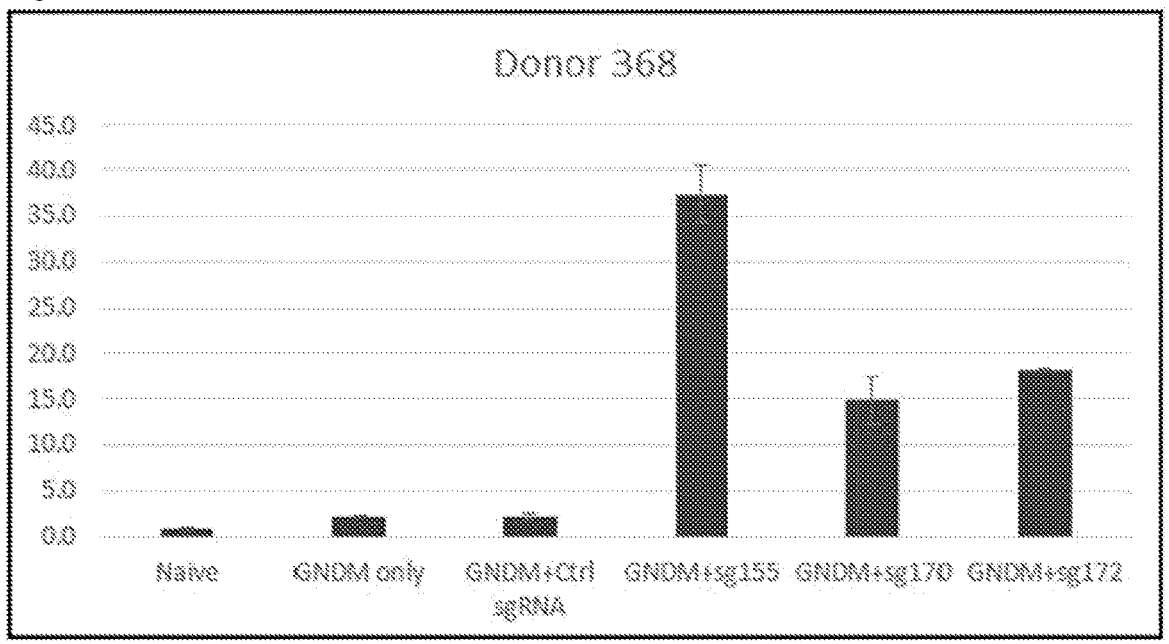
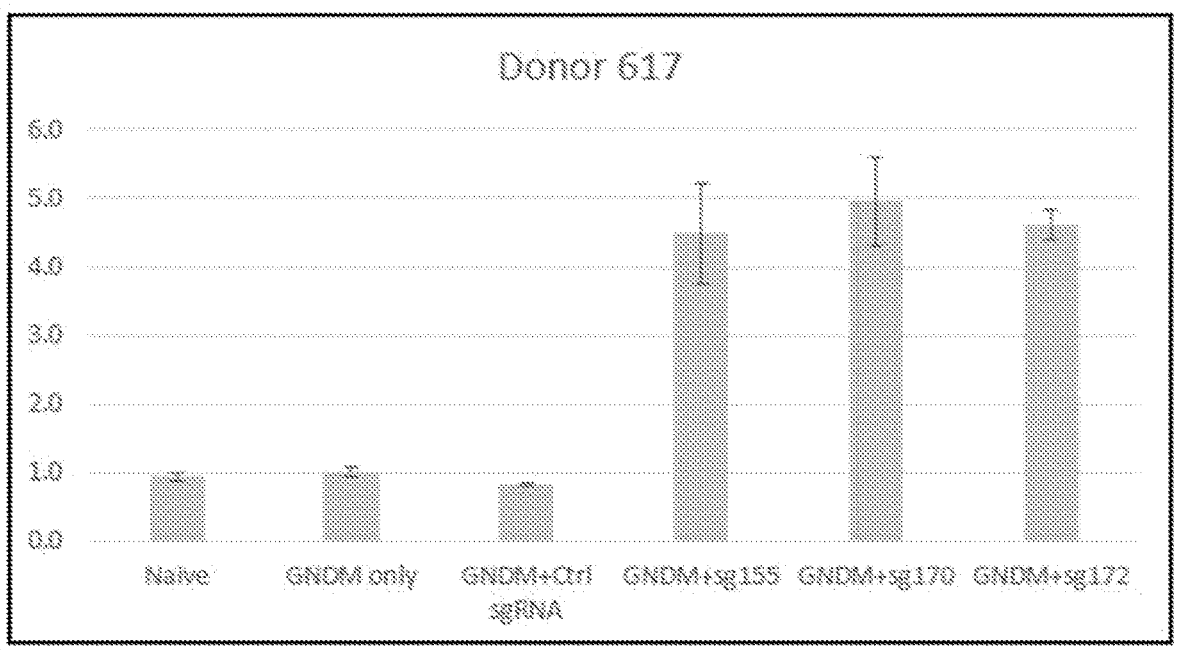

[Fig. 8]
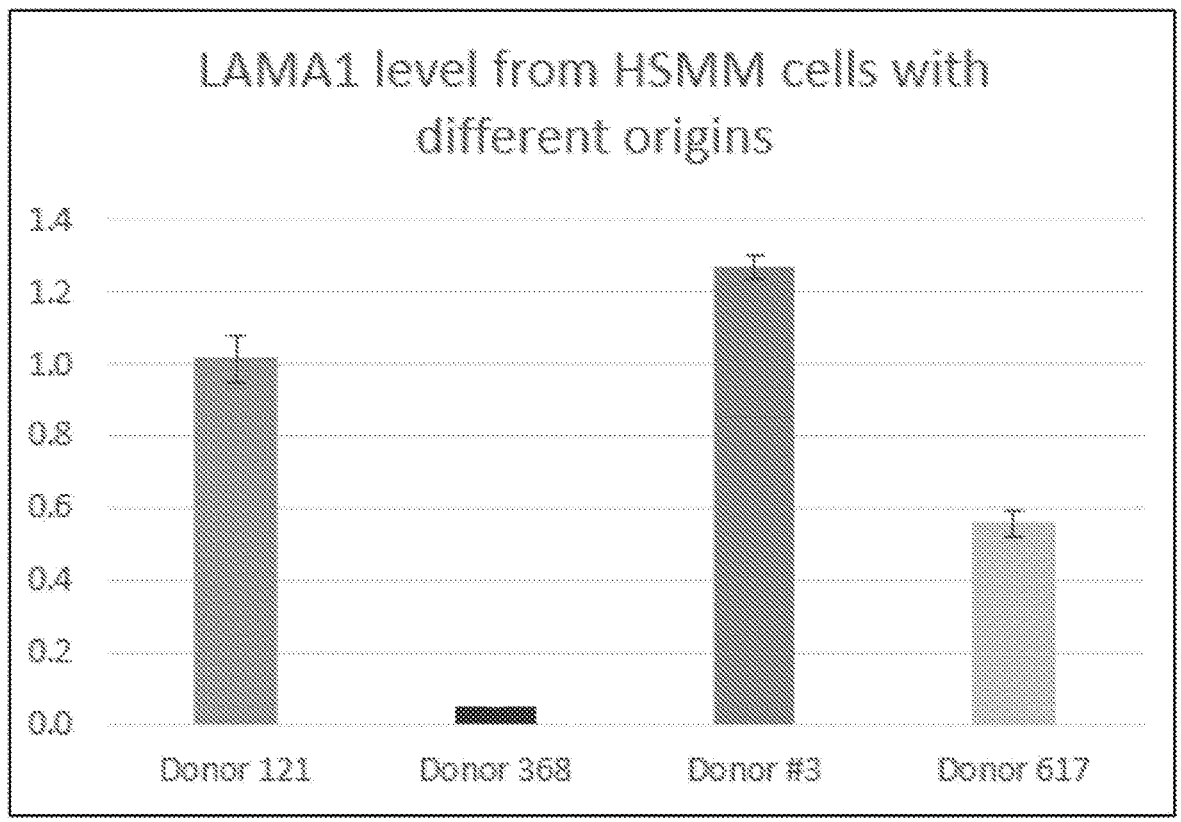

[Fig. 9]
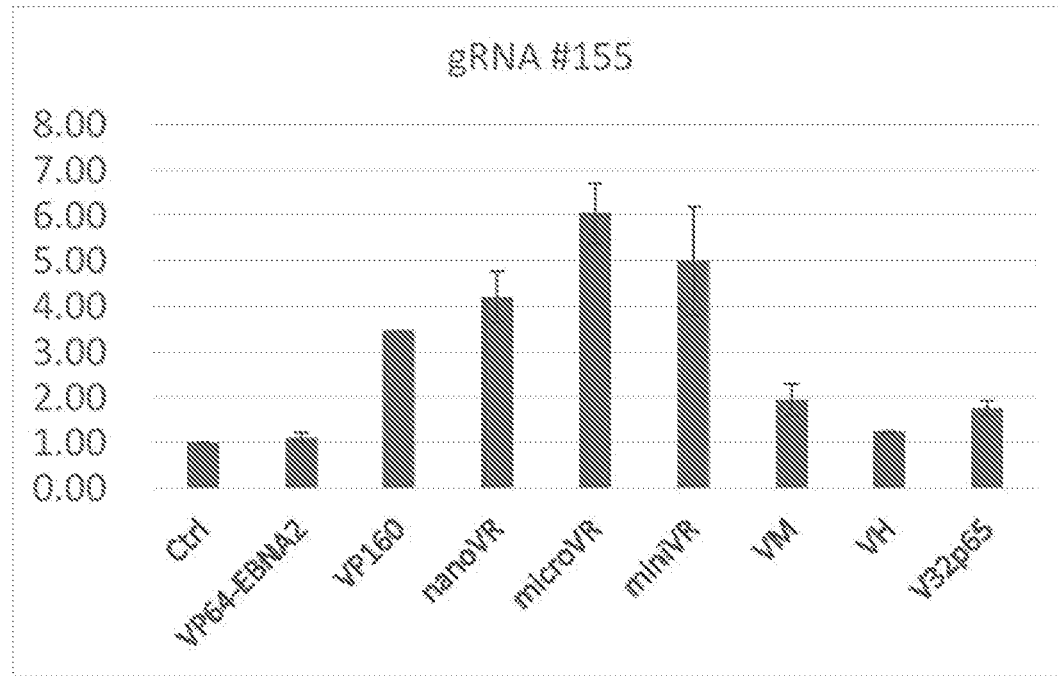
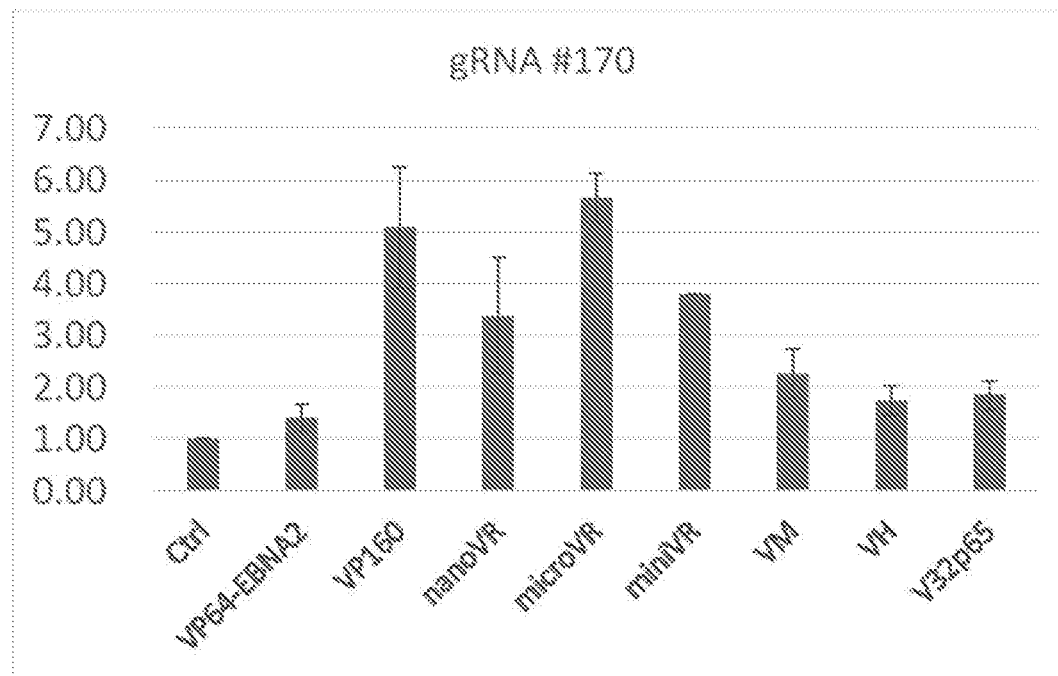

[Fig. 10]
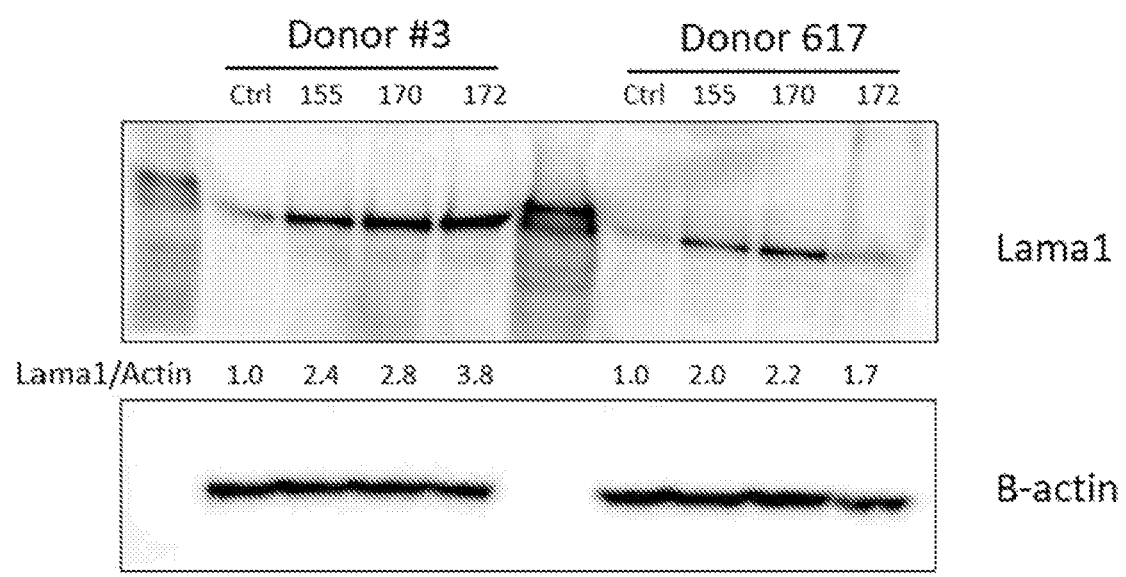

METHOD FOR TREATING MUSCULAR DYSTROPHY BY TARGETING LAMA1 GENE

TECHNICAL FIELD

The present invention relates to a method for treating muscular dystrophy, particularly Merosin-Deficient Congenital Muscular Dystrophy (MDC1A), by targeting a Laminin-α1 chain (LAMA1) gene and the like. More particularly, the present invention relates to a method for treating or preventing muscular dystrophy, the method including complementing LAMA2 or its function deleted by mutation by upregulating the expression of human LAMA1 gene, which is not inherently expressed in muscle tissues, by the use of guide RNA targeting a specific sequence of human LAMA1 gene, and a fusion protein of a transcription activator and a CRISPR effector protein, and an agent for treating or preventing muscular dystrophy and the like.

BACKGROUND ART

Muscular dystrophy is a generic term for a hereditary disease with progressive muscular atrophy and loss of muscle strength. At present, there is no effective fundamental therapeutic drug for muscular dystrophy, and only symptomatic treatment is given. As one type of muscular dystrophy, the autosomal recessive disease Merosin-Deficient Congenital Muscular Dystrophy (MDC1A) is known.

MDC1A is a congenital muscular dystrophy of the western type lacking mental retardation, and is caused by a deficiency of merosin in the skeletal muscle basement membrane component. Merosin is a heterotrimer composed of laminin chains and is bound to α-dystroglycan via a sugar chain structure. When it is deleted, the connection between the cytoskeleton and the extracellular matrix via the dystrophin glycoprotein complex is broken. It is the most frequent congenital muscular dystrophy in Europe and the United States (about 50%). It is caused by a mutation in the laminin α2 chain gene (LAMA2 gene) at 6q22.33.

Cohn et al. reported a method for correcting a splice site mutation that leads to mutation in the LAMA2 gene in MDC1A $dy^{2J}/dy^{2J}$ mouse model through systemic delivery of adeno-associated virus (AAV) with CRISPR/Cas9 genome editing component. The $dy^{2J}/dy^{2J}$ mouse after treatment showed substantial improvement in muscle histopathology and function with no signs of paralysis (NPL 1).

In addition, Bassi showed that the LAMA1 gene could be a disease modifying gene for MDC1A. LAMA1 gene encodes a laminin α1 chain protein that is structurally similar to laminin α2 chain. Specifically, experiments using mice have shown the possibility that the CRISPR/Cas9 system of *S. aureus* may be used to upregulate expression of LAMA1 and compensate for the lack of laminin α2 chain (NPL 2, NPL 3).

CITATION LIST

Non Patent Literature

[NPL 1] Kemaladewi, D. U., Maino, E., Hyatt, E., Hou, H., Ding, M., Place, K. M., Zhu, X., Bassi, P., Baghestani, Z., Deshwar, A. G., Merico, D., Xiong, H. Y., Frey, B. J., Wilson, M. D., Ivakine, E. A., Cohn, R. D. Nat Medicine. 23:8. 2017.

[NPL 2] Prabhpreet Singh Bassi, A thesis submitted in conformity with the requirements for the degree of Master of Science, Department of Molecular Genetics, University of Toronto. 2017: Assessing the Therapeutic Potential of CRISPR/Cas9-Mediated Gene Modulation in Merosin-Deficient Congenital Muscular Dystrophy Type 1A

[NPL 3] Dwi U. Kemaladewi, Prabhpreet S. Bassi, Steven erwood, Dhekra Al-Basha, Kinga I. Gawlik, Kyle Lindsay, elzbieta Hyatt, rebekah Kember, Kara M. Place, ryan M. Marks, Madeleine Durbeej, Steven A. Prescott, evgueni A. Ivakine & ronald D. Cohn, Nature 572, p 125, 2019: A mutation-independent approach for muscular dystrophy via upregulation of a modifier gene

SUMMARY OF INVENTION

Technical Problem

The present invention aims to provide a novel therapeutic approach to human muscular dystrophy (particularly MDC1A).

Solution to Problem

The present inventors have conducted intensive studies of the above-mentioned problem and found that the expression of human LAMA1 gene can be upregulated with myocytes by using guide RNA targeting a specific sequence of human LAMA1 gene (Gene ID: 284217), and a fusion protein of a transcription activator and a CRISPR effector protein lacking nuclease activity. The present inventors have completed the present invention based on these findings.

The present invention may include the following invention.

[1] A polynucleotide comprising the following base sequences:
  (a) a base sequence encoding a fusion protein of a nuclease-deficient CRISPR effector protein and a transcription activator, and
  (b) a base sequence encoding (i) a guide RNA targeting a continuous region set forth in SEQ ID NO: 15, 20, 25, 50, 56, or 61, (ii) a guide RNA targeting a continuous region set forth in SEQ ID NO: 124, or (iii) a guide RNA targeting a continuous region set forth in SEQ ID NO: 178, 193, or 195,
in the expression regulatory region of human LAMA1 gene.

[2] The polynucleotide of the above-mentioned [1], wherein the base sequence encoding the guide RNA comprises
  (i) the base sequence set forth in SEQ ID NO: 15, 20, 25, 50, 56, or 61,
  (ii) the base sequence set forth in SEQ ID NO: 124,
  (iii) the base sequence set forth in SEQ ID NO: 178, 193, or 195,
or said base sequence in which 1 to 3 bases are deleted, substituted, inserted, and/or added.

[3] The polynucleotide of the above-mentioned [1] or [2], wherein the transcription activator is selected from the group consisting of VP64, VP160, VPH, VPR, VP64-miniRTA (miniVR), and microVR, a variant thereof having transcription activation ability.

[4] The polynucleotide of the above-mentioned [3], wherein the transcription activator is miniVR.

[5] The polynucleotide of any of the above-mentioned [1] to [4], wherein the nuclease-deficient CRISPR effector protein is dCas9.

[6] The polynucleotide of the above-mentioned [5], wherein the dCas9 is derived from *Staphylococcus aureus*.

[7] The polynucleotide of any of the above-mentioned [1] to [6], further comprising a promoter sequence for the base sequence encoding the guide RNA and/or a promoter sequence for the base sequence encoding the fusion protein of the nuclease-deficient CRISPR effector protein and the transcription activator.

[8] The polynucleotide of the above-mentioned [7], wherein the promoter sequence for the base sequence encoding the guide RNA is selected from the group consisting of U6 promoter, SNR6 promoter, SNR52 promoter, SCR1 promoter, RPR1 promoter, U3 promoter, and H1 promoter.

[9] The polynucleotide of the above-mentioned [8], wherein the promoter sequence for the base sequence encoding the guide RNA is U6 promoter.

[10] The polynucleotide of any of the above-mentioned [7] to [9], wherein the promoter sequence for the base sequence encoding the fusion protein of the nuclease-deficient CRISPR effector protein and the transcription activator is ubiquitous promoter or muscle specific promoter.

[11] The polynucleotide of the above-mentioned [10], wherein the ubiquitous promoter is selected from the group consisting of EFS promoter, CMV promoter and CAG promoter.

[12] The polynucleotide of the above-mentioned [10], wherein the muscle specific promoter is selected from the group consisting of CK8 promoter, myosin heavy chain kinase (MHCK) promoter, muscle creatine kinase (MCK) promoter, synthetic C5-12(Syn) promoter and unc45b promoter.

[13] A vector comprising a polynucleotide of any of the above-mentioned [1] to [12].

[14] The vector of the above-mentioned [13], wherein the vector is a plasmid vector or a viral vector.

[15] The vector of the above-mentioned [14], wherein the viral vector is selected from the group consisting of adeno-associated virus (AAV) vector, adenovirus vector, and lentivirus vector.

[16] The vector of the above-mentioned [15], wherein the AAV vector is selected from the group consisting of AAV1, AAV2, AAV6, AAV7, AAV8, AAV9, and a variant thereof.

[17] An agent for treating or preventing MDC1A, comprising a polynucleotide of any of the above-mentioned [1] to [12] or a vector of any of the above-mentioned [13] to [16].

[18] A method for treating or preventing MDC1A, comprising administering a polynucleotide of any of the above-mentioned [1] to [12] or a vector of any of the above-mentioned [13] to [16] to a subject in need thereof.

[19] Use of a polynucleotide of any of the above-mentioned [1] to [12] or a vector of any of the above-mentioned [13] to [16] for the treatment or prevention of MDC1A.

[20] Use of a polynucleotide of any of the above-mentioned [1] to [12] or a vector of any of the above-mentioned [13] to [16] in the manufacture of a pharmaceutical composition for the treatment or prevention of MDC1A.

[21] A method for upregulating expression of human LAMA1 gene in a cell, comprising expressing (c) a fusion protein of a nuclease-deficient CRISPR effector protein and a transcription activator, and (d) a guide RNA targeting (i) a continuous region set forth in SEQ ID NO: 15, 20, 25, 50, 56, or 61, (ii) a continuous region set forth in SEQ ID NO: 124, or (iii) a continuous region set forth in SEQ ID NO: 178, 193, or 195, in the expression regulatory region of human LAMA1, in the aforementioned cell.

[22] A ribonucleoprotein comprising the following:

(c) a fusion protein of a nuclease-deficient CRISPR effector protein and a transcription activator, and (d) a guide RNA targeting (i) a continuous region set forth in SEQ ID NO: 15, 20, 25, 50, 56, or 61, (ii) a continuous region set forth in SEQ ID NO: 124, or (iii) a continuous region set forth in SEQ ID NO: 178, 193, or 195, in the expression regulatory region of human LAMA1 gene.

[23] A kit comprising the following for upregulation of the expression of the human LAMA1 gene:

(e) a fusion protein of a nuclease-deficient CRISPR effector protein and a transcription activator, or a polynucleotide encoding the fusion protein, and (f) a guide RNA targeting (i) a continuous region set forth in SEQ ID NO: 15, 20, 25, 50, 56, or 61, (ii) a continuous region set forth in SEQ ID NO: 124, or (iii) a continuous region set forth in SEQ ID NO: 178, 193, or 195 in the expression regulatory region of human LAMA1 gene, or a polynucleotide encoding the guide RNA.

[24] A method for treating or preventing MDC1A, comprising administering the following (e) and (f):

(e) a fusion protein of a nuclease-deficient CRISPR effector protein and a transcription activator, or a polynucleotide encoding the fusion protein, and (f) a guide RNA targeting (i) a continuous region set forth in SEQ ID NO: 15, 20, 25, 50, 56, or 61, (ii) a continuous region set forth in SEQ ID NO: 124, or (iii) a continuous region set forth in SEQ ID NO: 178, 193, or 195 in the expression regulatory region of human LAMA1 gene, or a polynucleotide encoding the guide RNA.

[25] Use of the following (e) and (f):

(e) a fusion protein of a nuclease-deficient CRISPR effector protein and a transcription activator, or a polynucleotide encoding the fusion protein, and (f) a guide RNA targeting (i) a continuous region set forth in SEQ ID NO: 15, 20, 25, 50, 56, or 61, (ii) a continuous region set forth in SEQ ID NO: 124, or (iii) a continuous region set forth in SEQ ID NO: 178, 193, or 195 in the expression regulatory region of human LAMA1 gene, or a polynucleotide encoding the guide RNA, in the manufacture of a pharmaceutical composition for the treatment or prevention of MDC1A.

Advantageous Effects of Invention

According to the present invention, the expression of human LAMA1 gene can be upregulated, as a result of which the present invention is expected to be able to treat MDC1A.

BRIEF DESCRIPTION OF DRAWINGS

FIG. 7A shows the evaluation results of an expression enhancing action on human LAMA1 gene in primary HSMM cells (derived from donor #3, #121) by using sgRNA (sgLAMA1-155, sgLAMA1-170, sgLAMA-172) containing crRNA encoded by the targeting sequence shown in SEQ ID NO: 178, 193 or 195 and mini-VR. The horizontal axis shows each condition, and the vertical axis shows the ratio of the expression level of LAMA1 gene when using each sgRNA to that when using control sgRNA as 1. Experiments were repeated three times and the average and SD were shown.

FIG. 7B shows the evaluation results of an expression enhancing action on human LAMA1 gene in primary HSMM cells (derived from donor #368, #617) by using sgRNA (sgLAMA1-155, sgLAMA1-170, sgLAMA-172) containing crRNA encoded by the targeting sequence shown in SEQ ID NO: 178, 193 or 195 and mini-VR. The horizontal axis shows each condition, and the vertical axis shows the ratio of the expression level of LAMA1 gene when using each sgRNA to that when using control sgRNA as 1. Experiments were repeated three times and the average and SD were shown.

FIG. 8 shows the evaluation results of an expression level on human LAMA1 gene in primary HSMM cells (derived from donor #3, #121, #368, #617) The horizontal axis shows donor number, and the vertical axis shows the expression level when using HPRT control.

FIG. 9 shows the evaluation results of an expression enhancing action on human LAMA1 gene in primary HSMM cells (derived from donor #3) by using sgRNA (sgLAMA1-155, sgLAMA1-170, sgLAMA-172) containing crRNA encoded by the targeting sequence shown in SEQ ID NO: 178, 193, or 195 and various activation moiety. The horizontal axis shows each condition, and the vertical axis shows the ratio of the expression level of LAMA1 gene when using each sgRNA to that when using control sgRNA as 1.

FIG. 10 shows the evaluation results of an expression enhancing action on human LAMA1 gene in primary HSMM cells (derived from donor #3, #617) by using sgRNA containing crRNA encoded by the targeting sequence shown in SEQ ID NO: 178, 193, or 195 and microVR, at the protein level.

DESCRIPTION OF EMBODIMENTS

Figure 1:
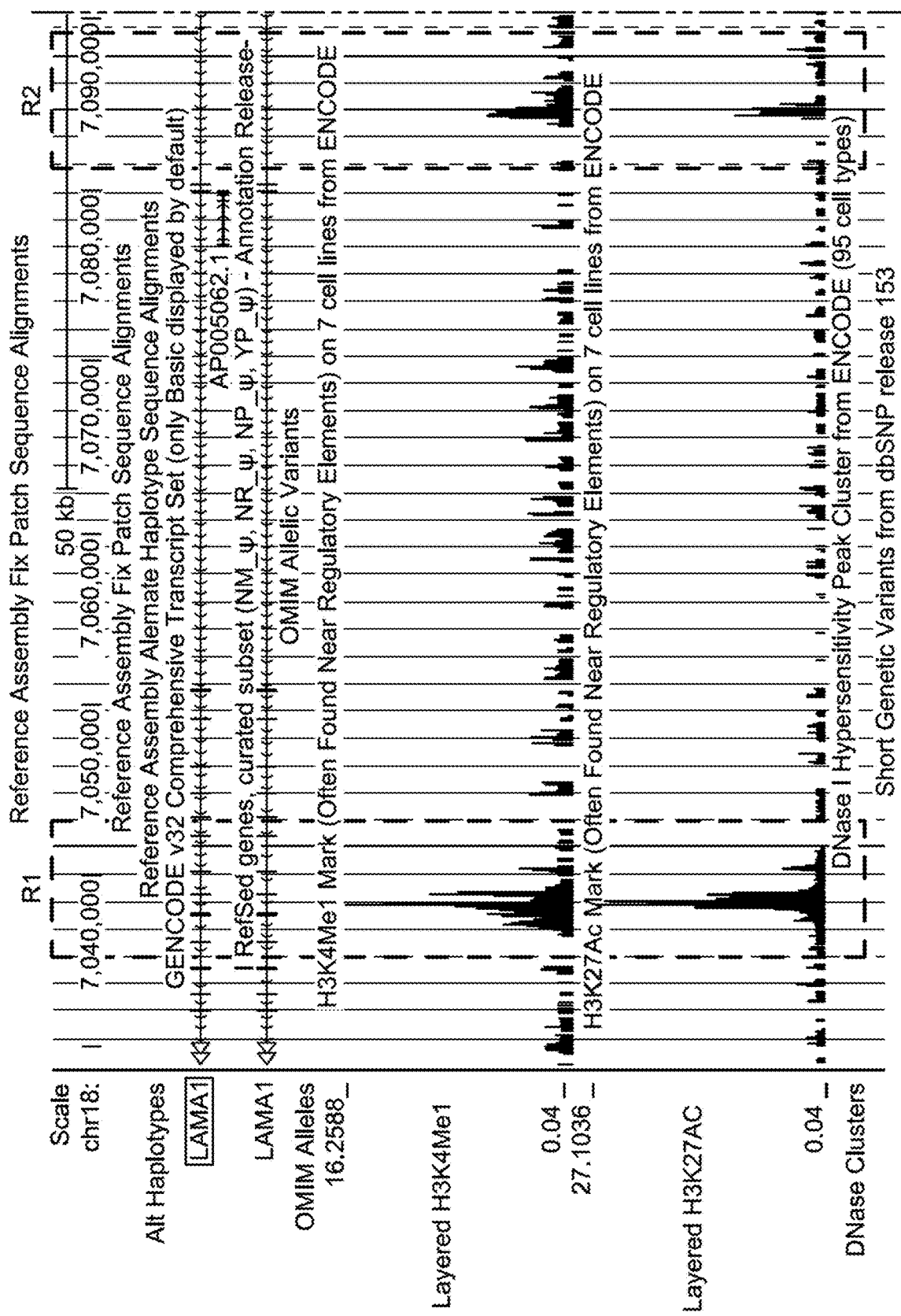
FIG. 1 shows the location of the targeted genomic region in the human LAMA1 gene.
Figure 1:
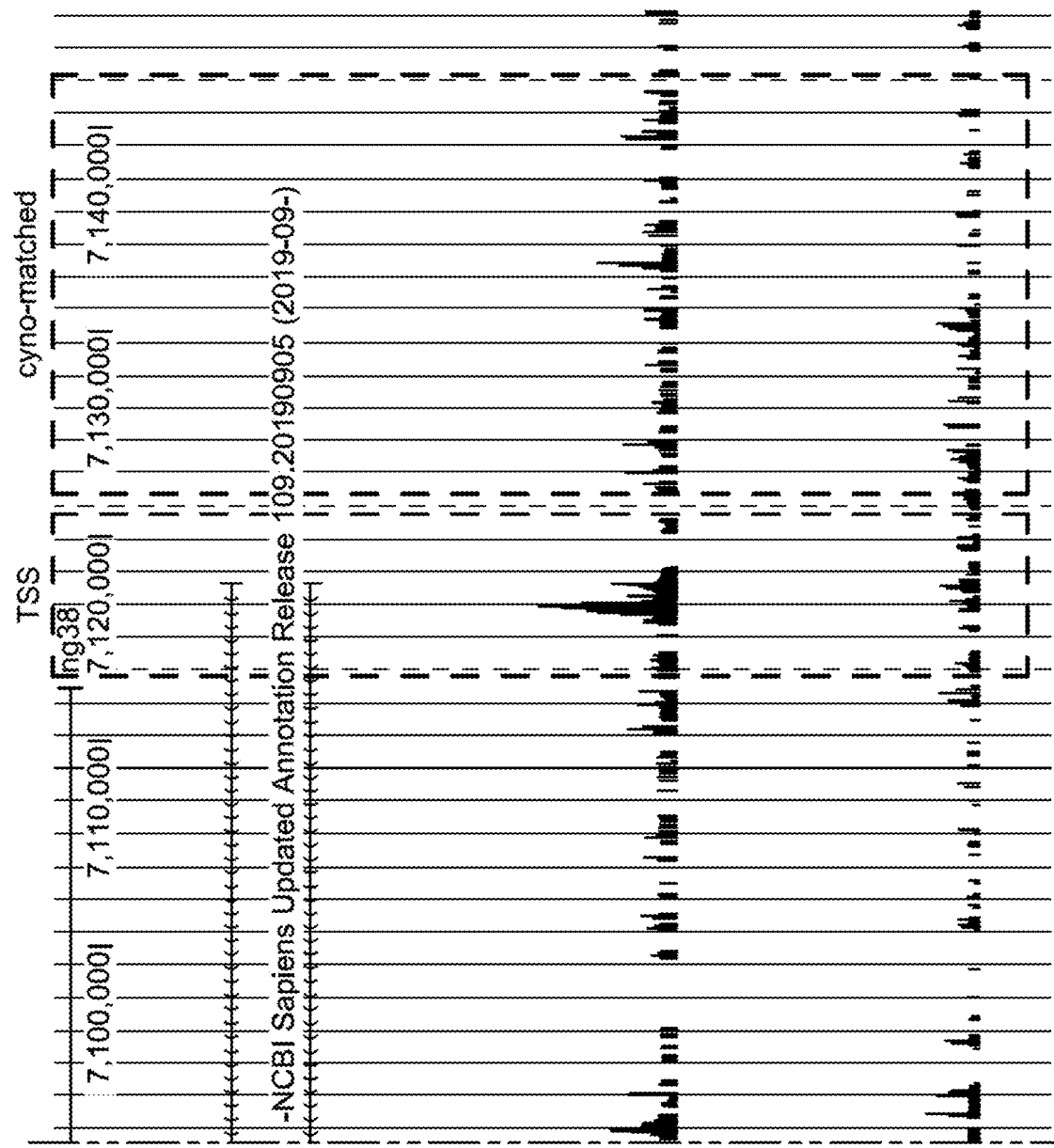

The embodiments of the present invention are explained in detail below.

1. Polynucleotide

The present invention provides a polynucleotide comprising the following base sequences (hereinafter sometimes to be also referred to as "the polynucleotide of the present invention"):

(a) a base sequence encoding a fusion protein of a nuclease-deficient CRISPR effector protein and a transcription activator, and (b) a base sequence encoding
  (i) a guide RNA targeting a continuous region set forth in SEQ ID NO: 15, 20, 25, 50, 56, or 61,
  (ii) a guide RNA targeting a continuous region set forth in SEQ ID NO: 124, or
  (iii) a guide RNA targeting a continuous region set forth in SEQ ID NO: 178, 193, or 195, in the expression regulatory region of human LAMA1 gene.

The polynucleotide of the present invention is introduced into a desired cell and transcribed to produce a fusion protein of a nuclease-deficient CRISPR effector protein and a transcription activator, and a guide RNA targeting a particular region of the expression regulatory region of the human LAMA1 gene. These fusion protein and guide RNA form a complex (hereinafter the complex is sometimes referred to as "ribonucleoprotein; RNP") and cooperatively act on the aforementioned particular region, thus activating transcription of the human LAMA1 gene.

(1) Definition

In the present specification, "the expression regulatory region of human Laminin-α1 chain (LAMA1) gene" means any region in which the expression of human LAMA1 gene can be activated by binding RNP to that region. That is, the expression regulatory region of human LAMA1 gene may exist in any region such as the promoter region, enhancer region, intron, and exon of the human LAMA1 gene, as long as the expression of the human LAMA1 gene is activated by the binding of RNP. In the present specification, when the expression regulatory region is shown by the particular sequence, the expression regulatory region includes both the sense strand sequence and the antisense strand sequence conceptually.

In the present invention, a fusion protein of a nuclease-deficient CRISPR effector protein and a transcription activator is recruited by a guide RNA into a particular region in the expression regulatory region of the human LAMA1 gene. In the present specification, the "guide RNA targeting . . . " means a "guide RNA recruiting a fusion protein into . . . ".

In the present specification, the "guide RNA (to be also referred to as 'gRNA')" is an RNA comprising a genome specific CRISPR-RNA (to be referred to as "crRNA"). crRNA is an RNA that binds to a complementary sequence of a targeting sequence (described later). When Cpf1 is used as the CRISPR effector protein, the "guide RNA" refers to an RNA comprising an RNA consisting of crRNA and a specific sequence attached to its 5'-terminal (for example, an RNA sequence set forth in SEQ ID NO: 65 in the case of FnCpf1). When Cas9 is used as the CRISPR effector protein, the "guide RNA" refers to chimera RNA (to be referred to as "single guide RNA(sgRNA)") comprising crRNA and trans-activating crRNA attached to its 3'-terminal (to be referred to as "tracrRNA") (see, for example, Zhang F. et al., Hum Mol Genet. 2014 Sep. 15; 23(R1):R40-6 and Zetsche B. et al., Cell. 2015 Oct. 22; 163(3): 759-71, which are incorporated herein by reference in their entireties).

In the present specification, a sequence complementary to the sequence to which crRNA is bound in the expression regulatory region of the human LAMA1 gene is referred to as a "targeting sequence". That is, in the present specification, the "targeting sequence" is a DNA sequence present in the expression regulatory region of the human LAMA1 gene and adjacent to PAM (protospacer adjacent motif). PAM is adjacent to the 5'-side of the targeting sequence when Cpf1 is used as the CRISPR effector protein. PAM is adjacent to the 3'-side of the targeting sequence when Cas9 is used as the CRISPR effector protein. The targeting sequence may be present on either the sense strand sequence side or the antisense strand sequence side of the expression regulatory region of the human LAMA1 gene (see, for example, the aforementioned Zhang F. et al., Hum Mol Genet. 2014 Sep. 15; 23(R1):R40-6 and Zetsche B. et al., Cell. 2015 Oct. 22; 163(3): 759-71, which are incorporated herein by reference in their entireties).

(2) Nuclease-Deficient CRISPR Effector Protein

In the present invention, using a nuclease-deficient CRISPR effector protein, a transcriptional activator fused thereto is recruited to the expression regulatory region of the human LAMA1 gene. The nuclease-deficient CRISPR effector protein (hereinafter to be simply referred to as "CRISPR effector protein") to be used in the present invention is not particularly limited as long as it forms a complex with gRNA and is recruited to the expression regulatory region of the human LAMA1 gene. For example, nuclease-deficient Cas9 (hereinafter sometimes to be also referred to as "dCas9") or nuclease-deficient Cpf1 (hereinafter sometimes to be also referred to as "dCpf1") can be included.

Examples of the above-mentioned dCas9 include, but are not limited to, a nuclease-deficient variant of *Streptococcus pyogenes*-derived Cas9 (SpCas9; PAM sequence: NGG (N is A, G, T or C. hereinafter the same)), *Streptococcus thermophilus*-derived Cas9 (StCas9; PAM sequence: NNA-GAAW (W is A or T. hereinafter the same)), *Neisseria meningitidis*-derived Cas9 (NmCas9; PAM sequence: NNNNGATT), or *Staphylococcus aureus*-derived Cas9 (SaCas9; PAM sequence: NNGRRT (R is A or G. hereinafter the same)) and the like (see, for example, Nishimasu et al., Cell. 2014 Feb. 27; 156(5): 935-49, Esvelt K M et al., Nat Methods. 2013 November; 10(11):1116-21, Zhang Y. Mol Cell. 2015 Oct. 15; 60(2):242-55, and Friedland A E et al., Genome Biol. 2015 Nov. 24; 16:257, which are incorporated herein by reference in their entireties). For example, in the case of SpCas9, a double mutant in which the 10th Asp residue is converted to Ala residue and the 840th His residue is converted to Ala residue (sometimes referred to as "dSpCas9") can be used (see, for example, the aforementioned Nishimasu et al., Cell. 2014). Alternatively, in the case of SaCas9, a double mutant in which the 10th Asp residue is converted to Ala residue and the 580th Asn residue is converted to Ala residue (SEQ ID NO: 66), or a double mutant in which the 10th Asp residue is converted to Ala residue and the 557th His residue is converted to Ala residue (SEQ ID NO: 67) (hereinafter any of these double mutants is sometimes to be referred to as "dSaCas9") can be used (see, for example, the aforementioned Friedland A E et al., Genome Biol. 2015, which is incorporated herein by reference in its entirety).

In addition, in one embodiment of the present invention, as dCas9, a variant obtained by modifying a part of the amino acid of the aforementioned dCas9, which forms a complex with gRNA and is recruited to the expression regulatory region of the human LAMA1 gene, may also be used. Examples of such variant include a truncated variant with a partly deleted amino acid sequence. In one embodiment of the present invention, as dCas9, variants disclosed in U.S. provisional patent application Nos: 62/682,244 and 62/749,855, which are incorporated herein by reference in there entireties, can be used. Specifically, dSaCas9 obtained by deleting the 721st to 745th amino acids from dSaCas9 that is a double mutant in which the 10th Asp residue is converted to Ala residue and the 580th Asn residue is converted to Ala residue (SEQ ID NO: 68), or dSaCas9 in which the deleted part is substituted by a peptide linker (e.g., one in which the deleted part is substituted by GGSGGS linker (SEQ ID NO: 69) is set forth in SEQ ID NO: 70), or dSaCas9 obtained by deleting the 482nd-648th amino acids of dSaCas9 that is the aforementioned double mutant (SEQ ID NO: 71), or dSaCas9 in which the deleted part is substituted by a peptide linker (one in which the deleted part is substituted by GGSGGS linker is set forth in SEQ ID NO: 72) may also be used.

Examples of the above-mentioned dCpf1 include, but are not limited to, a nuclease-deficient variant of *Francisella novicida*-derived Cpf1 (FnCpf1; PAM sequence: NTT), *Acidaminococcus* sp.-derived Cpf1 (AsCpf1; PAM sequence: NTTT), or *Lachnospiraceae bacterium*-derived Cpf1 (LbCpf1; PAM sequence: NTTT) and the like (see, for example, Zetsche B. et al., Cell. 2015 Oct. 22; 163(3):759-71, Yamano T et al., Cell. 2016 May 5; 165(4):949-62, and Yamano T et al., Mol Cell. 2017 Aug. 17; 67(4):633-45, which are incorporated herein by reference in their entireties). For example, in the case of FnCpf1, a double mutant in which the 917th Asp residue is converted to Ala residue and the 1006th Glu residue is converted to Ala residue can be used (see, for example, the aforementioned Zetsche B et al., Cell. 2015, which is incorporated herein by reference in its entirety). In one embodiment of the present invention, as dCpf1, a variant obtained by modifying a part of the amino acid of the aforementioned dCpf1, which forms a complex with gRNA and is recruited to the expression regulatory region of the human LAMA1 gene, may also be used.

In one embodiment of the present invention, dCas9 is used as the CRISPR effector protein and, in a particular embodiment, dSaCas9 is used.

A polynucleotide comprising a base sequence encoding a CRISPR effector protein can be cloned by, for example, synthesizing an oligoDNA primer covering a region encoding a desired part of the protein based on the cDNA sequence information thereof, and amplifying the polynucleotide by PCR method using total RNA or mRNA fraction prepared from the cells producing the protein as a template. In addition, a polynucleotide comprising a base sequence encoding a CRISPR effector protein can be obtained by introducing a mutation into a nucleotide sequence encoding a cloned CRISPR effector protein by a known site-directed mutagenesis method to convert the amino acid residues (e.g., 10th Asp residue, 557th His residue, and 580th Asn residue in the case of SaCas9; 917th Asp residue and 1006th Glu residue in the case of FnCpf1, and the like can be included, but are not limited to these) at a site important for DNA cleavage activity to other amino acids.

Alternatively, a polynucleotide comprising a base sequence encoding CRISPR effector protein can be obtained by chemical synthesis or a combination of chemical synthesis and PCR method or Gibson Assembly method, based on the cDNA sequence information thereof, and can also be further constructed as a base sequence that underwent codon optimization to give codons suitable for expression in human.

(3) Transcription Activator

In the present invention, human LAMA1 gene expression is activated by the action of the transcription activator fused with the CRISPR effector protein. In the present specification, the "transcription activator" means a protein having ability to activate gene transcription of human LAMA1 gene or a peptide fragment retaining the function thereof. The transcription activator to be used in the present invention is not particularly limited as long as it can activate expression of human LAMA1 gene. For example, it includes VP64, VP160, VPH, VPR, miniVR, and microVR, a variant thereof having transcription activation ability and the like. VP64 is exemplified by a peptide consisting of 50 amino acids set forth in SEQ ID NO: 73. VP160 is exemplified by a peptide consisting of 131 amino acids set forth in SEQ ID NO: 84. VPH is a fusion protein of VP64, p65 and HSF1, specifically, exemplified by a peptide consisting of 376 amino acids set forth in SEQ ID NO: 74. VPR is a fusion protein of VP64, p65, and a replication and transcription activator of Epstein-Barr virus (RTA), specifically, exemplified by a peptide consisting of 523 amino acids set forth in SEQ ID NO: 75. VP64, VPH, and VPR are known and disclosed in detail in, for example, Chavez A. et al., Nat Methods. 2016 July; 13(7):563-7 and Chavez A. et al., Nat Methods. 2015 April; 12(4):326-8, which are incorporated herein by reference in their entireties. MiniVR and microVR are peptides comprising VP64 and a transcription activation domain of RTA. The transcription activation domain of RTA is known and disclosed in, for example, J Virol. 1992 September; 66(9):5500-8, which is incorporated herein by reference in its entirety and the like. Specifically, miniVR is exemplified by a peptide consisting of 167 amino acids set forth in SEQ ID NO: 76, and microVR is exemplified by a peptide consisting of 140 amino acids set forth in SEQ ID NO: 77. The amino acid sequence set forth in SEQ ID NO: 76 is composed of an amino acid sequence in which the 493rd-605th amino acid residues of RTA and VP64 are linked with a G-S-G-S linker (SEQ ID NO: 78). The amino acid sequence set forth in SEQ ID NO: 77 is composed of an amino acid sequence in which the 520th-605th amino acid residues of RTA and VP64 are linked with a G-S-G-S linker. The detail of miniVR and microVR is described in U.S. provisional patent application No.: 62/715,432, which is incorporated herein by reference in its entirety. Any of the aforementioned transcriptional activators may be subjected to any modification and/or alteration as long as it maintains its transcription activation ability.

A polynucleotide comprising a base sequence encoding a transcription activator can be constructed by chemical synthesis or a combination of chemical synthesis and PCR method or Gibson Assembly method. Furthermore, a polynucleotide comprising a base sequence encoding a transcription activator can also be constructed as a codon-optimized DNA sequence to be codons suitable for expression in human.

A polynucleotide comprising a base sequence encoding a fusion protein of a transcription activator and a CRISPR effector protein can be prepared by ligating a base sequence encoding a CRISPR effector protein to a base sequence encoding a transcription activator directly or after adding a base sequence encoding a linker, NLS (nuclear localization signal) and/or a tag. In the present invention, the transcription activator may be fused with either N-terminal or C-terminal. As the linker, a linker with an amino acid number of about 2 to 50 can be used, and specific examples thereof include, but are not limited to, a G-S-G-S linker in which glycine (G) and serine (S) are alternately linked and the like.

(4) Guide RNA

In the present invention, a fusion protein of CRISPR effector protein and transcription activator can be recruited to the expression regulatory region of the human LAMA1 gene by guide RNA. As described in the aforementioned "(1) Definition", guide RNA comprises crRNA, and the crRNA binds to a complementary sequence of the targeting sequence. crRNA may not be completely complementary to the complementary sequence of the targeting sequence as long as the guide RNA can recruit the fusion protein to the target region, and may be a sequence in which at least 1 to 3 bases are deleted, substituted, inserted and/or added.

When dCas9 is used as the CRISPR effector protein, for example, the targeting sequence can be determined using a published gRNA design web site (CRISPR Design Tool, CRISPR direct etc.). To be specific, from the sequence of the object gene (i.e., human LAMA1 gene), candidate targeting sequences of about 20 nucleotides in length for which PAM (e.g., NNGRRT in the case of SaCas9) is adjacent to the 3'-side thereof are listed, and one having a small number of off-target sites in human genome from among these candidate targeting sequences can be used as the targeting sequence. The base length of the targeting sequence is 18 to 24 nucleotides in length, preferably 20 to 23 nucleotides in length, more preferably 21 to 23 nucleotides in length. As a primary screening for the prediction of the off-target site number, a number of bioinformatic tools are known and publicly available, and can be used to predict the targeting sequence with the lowest off-target effect. Examples thereof include bioinformatics tools such as Benchling (https://benchling.com), and COSMID (CRISPR Off-target Sites with Mismatches, Insertions and Deletions) (Available on https://crispr.bme.gatech.edu on the internet). Using these, the similarity to the base sequence targeted by gRNA can be summarized. When the gRNA design software to be used does not have a function to search for off-target site of the target genome, for example, the off-target site can be searched for by subjecting the target genome to Blast search with respect to 8 to 12 nucleotides on the 3'-side of the candidate targeting sequence (seed sequence with high discrimination ability of targeted nucleotide sequence).

In one embodiment of the present invention, in the region existing in the GRCh38.p13 position of human chromosome 18 (Chr 18), the following region can be the expression regulatory regions of the human LAMA1 gene. This region is strongly suggested to be expression regulatory regions by histone modification patterns. Therefore, in one embodiment of the present invention, the targeting sequence can be 18 to 24 nucleotides in length, preferably 20 to 23 nucleotides in length, more preferably 21 to 23 nucleotides in length, in at least one region of the following region existing in the GRCh38.p13 position of human chromosome 18 (Chr 18):

(1) 7,115,000-7,118,000.

In one embodiment of the present invention, the targeting sequence can be the base sequence set forth in SEQ ID NO: 15, 20, 25, 50, 56, or 61.

In one embodiment of the present invention, the targeting sequence can be 18 to 24 nucleotides in length, preferably 20 to 23 nucleotides in length, more preferably 21 to 23 nucleotides in length, in at least one region of the following region existing in the GRCh38.p13 position of human chromosome 18 (Chr 18):

(2) 7,036,000-7,042,000.
(3) 7,083,000-7,087,000

In one embodiment of the present invention, the targeting sequence can be the base sequence set forth in SEQ ID NO: 124.

In one embodiment of the present invention, the targeting sequence can be 18 to 24 nucleotides in length, preferably 20 to 23 nucleotides in length, more preferably 21 to 23 nucleotides in length, in at least one region of the following region existing in the GRCh38.p13 position of human chromosome 18 (Chr 18):

(4) 7,118,000-7,133,000.

In one embodiment of the present invention, the targeting sequence can be the base sequence set forth in SEQ ID NO: 178, 193, or 195. In one embodiment of the present invention, a base sequence encoding crRNA may be the same base sequence as the targeting sequence. For example, when the targeting sequence set forth in SEQ ID NO: 15 (TCTCGCCTCCGCCGCCACTCG) is introduced into the cell as a base sequence encoding crRNA, crRNA transcribed from the sequence is UCUCGCCUCCGCCGCCACUCG (SEQ ID NO: 79) and is bound to CGAGTGGCGGCG-GAGGCGAGA (SEQ ID NO: 80), which is a sequence complementary to the base sequence set forth in SEQ ID NO: 15 and is present in the expression regulatory region of the human LAMA1 gene. In another embodiment, a base sequence which is a targeting sequence in which at least 1 to 3 bases are deleted, substituted, inserted and/or added can be used as the base sequence encoding crRNA as long as guide RNA can recruit a fusion protein to the target region. Therefore, in one embodiment of the present invention, as a base sequence encoding crRNA, the base sequence set forth in SEQ ID NO: 15, 20, 25, 50, 56, or 61, or such sequence in which 1 to 3 bases are deleted, substituted, inserted and/or added can be used. In another one embodiment of the present invention, as a base sequence encoding crRNA, the base sequence set forth in SEQ ID NO: 124, or such sequence in which 1 to 3 bases are deleted, substituted, inserted and/or added can be used. In further another one embodiment of the present invention, as a base sequence encoding crRNA, the base sequence set forth in SEQ ID NO: 178, 193, or 195, or such sequence in which 1 to 3 bases are deleted, substituted, inserted and/or added can be used.

When dCpf1 is used as the CRISPR effector protein, a base sequence encoding gRNA can be designed as a DNA sequence encoding crRNA with particular RNA attached to the 5'-terminal. RNA attached to the 5'-terminal of crRNA and a DNA sequence encoding said RNA can be appropriately selected by those of ordinary skill in the art according to the dCpf1 to be used. For example, when dFnCpf1 is used, a base sequence in which SEQ ID NO: 81; AATT<u>TC-TAC</u>TGTT<u>GTA</u>GAT is attached to the 5'-side of the targeting sequence can be used as a base sequence encoding gRNA (when transcribed to RNA, the sequences of the underlined parts form a base pairs to form a stem-loop structure). The sequence to be added to the 5'-terminal may be a sequence generally used for various Cpf1 proteins in which at least 1 to 6 bases are deleted, substituted, inserted and/or added, as long as gRNA can recruit a fusion protein to the expression regulatory region after transcription.

When dCas9 is used as the CRISPR effector protein, a base sequence encoding gRNA can be designed as a DNA sequence in which a DNA sequence encoding known tracrRNA is linked to the 3'-terminal of a DNA sequence encoding crRNA. Such tracrRNA and a DNA sequence encoding the tracrRNA can be appropriately selected by those of ordinary skill in the art according to the dCas9 to be used. For example, when dSaCas9 is used, the base sequence set forth in SEQ ID NO: 82 is used as the DNA sequence encoding tracrRNA. The DNA sequence encoding tracrRNA may be a base sequence encoding tracrRNA generally used for various Cas9 proteins in which at least 1 to 6 bases are deleted, substituted, inserted and/or added, as long as gRNA can recruit a fusion protein to the expression regulatory region after transcription.

A polynucleotide comprising a base sequence encoding gRNA designed in this way can be chemically synthesized using a known DNA synthesis method.

In another embodiment of the present invention, the polynucleotide of the present invention may comprise two or more kinds of gRNA with different crRNA.

(5) Promoter Sequence

In one embodiment of the present invention, a promoter sequence may be operably linked to the upstream of each of a base sequence encoding fusion protein of CRISPR effector protein and transcription activator and/or a base sequence encoding gRNA. The promoter to be possibly linked is not particularly limited as long as it shows a promoter activity in the target cell. Examples of the promoter sequence possibly linked to the upstream of the base sequence encoding the fusion protein include, but are not limited to, EFS promoter, CMV (cytomegalovirus) promoter, CK8 promoter, MHC promoter, MYOD promoter, hTERT promoter, SRα promoter, SV40 promoter, LTR promoter, CAG promoter, RSV (Rous sarcoma virus) promoter and the like. Examples of the promoter sequence possibly linked to the upstream of the base sequence encoding gRNA include, but are not limited to, U6 promoter, SNR6 promoter, SNR52 promoter, SCR1 promoter, RPR1 promoter, U3 promoter, H1 promoter, and tRNA promoter, which are pol III promoters, and the like. In one embodiment of the present invention, a muscle specific promoter can be used as the promoter sequence linked to the upstream of a base sequence encoding the aforementioned fusion protein. Examples of the muscle specific promoter include, but are not limited to, CK8 promoter, CK6 promoter, CK1 promoter, CK7 promoter, CK9 promoter, cardiac muscle troponin C promoter, α actin promoter, myosin heavy chain kinase (MHCK) promoter, myosin light chain 2A promoter, dystrophin promoter, muscle creatine kinase promoter, dMCK promoter, tMCK promoter, enh348 MCK promoter, synthetic C5-12(Syn) promoter, unc45b promoter, Myf5 promoter, MLC1/3f promoter, MYOD promoter, Myog promoter, Pax7 promoter and the like (for the detail of the muscle specific promoter, see, for example, US2011/0212529A, McCarthy J J et al., Skeletal Muscle. 2012 May; 2(1):8, Wang B. et al., Gene Ther. 2008 November; 15(22): 1489-99, which are incorporated herein by reference in their entireties and the like).

(6) Other Base Sequence

Furthermore, the polynucleotide of the present invention may further comprise known sequences such as Polyadenylation signal, Kozak consensus sequence and the like besides those mentioned above for the purpose of improving the translation efficiency of mRNA produced by transcription of a base sequence encoding a fusion protein of CRISPR effector protein and transcription activator. In addition, the polynucleotide of the present invention may comprise a base sequence encoding a linker sequence, a base sequence encoding NLS and/or a base sequence encoding a tag.

2. Vector

The present invention provides a vector comprising the polynucleotide of the present invention (hereinafter sometimes referred to as "the vector of the present invention"). The vector of the present invention may be a plasmid vector or a viral vector.

When the vector of the present invention is a plasmid vector, the plasmid vector to be used is not particularly limited and may be any plasmid vector such as cloning plasmid vector and expression plasmid vector. The plasmid vector is prepared by inserting the polynucleotide of the present invention into a plasmid vector by a known method.

When the vector of the present invention is a viral vector, the viral vector to be used is not particularly limited and examples thereof include, but are not limited to, adenovirus vector, adeno-associated virus (AAV) vector, lentivirus vector, retrovirus vector, Sendaivirus vector and the like. In the present specification, the "virus vector" or "viral vector" also includes derivatives thereof. Considering the use in gene therapy, AAV vector is preferably used for the reasons such that it can express transgene for a long time, and it is derived from a non-pathogenic virus and has high safety.

A viral vector comprising the polynucleotide of the present invention can be prepared by a known method. In brief, a plasmid vector for virus expression into which the polynucleotide of the present invention has been inserted is prepared, the vector is transfected into an appropriate host cell to allow for transient production of a viral vector comprising the polynucleotide of the present invention, and the viral vector is collected.

In one embodiment of the present invention, when AAV vector is used, the serotype of the AAV vector is not particularly limited as long as expression of the human LAMA1 gene in the target can be activated, and any of AAV1, AAV2, AAV3, AAV4, AAV5, AAV6, AAV7, AAV8, AAV9, AAV10, and variant thereof, and the like may be used (for the various serotypes of AAV, see, for example, WO 2005/033321, which is incorporated herein by reference in its entirety). Examples of the variants of AAV include, but are not limited to, new serotype with a modified capsid (e.g., WO 2012/057363, which is incorporated herein by reference in its entirety) and the like.

In one example of preparing an AAV vector, first, a vector plasmid comprising inverted terminal repeat (ITR) at both ends of wild-type AAV genomic sequence and the polynucleotide of the present invention inserted in place of the DNA encoding Rep protein and capsid protein is prepared. On the other hand, the DNA encoding Rep protein and capsid protein necessary for forming virus particles is inserted into other plasmid. Furthermore, a plasmid comprising genes (E1A, E1B, E2A, VA and E4orf6) responsible for the helper action of adenovirus necessary for proliferation of AAV is prepared as an adenovirus helper plasmid. Co-transfection of these three kinds of plasmids into the host cell causes production of recombinant AAV (i.e., AAV vector) in the cell. As the host cell, a cell capable of supplying a part of the gene products (proteins) of the genes responsible for the aforementioned helper action (e.g., 293 cell etc.) is preferably used. When such cell is used, it is not necessary to carry the gene encoding a protein that can be supplied from the host cell in the aforementioned adenoviral helper plasmid. The produced AAV vector is present in the nucleus. Thus, a desired AAV vector is prepared by destroying the host cell with freeze-thawing, collecting the virus and then subjecting the virus fraction to separation and purification by density gradient ultracentrifugation method using cesium chloride, column method or the like.

AAV vector has great advantages in terms of safety, gene transduction efficiency and the like, and is used for gene therapy. However, it is known that the size of polynucleotide that can be packaged is limited. For example, the entire length including the base length of a polynucleotide comprising a base sequence encoding a fusion protein of dSaCas9 and miniVR or microVR, a base sequence encoding gRNA targeting the expression regulatory region of the human LAMA1 gene, and EFS promoter sequence and U6 promoter sequence as the promoter sequences, which is one embodiment of the present invention, and ITR parts is about 4.85 kb, and they can be packaged in a single AAV vector.

3. Treating or Preventing Agent for MDC1A

The present invention also provides a treating or preventing agent for MDC1A comprising the polynucleotide of the present invention or the vector of the present invention (hereinafter sometimes referred to as "the agent of the present invention").

The agent of the present invention comprises the polynucleotide of the present invention or the vector of the present invention as an active ingredient, and may be prepared as a formulation comprising such active ingredient (i.e., the polynucleotide of the present invention or the vector of the present invention) and, generally, a pharmaceutically acceptable carrier.

The agent of the present invention is administered parenterally, and may be administered topically or systemically. The agent of the present invention can be administered by, but are not limited to, for example, intravenous administration, intraarterial administration, subcutaneous administration, intraperitoneal administration, or intramuscular administration.

The dose of the agent of the present invention to a subject is not particularly limited as long as it is an effective amount for the treatment and/or prevention. It may be appropriately optimized according to the active ingredient, dosage form, age and body weight of the subject, administration schedule, administration method and the like.

In one embodiment of the present invention, the agent of the present invention can be not only administered to the subject affected with MDC1A but also prophylactically administered to subjects who may develop MDC1A in the future based on the genetic background analysis and the like. The term "treatment" in the present specification also includes remission of disease, in addition to cure of diseases. In addition, the term "prevention" may also include delaying onset of disease, in addition to prophylaxis of onset of disease. The agent of the present invention can also be referred to as "the pharmaceutical composition of the present invention" or the like.

4. Method for Treatment or Prevention of MDC1A

The present invention also provides a method for treating or preventing MDC1A, comprising administering the polynucleotide of the present invention or the vector of the present invention to a subject in need thereof (hereinafter sometimes referred to as "the method of the present invention"). In addition, the present invention includes the polynucleotide of the present invention or the vector of the present invention for use in the treatment or prevention of MDC1A. Furthermore, the present invention includes use of the polynucleotide of the present invention or the vector of the present invention in the manufacture of a pharmaceutical composition for the treatment or prevention of MDC1A.

The method of the present invention can be practiced by administering the aforementioned agent of the present invention to a subject affected with MDC1A, and the dose, administration route, subject and the like are the same as those mentioned above.

Measurement of the symptoms may be performed before the start of the treatment using the method of the present invention and at any timing after the treatment to determine the response of the subject to the treatment.

The method of the present invention can improve the functions of the skeletal muscle and/or cardiac muscle of the subject. Muscles to be improved in the function thereof are not particularly limited, and any muscles and muscle groups are exemplified.

5. Ribonucleoprotein

The present invention provides a ribonucleoprotein comprising the following (hereinafter sometimes referred to as "RNP of the present invention"):
(c) a fusion protein of a nuclease-deficient CRISPR effector protein and a transcription activator, and
(d) a guide RNA targeting
  (i) a continuous region set forth in SEQ ID NO: 15, 20, 25, 50, 56, or 61,
  (ii) a continuous region set forth in SEQ ID NO: 124; or
  (iii) a continuous region set forth in SEQ ID NO: 178, 193, or 195,
in the expression regulatory region of human LAMA1 gene.

As the CRISPR effector protein, transcription activator, and guide RNA comprised in the RNP of the present invention, the CRISPR effector protein, transcription activator, and guide RNA explained in detail in the abovementioned section of "1. Polynucleotide" can be used. The fusion protein of CRISPR effector protein and transcription activator to be comprised in the RNP of the present invention can be produced by, for example, introducing a polynucleotide encoding the fusion protein into the cell, bacterium, or other organism to allow for expression, or an in vitro translation system by using the polynucleotide. In addition, guide RNA comprised in the RNP of the present invention can be produced by, for example, chemical synthesis or an in vitro transcription system by using a polynucleotide encoding the guide RNA. The thus-prepared CRISPR effector protein and guide RNA are mixed to prepare the RNP of the present invention. Where necessary, other substances such as gold particles may be mixed. To directly deliver the RNP of the present invention to the target cell, tissue and the like, the RNP may be encapsulated in a lipid nanoparticle (LNP) by a known method. The RNP of the present invention can be introduced into the target cell, tissue and the like by a known method. For example, Lee K., et al., Nat Biomed Eng. 2017; 1:889-901, WO 2016/153012, which are incorporated herein by reference in their entireties, and the like can be referred to for encapsulation in LNP and introduction method.

In one embodiment of the present invention, the guide RNA comprised in RNP of the present invention targets continuous 18 to 24 nucleotides in length, preferably 20 to 23 nucleotides in length, more preferably 21 to 23 nucleotides in length, in at least one region of the following region existing in the GRCh38.p13 position of human chromosome 18 (Chr 18):
  (1) 7,115,000-7,118,000.
  In one embodiment, the guide RNA targets a region comprising all or a part of the sequence set forth in SEQ ID NO: 15, 20, 25, 50, 56, or 61.
  (2) 7,036,000-7,042,000.
  (3) 7,083,000-7,087,000
  In one embodiment, the guide RNA targets a region comprising all or a part of the sequence set forth in SEQ ID NO: 124.
  (4) 7,118,000-7,133,000.
  In one embodiment, the guide RNA targets a region comprising all or a part of the sequence set forth in SEQ ID NO: 178, 193, or 195.

6. Others

The present invention also provides a composition or kit comprising the following for activation of the expression of the human LAMA1 gene:
(e) a fusion protein of a nuclease-deficient CRISPR effector protein and a transcription activator, or a polynucleotide encoding the fusion protein, and
(f) a guide RNA targeting
  (i) a continuous region set forth in SEQ ID NO: 15, 20, 25, 50, 56, or 61;
  (ii) a continuous region set forth in SEQ ID NO: 124; or
  (iii) a continuous region set forth in SEQ ID NO: 178, 193, or 195,
in the expression regulatory region of human LAMA1 gene, or a polynucleotide encoding the guide RNA.

The present invention also provides a method for treating or preventing MDC1A, comprising administering the following (e) and (f):
(e) a fusion protein of a nuclease-deficient CRISPR effector protein and a transcription activator, or a polynucleotide encoding the fusion protein, and
(f) a guide RNA targeting
  (i) a continuous region set forth in SEQ ID NO: 15, 20, 25, 50, 56, or 61,
  (ii) a continuous region set forth in SEQ ID NO: 124, or
  (iii) a continuous region set forth in SEQ ID NO: 178, 193, or 195,
in the expression regulatory region of human LAMA1 gene, or a polynucleotide encoding the guide RNA.

As the CRISPR effector protein, transcription activator, guide RNA, as well as polynucleotides encoding them and vectors in which they are carried in these inventions, those explained in detail in the above-mentioned sections of "1. Polynucleotide", "2. Vector" and "5. Ribonucleoprotein" can be used. The dose, administration route, subject, formulation and the like of the above-mentioned (e) and (f) are the same as those explained in the section of "3. Treating or preventing agent for MDC1A".

Other features of the invention will become apparent in the course of the following descriptions of exemplary embodiments which are given for illustration of the invention and are not intended to be limiting thereof.

EXAMPLES

Experimental Methods
Selection of LAMA1 Targeting Sequences

Based on the H3K4me3, H3K27Ac pattern of genome in human skeletal muscle cells, two additional putative gene regulatory regions (R1 and R2) of the human LAMA1 gene was scanned for sequences that can be targeted by a catalytically-inactive SaCas9 (D10A and N580A mutant; dSaCas9 complexed with gRNA, defined herein as a targeting sequence. Location of the targeted genome regions relative to LAMA1 gene is depicted in FIG. 1 and their coordinates are noted below:
1. Chr18: GRCh38/hg38; 7,036,000-7,042,000→~6 kb (R1)
2. Chr18: GRCh38/hg38; 7,083,000-7,087,000→~4 kb (R2)

Targeting sequences were specified by the 21-nucleotide segment adjacent to a protospacer adjacent motif (PAM) having the sequence NNGRRT (5'-21nt targeting sequence-NNGRRT-3') (Table 1).

In addition, we also scanned nearly 15 kb region upstream of human LAMA1 TSS site, and chose only the targeting sequence and PAM sequences with a perfect match for the corresponding region of the crab-eating macaque (Macaca fascicularis) genome. Location of the targeted genome regions relative to LAMA1 gene is depicted in FIG. 1 and their coordinates are noted below:
Chr18: GRCh38/hg38; 7,118,000-7,133,000→~15 kb (cyno-matched)

Table 1 Targeting sequences used to screen expression regulatory region of LAMA1 gene.

TABLE 1-1

| SEQ ID NO | | Position | Strand | Sequence | PAM |
|---|---|---|---|---|---|
| 62 | Control-1 | N/A | N/A | ACGGAGGCTAAGCGTCGCAA | N/A |
| 63 | Control-2 | N/A | N/A | CGCTTCCGCGGCCCGTTCAA | N/A |
| 64 | Control-3 | N/A | N/A | GTAGGCGCGCCGCTCTCTAC | N/A |
| 1 | sgLAMA1-1 | 7115596 | 1 | ACTAGCAGGTGATTTGCAGGT | CAGGAT |
| 2 | sgLAMA1-2 | 7115756 | 1 | AGGTGGGCTGATCACGAGGTC | AGGAGT |
| 3 | sgLAMA1-3 | 7115948 | -1 | TCTCCGGGCTGCAGGCAGGAG | TGGAGT |
| 4 | sgLAMA1-4 | 7116050 | 1 | CGGAAGGCAAAAAGGCAAACA | GGGAAT |
| 5 | sgLAMA1-5 | 7116284 | -1 | TGAACAAGTCCCGGTTTCCCA | CAGGGT |
| 6 | sgLAMA1-6 | 7116346 | -1 | TGGGGAGGGAGAGGAGCCTTA | AAGGAT |
| 7 | sgLAMA1-7 | 7116486 | 1 | CAGTGCTTCCATCATGAATGC | TTGAAT |
| 8 | sgLAMA1-8 | 7116630 | -1 | CATGACAATGGGCGTATTCCC | ACGAAT |
| 9 | sgLAMA1-9 | 7116765 | 1 | GGGTTGTCCCCCAAAAGGGAA | AAGAAT |
| 10 | sgLAMA1-10 | 7116981 | 1 | GCCCACGGTCAATCCCGCGCA | GTGAAT |
| 11 | sgLAMA1-11 | 7117063 | 1 | TCAGTGCCCTGGACGCCGCCT | GCGGGT |
| 12 | sgLAMA1-12 | 7117247 | -1 | CGGGGCTGTTGGCCGGGCGCG | GGGGAT |
| 13 | sgLAMA1-13 | 7117423 | -1 | GGCTTTAACCTCCTCGGGCTT | TGGGGT |
| 14 | sgLAMA1-14 | 7117544 | -1 | GGCGCGCATCCTGATCCACCT | CGGAGT |
| 15 | sgLAMA1-15 | 7117738 | 1 | TCTCGCCTCCGCCGCCACTCG | GTGGGT |
| 16 | sgLAMA1-16 | 7117819 | 1 | CTGCCCTGGCCCCGCCGCTCC | TGGAGT |
| 17 | sgLAMA1-17 | 7115524 | 1 | TGACAGGGAACGTCTAACAAT | CTGAAT |
| 18 | sgLAMA1-18 | 7115953 | -1 | TGCAGTCTCCGGGCTGCAGGC | AGGAGT |
| 19 | sgLAMA1-19 | 7116007 | 1 | TGCTCAAGGAGGCTAGTTAGG | AAGGGT |
| 20 | sgLAMA1-20 | 7116022 | 1 | GTTAGGAAGGGTGAGGGTTGG | TGGGGT |
| 21 | sgLAMA1-21 | 7116163 | -1 | TCGGCACTTGGCCTGGCGGTT | ATGAGT |

TABLE 1-1-continued

| SEQ ID NO | | Position | Strand | Sequence | PAM |
|---|---|---|---|---|---|
| 22 | sgLAMA1-22 | 7116319 | 1 | ACCTTCAGCAGCCTGATAGAC | AGGAGT |
| 23 | sgLAMA1-23 | 7116406 | -1 | CGCAGAGCCAGGCTGGGAAGA | GGGAAT |
| 24 | sgLAMA1-24 | 7116439 | -1 | GAAACGCAGCATTGAATAGCT | GCGAGT |
| 25 | sgLAMA1-25 | 7116449 | -1 | ACCGGAGCTGGAAACGCAGCA | TTGAAT |

TABLE 1-2

| SEQ ID NO | | Position | Strand | Sequence | PAM |
|---|---|---|---|---|---|
| 26 | sgLAMA1-26 | 7116478 | 1 | CTCCGGTCCAGTGCTTCCATC | ATGAAT |
| 27 | sgLAMA1-27 | 7116490 | 1 | GCTTCCATCATGAATGCTTGA | ATGAAT |
| 28 | sgLAMA1-28 | 7116537 | -1 | AACGTGTGTTTGGGCATTGTG | CTGAGT |
| 29 | sgLAMA1-29 | 7116583 | -1 | ATTCGAGTCAAAAGTAGTGGG | CGGAAT |
| 30 | sgLAMA1-30 | 7116624 | 1 | TTTAATGAAGTTTATATTCGT | GGGAAT |
| 31 | sgLAMA1-31 | 7116724 | 1 | CCACGCTGCGAAGACAGCTCT | AGGGGT |
| 32 | sgLAMA1-32 | 7116733 | 1 | GAAGACAGCTCTAGGGGTGGC | GTGGGT |
| 33 | sgLAMA1-33 | 7116742 | 1 | TCTAGGGGTGGCGTGGGTGAC | TAGGGT |
| 34 | sgLAMA1-34 | 7116891 | -1' | GATTGAGAAGAGAAACTCAGA | GCGAAT |
| 35 | sgLAMA1-35 | 7116915 | -1 | AGCACCTTGCATGCGCGTTGC | AAGGAT |
| 36 | sgLAMA1-36 | 7116983 | -1 | CAAACCCGCTCATTCACTGCG | CGGGAT |
| 37 | sgLAMA1-37 | 7116989 | 1 | TCAATCCCGCGCAGTGAATGA | GCGGGT |
| 38 | sgLAMA1-38 | 7117024 | 1 | TTCGCCTATTGCACAAAAAGC | GCGGGT |
| 39 | sgLAMA1-39 | 7117151 | 1 | GCTTGGCTGCCAGGGGCCCCG | AGGAAT |
| 40 | sgLAMA1-40 | 7117167 | -1 | GGTCGCGGCGGCCGGGAAAGG | GCGGAT |
| 41 | sgLAMA1-41 | 7117191 | -1 | CTCATTGTCCGGCTGCGCAAG | CTGGGT |
| 42 | sgLAMA1-42 | 7117222 | -1 | ATGAATGGAGAAAGAGCTCTC | CCGAGT |
| 43 | sgLAMA1-43 | 7117276 | -1 | TAGTGCCCCGGCTGCGCGGGC | GGGGGT |
| 44 | sgLAMA1-44 | 7117309 | -1 | GGGCGCCCGGAGCGGGGCGCC | GGGGGT |
| 45 | sgLAMA1-45 | 7117346 | -1 | GCCATCTACGCGAGCAGTGCT | GGGGGT |
| 46 | sgLAMA1-46 | 7117365 | 1 | CTGCTCGCGTAGATGGCGCTC | CTGGGT |
| 47 | sgLAMA1-47 | 7117495 | -1 | TCCCGCGCTTGCCGGGGAGGG | CTGGAT |
| 48 | sgLAMA1-48 | 7117523 | -1 | CGGAGTGGGTGTCTCGGCCAC | GTGGGT |
| 49 | sgLAMA1-49 | 7117540 | 1 | GGCCGAGACACCCACTCCGAG | GTGGAT |
| 50 | sgLAMA1-50 | 7117540 | -1 | CGCATCCTGATCCACCTCGGA | GTGGGT |
| 51 | sgLAMA1-51 | 7117546 | 1 | .GACACCCACTCCGAGGTGGAT | CAGGAT |
| 52 | sgLAMA1-52 | 7117574 | -1 | AGCCCGTCGCGTTGGGCTGC | TGGAGT |
| 53 | sgLAMA1-53 | 7117644 | -1 | AGGTGAGCCCGGCCCGGGTCC | TAGGGT |

TABLE 1-3

| SEQ ID NO | | Position | Strand | Sequence | PAM |
|---|---|---|---|---|---|
| 54 | sgLAMA1-54 | 7117652 | -1 | CGGCAGAGAGGTGAGCCCGGC | CCGGGT |
| 55 | sgLAMA1-55 | 7117745 | -1 | GCGGCTTTCTCCCCAGACCCA | CCGAGT |
| 56 | sgLAMA1-56 | 7117787 | 1 | GCCTGGAACGCTCCACGGGAC | GCGAGT |
| 57 | sgLAMA1-57 | 7117871 | -1 | GGGCGGGGCGGGGCGCAGCCG | AGGGGT |
| 58 | sgLAMA1-58 | 7117923 | -1 | GGGCGCCCCGGGGGAGGGGT | CTGGGT |
| 59 | sgLAMA1-59 | 7117929 | -1 | CAAGCTGGGCGCCCCGGGGG | AGGGGT |
| 60 | sgLAMA1-60 | 7117948 | 1 | CGGGGGCGCCCAGCTTGGCCT | CTGGGT |
| 61 | sgLAMA1-61 | 7117980 | -1 | GTCAGCCCGGCCTCCCCGACT | GGGGGT |

TABLE 1-4

| SEQ ID NO | | Position | Strand | Sequence | PAM |
|---|---|---|---|---|---|
| 85 | sgLAMA1-62 | 7036571 | 1 | AAAATTAAGATTTTCTTTCTG | ATGGGT |
| 86 | sgLAMA1-63 | 7036752 | -1 | AACTTGTTTTGTATATTTTTA | AGGAGT |
| 87 | sgLAMA1-64 | 7036914 | 1 | TAATAATTGAGATGCATTCTC | GGGAAT |
| 88 | sgLAMA1-65 | 7037090 | -1 | AAGCTCACATTTAGGAACAGA | TGGAAT |
| 89 | sgLAMA1-66 | 7037255 | 1 | CTATGGCAAACTAAACAAAGC | GGGAAT |
| 90 | sgLAMA1-67 | 7037380 | 1 | CAGAAGAGCAGAAGTTCTTAT | TTGAAT |
| 91 | sgLAMA1-68 | 7037560 | 1 | CATCTGAGACATCGCTACCTG | CAGGGT |
| 92 | sgLAMA1-69 | 7037764 | 1 | GTTTACCTTAAAAACAAATTC | AAGAAT |
| 93 | sgLAMA1-70 | 7037921 | -1 | CTCCTGGTCCTTTACAAGTGG | AAGGGT |
| 94 | sgLAMA1-71 | 7038098 | -1 | AGCAGGGGGCAACGAAGAAGA | GGGAGT |
| 95 | sgLAMA1-72 | 7038321 | -1 | TTCTGGGGTGATGGGTTCAAC | AGGGGT |
| 96 | sgLAMA1-73 | 7038461 | -1 | CCCAGAGGGCCGTGGGGCCAT | GGGGAT |
| 97 | sgLAMA1-74 | 7038616 | 1 | TTTCCATAGAGAAATGTGTGT | GGGAGT |
| 98 | sgLAMA1-75 | 7038791 | -1 | TGGGAGGCGCCATCTGCGCGG | CGGGAT |
| 99 | sgLAMA1-76 | 7038956 | 1 | CCTCAACGTTTTCCTGTAAGT | TAGGGT |
| 100 | sgLAMA1-77 | 7039150 | -1 | CTAAGATCTCCAGCCTTGTTC | TTGAGT |
| 101 | sgLAMA1-78 | 7039333 | 1 | TGTGCCTAAGACTGCACAGGT | GGGAAT |
| 102 | sgLAMA1-79 | 7039484 | -1 | ATTAAACGCAGATATGCTATT | TTGAGT |
| 103 | sgLAMA1-80 | 7039657 | 1 | TCATAGAAAATACATAAGCAA | ATGGAT |
| 104 | sgLAMA1-81 | 7039843 | 1 | AAGAAGTCACAGAAATGCCTC | TGGAAT |
| 105 | sgLAMA1-82 | 7039952 | 1 | GGCTTGGAGAGAAGGGGCAAG | GGGAGT |
| 106 | sgLAMA1-83 | 7040120 | 1 | GCTCATCACTGGCACTGCCCA | CTGGGT |
| 107 | sgLAMA1-84 | 7040269 | -1 | TAAACCTCTTTTGCCTTCATG | TTGGGT |
| 108 | sgLAMA1-85 | 7040446 | -1 | TTCTTATGAATAAAGTTTTAT | TGGAAT |
| 109 | sgLAMA1-86 | 7040616 | 1 | CTTCTTCAAAATGTTAAGTTA | TAGAGT |
| 110 | sgLAMA1-87 | 7040759 | 1 | CAAATGTTCATCAACTGATGA | ATGGAT |

TABLE 1-4-continued

| SEQ ID NO | | Position | Strand | Sequence | PAM |
|---|---|---|---|---|---|
| 111 | sgLAMA1-88 | 7040923 | 1 | ATATGGTTCCATTTCTAAGTT | CAGAAT |
| 112 | sgLAMA1-89 | 7041094 | 1 | TTGCACCAATACACCAAAACA | ATGAAT |

TABLE 1-5

| SEQ ID NO | | Position | Strand | Sequence | PAM |
|---|---|---|---|---|---|
| 113 | sgLAMA1-90 | 7041271 | 1 | ACTGCTCTGAGCTACAGCAAA | GTGGGT |
| 114 | sgLAMA1-91 | 7083904 | -1 | TTTTTGTAATTTTAGTAGAGA | TGGAGT |
| 115 | sgLAMA1-92 | 7084051 | 1 | ACTGCACTCCAGCCTGGGCAA | CAGAGT |
| 116 | sgLAMA1-93 | 7084208 | 1 | CTTTTTGCCCAGACTGGTAAA | TAGAAT |
| 117 | sgLAMA1-94 | 7084386 | 1 | TTGGTTTTACACATAAAAATC | AAGGGT |
| 118 | sgLAMA1-95 | 7084554 | 1 | TCTTCCACTCAGGACACACAA | TGGAAT |
| 119 | sgLAMA1-96 | 7084739 | -1 | TTTTTCACCTAATGTTTATAA | GAGAAT |
| 120 | sgLAMA1-97 | 7084861 | 1 | GGTTTTTGGATTTCTTCCCAG | CAGAAT |
| 121 | sgLAMA1-98 | 7085088 | -1 | AACATCACCTTGATTTTGAGT | ATGGAT |
| 122 | sgLAMA1-99 | 7085235 | 1 | ATCAGGGTGGCTTCTGGTGTT | GGGAGT |
| 123 | sgLAMA1-100 | 7085399 | -1 | AAAGAAGAAGAAGAAGAAAAA | AAGAGT |
| 124 | sgLAMA1-101 | 7085573 | -1 | AAAAATTAGCCGGGCTTGGTG | GCGGGT |
| 125 | sgLAMA1-102 | 7085749 | -1 | AAATTATAGATGTTCACTTGG | GCGAAT |
| 126 | sgLAMA1-103 | 7085927 | -1 | AATACCTTGATATTATTATCC | TGGAAT |
| 127 | sgLAMA1-104 | 7086068 | 1 | TATGCGTCAGAAAAAGCGGCT | GAGAAT |
| 128 | sgLAMA1-105 | 7086231 | 1 | GAGAAGCTTCTTCTCACCGAT | GTGGAT |
| 129 | sgLAMA1-106 | 7086447 | -1 | GGAAGGATGAATAGGGCGTGA | ATGGAT |
| 130 | sgLAMA1-107 | 7118531 | -1 | CGCCTCGGCCTCCCAAAGTGC | TGGAAT |
| 131 | sgLAMA1-108 | 7118543 | 1 | CCAGCACTTTGGGAGGCCGAG | GCGGGT |
| 132 | sgLAMA1-109 | 7118547 | 1 | CACTTTGGGAGGCCGAGGCGG | GTGGAT |
| 133 | sgLAMA1-110 | 7118564 | 1 | GCGGGTGGATCACTTGAGGTC | AGGAGT |
| 134 | sgLAMA1-111 | 7118684 | 1 | CTACTTGGGAGGCTGAGGCAG | GAGAAT |
| 135 | sgLAMA1-112 | 7118925 | 1 | AGATAATTTCCTCTCACTTGT | GTGAAT |
| 136 | sgLAMA1-113 | 7118953 | -1 | CCTCAGAAAAACAGGAATTGA | TAGAGT |
| 137 | sgLAMA1-114 | 7119088 | 1 | AAAAGGATGCAATATAGTTCA | GTGAAT |
| 138 | sgLAMA1-115 | 7119106 | -1 | CATTTTAAATTTAGTACTGTA | TGGAGT |
| 139 | sgLAMA1-116 | 7119229 | 1 | AGGCACATAGCTATTAAAATG | CAGAAT |
| 140 | sgLAMA1-117 | 7119291 | -1 | AGATCCCAAAAGATAATCTAT | ATGAAT |

TABLE 1-6

| SEQ ID NO | | Position | Strand | Sequence | PAM |
|---|---|---|---|---|---|
| 141 | sgLAMA1-118 | 7119298 | 1 | GCATTCATATAGATTATCTTT | TGGGAT |
| 142 | sgLAMA1-119 | 7119498 | -1 | CGCCTCGGCCTCCCAAAGTGC | TGGGAT |
| 143 | sgLAMA1-120 | 7119510 | 1 | CCAGCACTTTGGGAGGCCGAG | GCGGGT |
| 144 | sgLAMA1-121 | 7119514 | 1 | CACTTTGGGAGGCCGAGGCGG | GTGGAT |
| 145 | sgLAMA1-122 | 7119577 | -1 | TTTTTGTATTTTTAGTGGAGA | CGGGGT |
| 146 | sgLAMA1-123 | 7119676 | -1 | GCTCACTGCAAGCTCCGCCTC | CCGGGT |
| 147 | sgLAMA1-124 | 7119720 | -1 | GTCTTGCTCTGTCGCCCAGGC | GGGGGT |
| 148 | sgLAMA1-125 | 7119799 | 1 | CACAAGGGGTGTCCCCATATT | CTGGGT |
| 149 | sgLAMA1-126 | 7119874 | 1 | CCTTATCTTTGAACTGCAAGC | AGGGAT |
| 150 | sgLAMA1-127 | 7120066 | -1 | GCAGGGTTTTTAGAAGATGTG | TAGAAT |
| 151 | sgLAMA1-128 | 7120425 | -1 | AATCAGAATGTCTATGTTATT | TGGAAT |
| 152 | sgLAMA1-129 | 7121290 | -1 | CGCCTCAGCCTCCCAAAGTGC | TGGGAT |
| 153 | sgLAMA1-130 | 7121302 | 1 | CCAGCACTTTGGGAGGCTGAG | GCGGGT |
| 154 | sgLAMA1-131 | 7121306 | 1 | CACTTTGGGAGGCTGAGGCGG | GTGGAT |
| 155 | sgLAMA1-132 | 7121367 | -1 | TTTTTGTATTTTTAGTAGAGA | TGGGAT |
| 156 | sgLAMA1-133 | 7121433 | -1 | CCATTCTCCTGCCTCAGCCTC | CTGAGT |
| 157 | sgLAMA1-134 | 7121440 | 1 | CTACTCAGGAGGCTGAGGCAG | GAGAAT |
| 158 | sgLAMA1-135 | 7121465 | -1 | GCTCACTGCAAGCTCCGCCTC | CCGGGT |
| 159 | sgLAMA1-136 | 7121921 | -1 | GTGGGCAGATCACTTGAGCTC | AGGAGT |
| 160 | sgLAMA1-137 | 7121954 | 1 | CACCTCAGCCTCCCAAAGTGC | TGGAAT |
| 161 | sgLAMA1-138 | 7121960 | 1 | AGCCTCCCAAAGTGCTGGAAT | ATGAAT |
| 162 | sgLAMA1-139 | 7122097 | -1 | GGATTTCAACAGGATCACCCA | AGGGAT |
| 163 | sgLAMA1-140 | 7122109 | -1 | GAACTAGAATCTGGATTTCAA | CAGGAT |
| 164 | sgLAMA1-141 | 7122580 | 1 | CAGGGATCCAGCCACGGTGCC | CAGAAT |
| 165 | sgLAMA1-142 | 7122781 | 1 | TACTAGAATTGGTTATGGTGT | CAGAGT |
| 166 | sgLAMA1-143 | 7123039 | 1 | ACTTTGCAGATGTGATTAAAT | AAGAGT |
| 167 | sgLAMA1-144 | 7123299 | 1 | AGAGCCAGCTGTAAGGACACC | TTGAGT |
| 168 | sgLAMA1-145 | 7123333 | 1 | GGTGAAACCCATTTTGGACTT | TGGAAT |

TABLE 1-7

| SEQ ID NO | | Position | Strand | Sequence | PAM |
|---|---|---|---|---|---|
| 169 | sgLAMA1-146 | 7123349 | -1 | TGTATTGTTATCTTATAGTTC | CGGAAT |
| 170 | sgLAMA1-147 | 7123614 | 1 | AATACTGGAAAAAGAGAAGG | AAGAAT |
| 171 | sgLAMA1-148 | 7123630 | 1 | GAAGGAAGAATAGAGGTCTCA | GAGGAT |
| 172 | sgLAMA1-149 | 7124039 | -1 | GAAGAGAGCCCTCACCAGAAA | CTGAAT |
| 173 | sgLAMA1-150 | 7124152 | 1 | CTTACAAGAACACAAATCCTA | TTGGAT |
| 174 | sgLAMA1-151 | 7124158 | -1 | AAGAATGGGGCTCTGATCCAA | TAGGAT |
| 175 | sgLAMA1-152 | 7124399 | 1 | TAGTATTTTACATTTACATAG | CTGAAT |

TABLE 1-7-continued

| SEQ ID NO | | Position | Strand | Sequence | PAM |
|---|---|---|---|---|---|
| 176 | sgLAMA1-153 | 7124588 | -1 | ATGGGGATATTTTATAGTAAA | GTGAGT |
| 177 | sgLAMA1-154 | 7124952 | 1 | GCATCTCCCTAAAGCCAAGGA | GTGGAT |
| 178 | sgLAMA1-155 | 7125095 | 1 | AGGAAGAGGAAGCCAAATTGG | AGGGGT |
| 179 | sgLAMA1-156 | 7125162 | -1 | CCAGCAGGCAGGGATGTCCTG | CAGAGT |
| 180 | sgLAMA1-157 | 7125173 | 1 | TCTGCAGGACATCCCTGCCTG | CTGGGT |
| 181 | sgLAMA1-158 | 7125398 | -1 | CTACTCGGGAGGCTGAGGCAG | GAGAAT |
| 182 | sgLAMA1-159 | 7125405 | 1 | TGATTCTCCTGCCTCAGCCTC | CCGAGT |
| 183 | sgLAMA1-160 | 7125778 | 1 | GCTCACTGCAAGCTCTGCCTC | CTGGGT |
| 184 | sgLAMA1-161 | 7125803 | -1 | CTACTCGGGAGGCTGAGGCAG | GAGAAT |
| 185 | sgLAMA1-162 | 7125810 | 1 | CCATTCTCCTGCCTCAGCCTC | CCGAGT |
| 186 | sgLAMA1-163 | 7125876 | 1 | TTTTTGTATTTTTAGTAGAGA | TGGGGT |
| 187 | sgLAMA1-164 | 7126146 | -1 | TACTAAAAATACAAAAATTAG | CTGGGT |
| 188 | sgLAMA1-165 | 7126226 | -1 | CACTTTGGGAGGCCGAGGTGG | GCGGAT |
| 189 | sgLAMA1-166 | 7126242 | 1 | CACCTCGGCCTCCCAAAGTGC | TGGGAT |
| 190 | sgLAMA1-167 | 7126341 | -1 | AACCTAAAGTGTAAAATATTG | TAGAAT |
| 191 | sgLAMA1-168 | 7126472 | -1 | CACTAAGCCAATGCCAGGTTT | ACGAGT |
| 192 | sgLAMA1-169 | 7126973 | -1 | GCTCACTGCAACCTCTGCCTC | CCGGGT |
| 193 | sgLAMA1-170 | 7127255 | -1 | GTGGGCAGGAGTTGAAATGAG | ATGGGT |
| 194 | sgLAMA1-171 | 7127361 | -1 | GGAAACGCAGCTGAGCTCTGA | AAGGAT |
| 195 | sgLAMA1-172 | 7127500 | -1 | CCACAAGGGAGCAAGTGGTTG | GTGAGT |
| 196 | sgLAMA1-173 | 7127869 | 1 | AAACAAAGGCAAGTTAATCAG | AGGGAT |

TABLE 1-8

| SEQ ID NO | | Position | Strand | Sequence | PAM |
|---|---|---|---|---|---|
| 197 | sgLAMA1-174 | 7127900 | 1 | CAGCAGGGAGAATGGGGATCA | TAGAAT |
| 198 | sgLAMA1-175 | 7127948 | 1 | GGCTTGGAAAACAGGAACCAA | GAGAGT |
| 199 | sgLAMA1-176 | 7128039 | -1 | ACATTTGAAGGTCAGACAGCT | CCGGGT |
| 200 | sgLAMA1-177 | 7128335 | 1 | GGACAGGAAGAGCTCCACGAA | GGGGGT |
| 201 | sgLAMA1-178 | 7128691 | 1 | GGTCAGTTTACTCCCCATGGG | ATGAAT |
| 202 | sgLAMA1-179 | 7129028 | -1 | TCTCACTAATTGCTCCATGCA | AAGGGT |
| 203 | sgLAMA1-180 | 7129350 | 1 | GTCTTGCTCTGTCACCCAGGC | TGGAGT |
| 204 | sgLAMA1-181 | 7129419 | -1 | CTACTTGGGAGGCTGAGGCAG | GAGAAT |
| 205 | sgLAMA1-182 | 7129637 | 1 | TTTTTGTATTTTTAGTAGAGA | CCGGGT |
| 206 | sgLAMA1-183 | 7129700 | -1 | CACTTTGGGAGGCTGAGGCAG | GTGGAT |
| 207 | sgLAMA1-184 | 7129971 | 1 | GAAACATGACTTAGTGACTAA | TTGGAT |
| 208 | sgLAMA1-185 | 7130158 | -1 | CAGCCACAATCTCCATCTGTC | TTGAAT |
| 209 | sgLAMA1-186 | 7130601 | 1 | GCTCACTGCAACCTCTGCTTC | CTGGGT |

TABLE 1-8-continued

| SEQ ID NO | | Position | Strand | Sequence | PAM |
|---|---|---|---|---|---|
| 210 | sgLAMA1-187 | 7130626 | -1 | CTACTTGGGAGGCTGAGGCAG | GAGAAT |
| 211 | sgLAMA1-188 | 7130642 | 1 | TGCCTCAGCCTCCCAAGTAGC | TGGGAT |
| 212 | sgLAMA1-189 | 7130863 | -1 | CAAGCAGGTTAGCCAGCCTCT | GTGAAT |
| 213 | sgLAMA1-190 | 7130875 | 1 | CACAGAGGCTGGCTAACCTGC | TTGAGT |
| 214 | sgLAMA1-191 | 7131160 | 1 | GTCAAAGGAAGCTGATAGATC | AAGAAT |
| 215 | sgLAMA1-192 | 7131185 | 1 | ATTAGAAATTTAAAACAAAAT | GAGAAT |
| 216 | sgLAMA1-193 | 7131459 | 1 | AATCAAGATGAATCCAGGCAG | AGGGGT |
| 217 | sgLAMA1-194 | 7132323 | 1 | AAGCTTATTATTGGAGCAGCT | TGGGGT |
| 218 | sgLAMA1-195 | 7132372 | -1 | AAAGAACCTCCCCATCCTAGC | ACGGAT |
| 219 | sgLAMA1-196 | 7132450 | -1 | GTAAAGTTCTCATTCCACACC | TGGAAT |
| 220 | sgLAMA1-197 | 7132830 | -1 | AAGGTTAATATGAGAATCTGT | TTGAAT |
| 221 | sgLAMA1-198 | 7132967 | -1 | TCTTTAGGTCCTAGATACCTT | AGGAAT |

In Table 1, "Position" indicates the potential SaCas9 cleavage site for all shown gRNAs when SaCas9 is used.

SEQ ID NOs: 1-61 are located in the TSS region, SEQ ID NOs: 85-113 are located in the R1 region, SEQ ID NOs: 114-129 are located in R2 region and SEQ ID NOs: 130-221 are located cyno-matched region (FIG. 1).

Construction of Lentiviral Transfer Plasmid (pED176 and Derivative Plasmid)

pLentiCRISPR v2 was purchased from Genscript (https://www.genscript.com) and the following modifications were made: the SpCas9 gRNA scaffold sequence was replaced by SaCas9 gRNA scaffold sequence; SpCas9-FLAG was replaced with dSaCas9 fused to codon optimized VP64-miniRTA (also referred to as mini-VR). VP64-miniRTA transcriptional activation domains can activate gene expression when localized to promoters by activating transcription. VP64-miniRTA was tethered to the C-terminus of dSaCas9 (D10A and N580A mutant), which is referred to as dSaCas9-VR hereinafter, and targeted to human LAMA1 gene regulatory regions as directed by targeting sequences (Table 1, FIG. 1). The generated backbone plasmid was named pED176. We also generated derivative plasmid by replacing mini-VR with other activation domains: VP64-EBNA2, VP160, VP64-nanoRTA, VP64-microRTA.

gRNA Cloning

Three control non-targeting targeting sequences and 164 targeting sequences (Table 1) were cloned into pED176. Forward and reverse oligos were synthesized by Integrated DNA Technologies in the following format: Forward; 5' CACC(G)-20 basepair targeting sequence-3', and Reverse: 5' AAAC-19-21 basepair reverse complement targeting sequence-(C)-3', where bases in parenthesis were added if the target did not begin with a G. Oligos were resuspended in Tris-EDTA buffer (pH 8.0) at 100 μM. 1 μl of each complementary oligo were combined in a 10 μl reaction in NE Buffer 3.1 (NEB catalog number: B7203S). The reaction was heated to 95° C. and allowed to cool to 25° C. in a thermocycler, thus annealing oligos with sticky end overhangs compatible with cloning to pED176. Annealed oligos were combined with lentiviral transfer plasmid pED176 which had been digested with BsmBI and gel purified, and ligated with T4 DNA ligase (NEB catalog number: M0202S) according to manufacturer's protocol. 2 μl of the ligation reaction was transformed into 10 μl of NEB Stable Competent cells (NEB catalog number: C3040I) according to the manufacturer's protocol. The resulting construct drives expression of sgRNAs comprising crRNA encoded by individual targeting sequences fused with tracrRNA (SEQ ID NO: 83) by a U6 promoter.

Lentivirus Generation

HEK293TA cells were seeded at $0.75 \times 10^6$ cells/well in 6 well cell culture dishes (VWR catalog number: 10062-892) in 2 ml growth medium (DMEM media supplemented with 10% FBS and 2 mM fresh L-glutamine, 1 mM sodium pyruvate and non-essential amino acids) and incubated at 37° C./5% $CO_2$ for 24 hours. The next day TransIT-Virus-GEN transfection reactions were set up according to manufacturer's protocol with 1.5 μg packaging plasmid mix [1 μg packaging plasmid (see pCMV delta R8.2; addgene #12263) and 0.5 μg envelope expression plasmid (see pCMV-VSV-G; addgene #8454)] and 1 μg of transfer plasmid containing sequence encoding dSaCas9-VR and indicated sgRNAs. Lentivirus was harvested 48 hours following transfection by passing media supernatant through a 0.45 μM PES filter (VWR catalog number: 10218-488). Until ready to use, the purified and aliquoted lentiviruses were stored in −80° C. freezer.

Transduction of HSMM Cells

Primary skeletal muscle myoblast cells (HSMM) from 5 different human donors of age varying from 0-26 years (referred to as Donor #3, Donor #5, Donor #121, Donor #368, Donor #617 respectively) were obtained from Lonza Inc. The cells were cultured in primary skeletal muscle cell growth medium [SkGM-2 Skeletal Muscle Growth Bullet-Kit medium (Lonza #CC-3244 & CC-3246)]. For transduction, cells were seeded at $0.125$-$0.33 \times 10^6$ cells/well in 6 well cell culture dishes (VWR catalog number: 10062-894) containing growth medium and incubated at 37° C./5% $CO_2$ for 24 hours. The next day, 1.5 ml growth medium supplemented with 8 μg/ml Polybrene (Sigma catalog number: TR-1003-G) and 1.0 ml lentivirus supernatant (see above) corresponding to each sgRNA comprising crRNA encoded by individual targeting sequences (Table 1) and tracrRNA was added to each well. Cells were incubated with lentivirus for 6 hours before viral media was removed and replaced with fresh growth medium. 72 hours after transduction, cells were fed selection medium [growth media supplemented with 0.5 µg/ml puromycin (Sigma Aldrich catalog number: P8833)]. Cells were given fresh selection medium every 2-3 days. Following 7-10 days of cells being in selection medium, cells were harvested and RNA extracted with RNeasy 96 kit (Qiagen catalog number: 74182) as directed by manufacturer.

Gene Expression Analysis

For gene expression analysis, cDNA was generated from ~0.5-0.8 µg of total RNA according to High-Capacity cDNA Reverse Transcription Kit (Applied Biosystems; ThermoFisher catalog number: 4368813) protocol in a 10 µl volume. cDNA was diluted 10-fold and analyzed using Taqman Fast Advanced Master Mix according to manufacturer's protocol. Taqman probes (LAMA1: Assay Id Hs01074489_m1 FAM; HPRT: Assay Id Hs99999909_m1 VIC_PL) were obtained from Life Technologies. Taqman probe-based real-time PCR reactions were processed and analyzed by QuantStudio 5 Real-Time PCR system as directed by Taqman Fast Advanced Master Mix protocol.

After 7 days under puromycin selection, total protein from transduced HSMM cells were extracted by using QIAGEN Allprep Protein/RNA kit (Qiagen #80404) as directed by manufacturer, and subsequently quantified and normalized to 1 µg/µL final concentration. 20 µg of each protein solution was separated on NuPAGE Tris-Acetate 3-8% mini gel (FisherSci EA0375BOX) and then transferred to a PVDF membrane (Bio-Rad) at 35V at 4 C for 70 minutes. This was subsequently incubated 1 hr at RT in SuperBlock T20 (PBS) blocking buffer (LifeTech 37516) to block non-specific interaction sites. Afterward, the membrane was incubated overnight at 4° C. with antiLAMA1 antibody (1:100) (Santa Cruz Bio sc-74417) or anti-b-actin antibody (1:10000) (LifeTech MA1-140). The membrane was washed three times for 10 min with agitation in the washing solution (1×TBS and 0.05% of Tween 20) to remove the excess or loosely bound antibody following nonspecific binding. Goat immunoglobulin anti-mouse coupled with horseradish peroxidase (HRP; LifeTech), diluted 1:10,000 in blocking solution, was incubated on the membrane for 1 hr at RT with stirring. Another series of three washes was done before soaking the membrane for 1 min in SuperSignal West Femto Maximum Sensitivity Substrate (LifeTech 34094). The result was visualized by Azure C400.

Data Analysis

For each sample and three controls, deltaCt values were calculated by subtracting the average Ct values from 3 technical replicates of the LAMA1 probe from the HPRT probe (Average Ct LAMA1−Average Ct HPRT). Expression values were determined for each sample using the formula $2^{-(deltaCt)}$. Sample expression values were then normalized to the average of 3 control expression values for each experiment to determine the relative LAMA1 expression for each sample.

Results

Activation of LAMA1 Gene Expression by the dSaCas9-VR:sgRNA

Lentivirus was produced that deliver expression cassettes for VP64-miniRTA and sgRNAs for each targeting sequence to primary HSMM cells. Transduced cells were selected for resistance to puromycin, and LAMA1 expression was quantitated using the Taqman Assay. Expression values from each sample were normalized to an average of LAMA1 expression in cells transduced with control sgRNAs.

Figure 2:
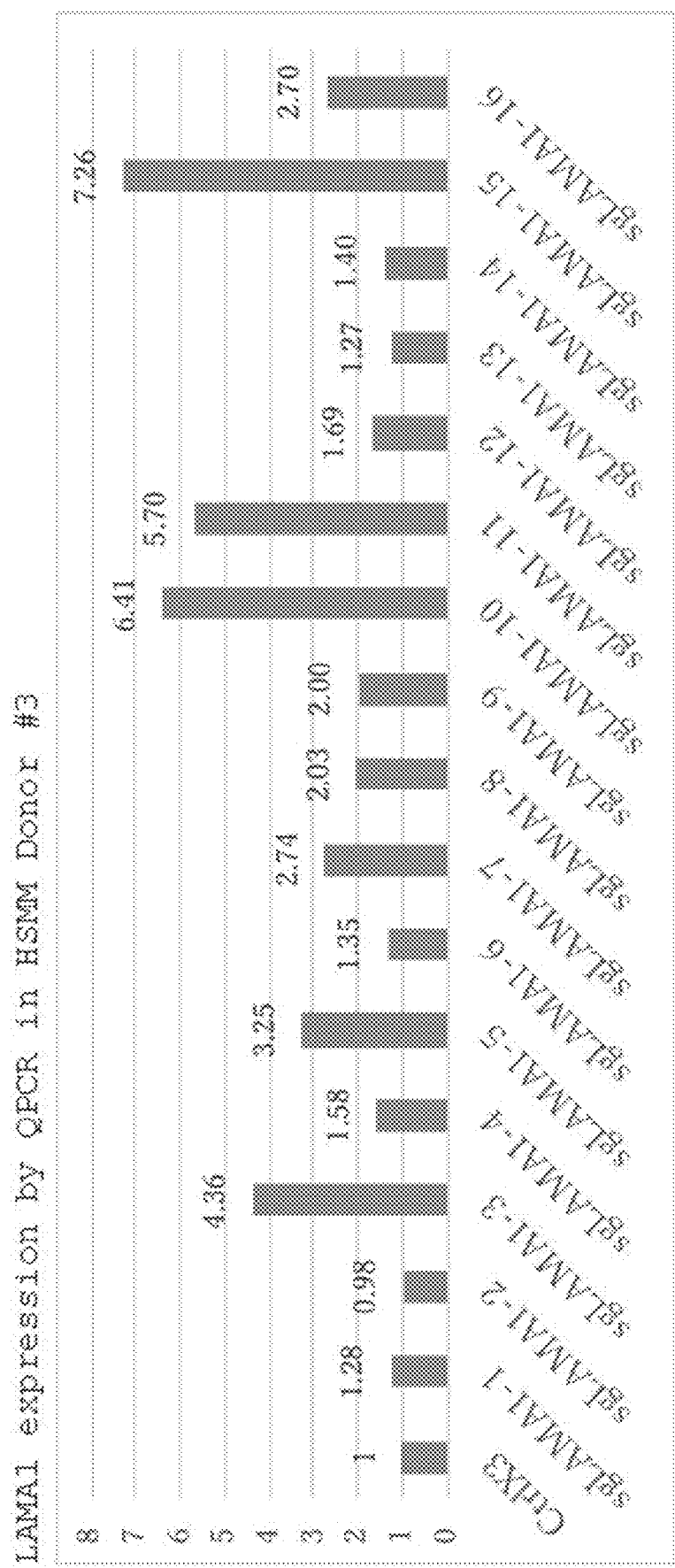
FIG. 2 shows the evaluation results of an expression enhancing action on human LAMA1 gene in primary skeletal muscle myoblasts (HSMM cells) derived from donor #3 by using sgRNA containing crRNA encoded by the targeting sequence shown in SEQ ID NOs: 1 to 16 and mini-VR. The horizontal axis shows sgRNA containing crRNA encoded by each targeting sequence, and the vertical axis shows the ratio of the expression level of LAMA1 gene when using each sgRNA to that when using control sgRNA as 1.
Figure 3:
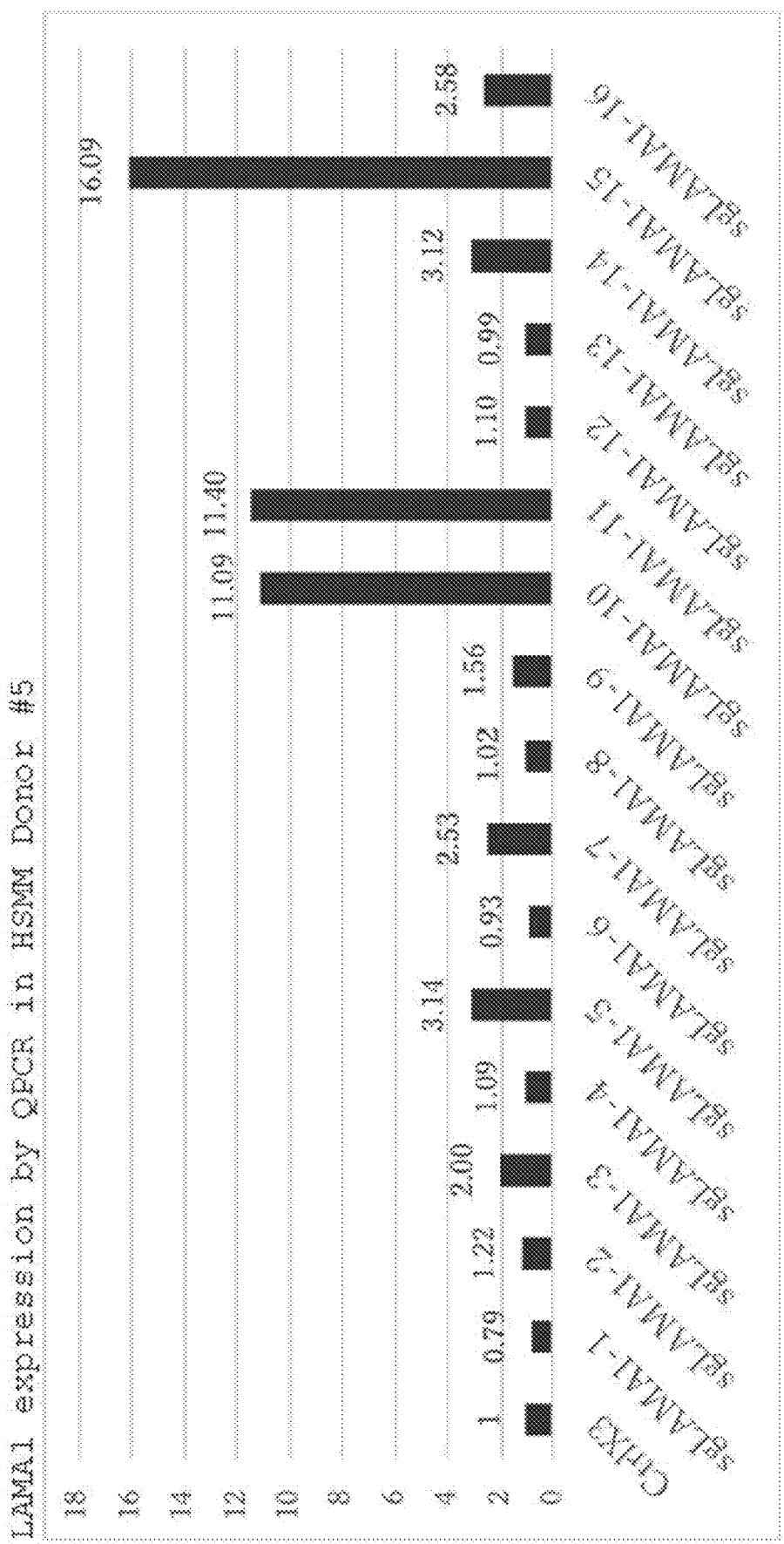
FIG. 3 shows the evaluation results of an expression enhancing effect on human LAMA1 gene in primary HSMM cells derived from donor #5 by using sgRNA containing crRNA encoded by the targeting sequences shown in SEQ ID NOs: 1 to 16 and mini-VR. The horizontal axis shows sgRNA containing crRNA encoded by each targeting sequence, and the vertical axis shows the ratio of the expression level of LAMA1 gene when using each sgRNA to that when using control sgRNA as 1.

As shown in FIG. 2, out of 16 tested sequences, 3 targeting sequences showed ~5-7 folds upregulation of LAMA1 mRNA expression in HSMM donor #3 cells (FIG. 2), and the same 3 sequences showed ~11-16 folds upregulation in donor #5 cells (FIG. 3).

Figure 4:
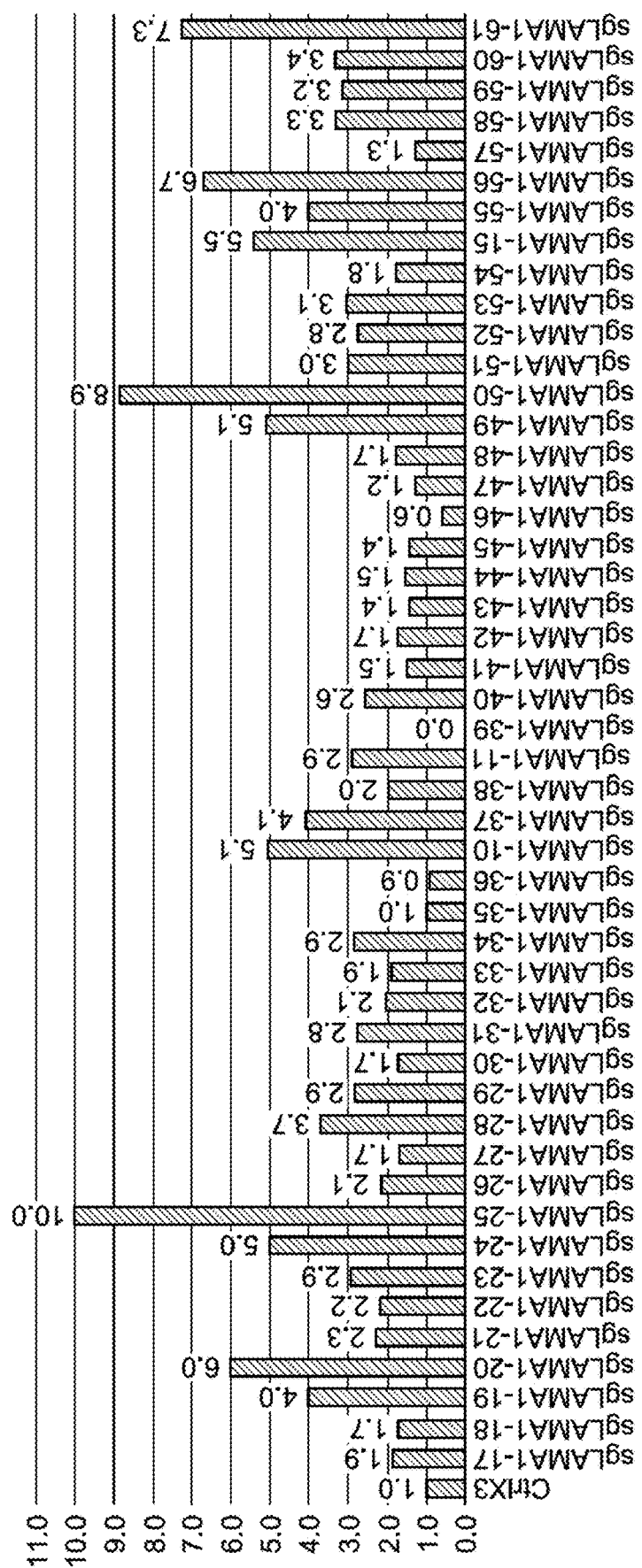
FIG. 4 shows the evaluation results of an expression enhancing action on human LAMA1 gene in primary HSMM cells derived from donor #3 by using sgRNA containing crRNA encoded by the targeting sequence shown in SEQ ID NOs: 10, 11, 15, 17-61 and mini-VR. The horizontal axis shows sgRNA containing crRNA encoded by each targeting sequence, and the vertical axis shows the ratio of the expression level of LAMA1 gene when using each sgRNA to that when using control sgRNA as 1.

After seeing promising upregulation results from the first screening with 16 sgRNAs (SEQ ID Nos. 1-16), we kept on designing and screened for additional 45 sgRNAs (SEQ ID Nos. 17-61) in the same region, and identified new potent sgRNAs that is almost twice potent as sgRNA 15, such as sgRNA 25 and sgRNA 50 (FIG. 4).

Figure 5:
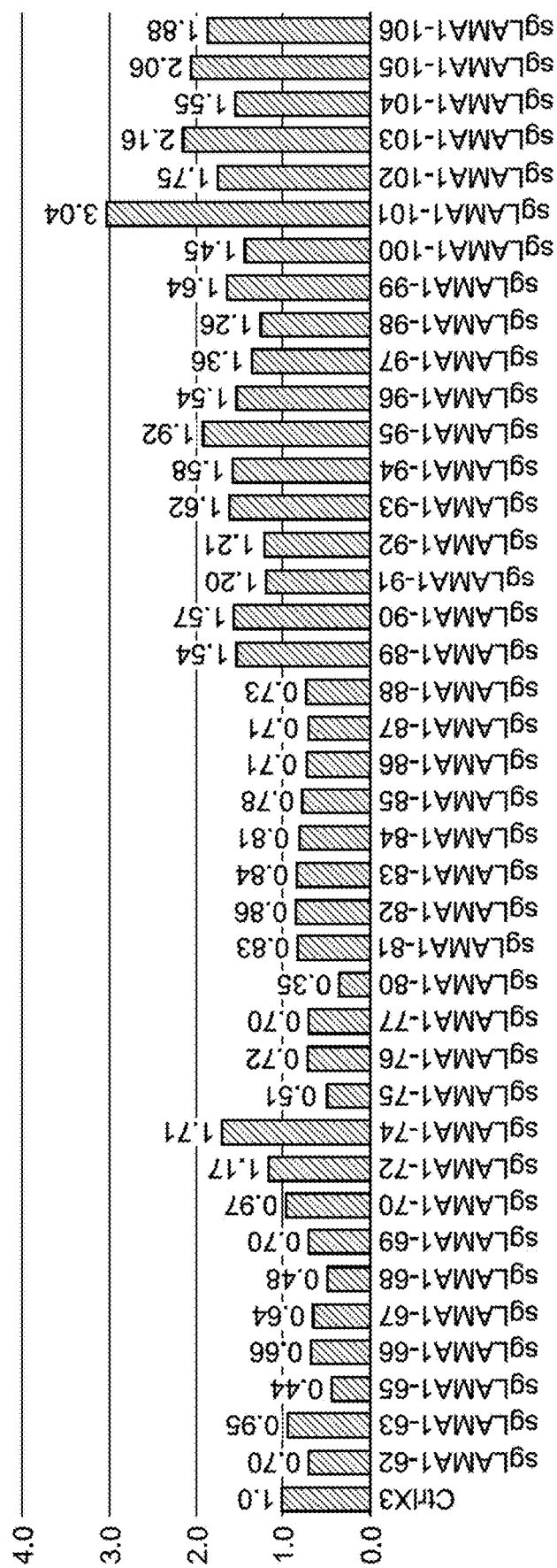
FIG. 5 shows the evaluation results of an expression enhancing action on human LAMA1 gene in primary HSMM cells derived from donor #3 by using sgRNA containing crRNA encoded by the targeting sequence located in R1 or R2 region and mini-VR. The horizontal axis shows sgRNA containing crRNA encoded by each targeting sequence, and the vertical axis shows the ratio of the expression level of LAMA1 gene when using each sgRNA to that when using control sgRNA as 1.

As shown in FIG. 5, out of 40 tested sequences in R1 and R2, only gRNA #101 showed more than 3-fold upregulation of LAMA1 mRNA expression in HSMM Donor #3 cells.

Figure 6:
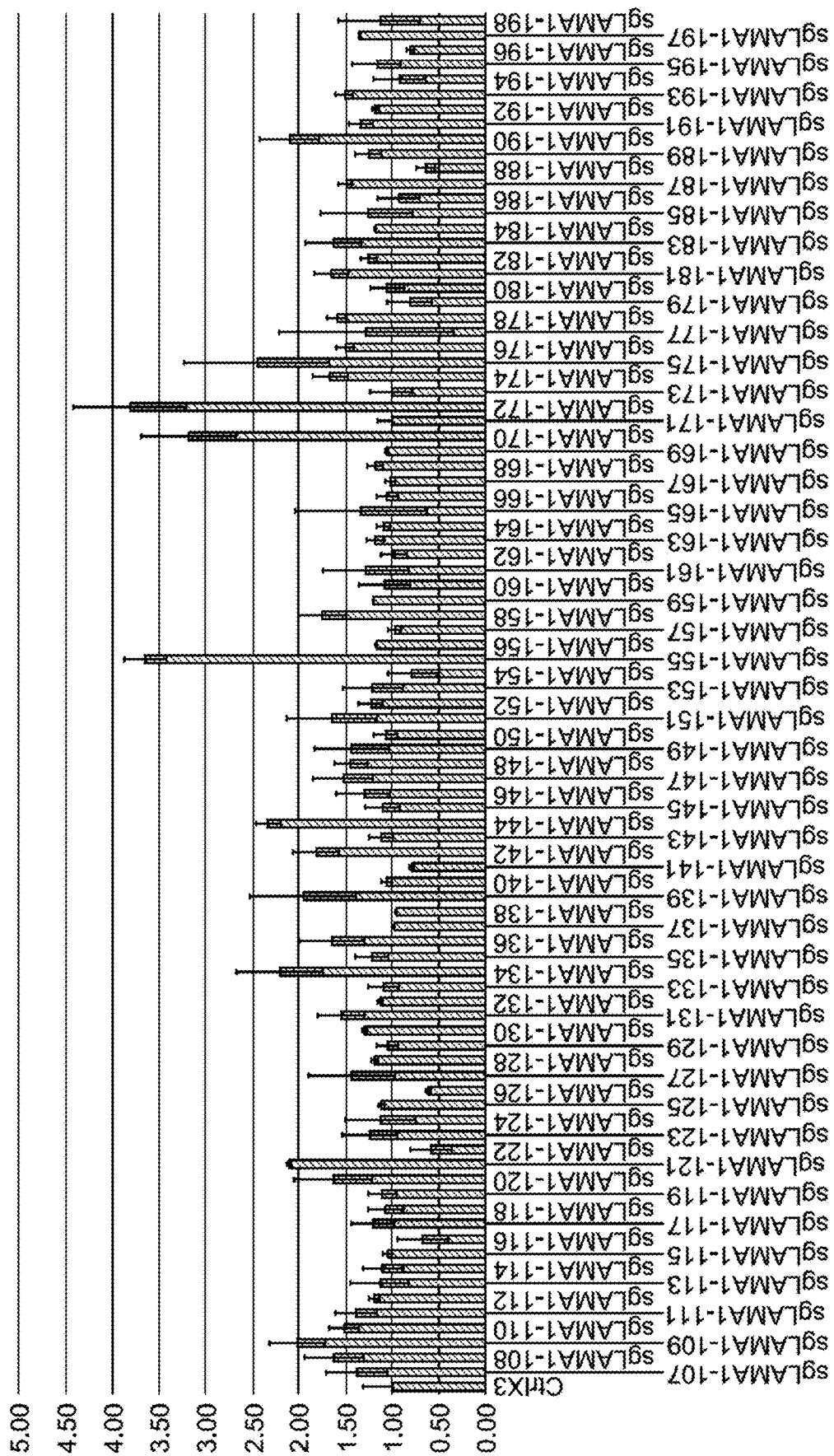
FIG. 6 shows the evaluation results of an expression enhancing action on human LAMA1 gene in primary HSMM cells (derived from donor #3, #121, #368, #617) by using sgRNA containing crRNA encoded by the targeting sequence shown in SEQ ID NOs: 130-221 and mini-VR. The horizontal axis shows sgRNA containing crRNA encoded by each targeting sequence, and the vertical axis shows the ratio of the expression level of LAMA1 gene when using each sgRNA to that when using control sgRNA as 1.

As shown in FIG. 6, out of 92 tested guide sequences located upstream of LAMA1 TSS, handful of these guides were capable to upregulate LAMA1 expression level to 2-fold or higher. Three most potent guide sequences namely gRNA #155 gRNA #170 and gRNA #172 were included in the following validation experiments tested with primary HSMM cells with four different origins, three biological replicates were included for each treatment condition: 1. non-viral transduced; 2. dSaCas9-VR without sgRNA transduced; 3. dSaCas9-VR with non-targeting sgRNA transduced; 4. dSaCas9-VR with gRNA #155 transduced; 5. dSaCas9-VR with gRNA #170 transduced; 6. dSaCas9-VR with gRNA #172 transduced. As shown in FIG. 7, all three sgRNAs were able to upregulate LAMA1 expression level to higher level consistently (at least 3.5-fold) across all primary HSMM cells with four different origins. And we observed varied upregulation potency between different HSMM origins (eg. ~3.5-fold in Donor #121 compared to >35-fold in Donor #368), which was likely due to different basal expression level of LAMA1 (FIG. 8).

Next, we went on testing if these sgRNAs could upregulate LAMA1 level with different activation moieties. As shown in FIG. 9, VP160, nanoVR, microVR and miniVR were all able to upregulate LAMA1 expression by more than 3-fold, VP64-MyoD was able to upregulate LAMA1 expression by around 2-fold. In the meanwhile, to examine if upregulation of LAMA1 mRNA level translates to protein level elevation, we extracted total proteins from samples with microVR and carried out western blot assay. As shown in FIG. 10, in two separate HSMM cell origins, all three sgRNA were able to increase LAMA1 protein level by at least 1.7-fold.

All patents and other references mentioned above are incorporated in full herein by this reference, the same as if set forth at length.

Industrial Applicability

According to the present invention, the expression of LAMA1 gene in muscle cell derived from a MDC1A patient can be upregulated. Thus, the present invention is expected to be extremely useful for the treatment and/or prevention of MDC1A.

This application is based on U.S. provisional patent application No. 62/887,863 (filing date: Aug. 16, 2019), and U.S. provisional patent application No. 63/008,059 (filing date: Apr. 10, 2020), both filed in US, the contents of which are incorporated in full herein.

The invention claimed is:

1. A polynucleotide comprising the following base sequences:
   (a) a base sequence encoding a fusion protein of a nuclease-deficient CRISPR effector protein and a transcription activator, and
   (b) a base sequence encoding a guide RNA:
   (i) hybridizing with one of SEQ ID NO: 15, 20, 25, 50, 56, or 61, or
   (ii) hybridizing with SEQ ID NO: 124, or
   (iii) hybridizing with one of SEQ ID NO: 178, 193, or 195, in the expression regulatory region of human LAMA1 gene;
   wherein the nuclease-deficient CRISPR effector protein is dCas9; and
   wherein the dCas9 is derived from *Staphylococcus aureus*.

2. The polynucleotide according to claim 1, wherein the transcription activator is selected from the group consisting of VP64, VP160, VPH, VPR, VP64-miniRTA (miniVR), and microVR.

3. The polynucleotide according to claim 2, wherein the transcription activator is miniVR.

4. The polynucleotide according to claim 1, further comprising a promoter sequence for the base sequence encoding the guide RNA and/or a promoter sequence for the base sequence encoding the fusion protein of the nuclease-deficient CRISPR effector protein and the transcription activator.

5. The polynucleotide according to claim 4, wherein the promoter sequence for the base sequence encoding the guide RNA is selected from the group consisting of a U6 promoter, a SNR6 promoter, a SNR52 promoter, a SCR1 promoter, a RPR1 promoter, a U3 promoter, and a H1 promoter.

6. The polynucleotide according to claim 5, wherein the promoter sequence for the base sequence encoding the guide RNA is the U6 promoter.

7. The polynucleotide according to claim 4, wherein the promoter sequence for the base sequence encoding the fusion protein of the nuclease-deficient CRISPR effector protein and the transcription activator is a ubiquitous promoter or a muscle specific promoter.

8. The polynucleotide according to claim 7, wherein the ubiquitous promoter is selected from the group consisting of an EFS promoter, a CMV promoter and a CAG promoter.

9. The polynucleotide according to claim 7, wherein the muscle specific promoter is selected from the group consisting of a CK8 promoter, a myosin heavy chain kinase (MHCK) promoter, a muscle creatine kinase (MCK) promoter, a synthetic C5-12(Syn) promoter and a unc45b promoter.

10. A vector comprising the polynucleotide of claim 1.

11. The vector according to claim 10, wherein the vector is a plasmid vector or a viral vector.

12. The vector according to claim 11, wherein the viral vector is selected from the group consisting of an adeno-associated virus (AAV) vector, an adenovirus vector, and a lentivirus vector.

13. The vector according to claim 12, wherein the AAV vector is selected from the group consisting of AAV1, AAV2, AAV6, AAV7, AAV8, AAV9, and a variant thereof.

* * * * *

SEQUENCE LISTING

<160> NUMBER OF SEQ ID NOS: 221

<210> SEQ ID NO 1
<211> LENGTH: 21
<212> TYPE: DNA
<213> ORGANISM: Homo sapiens

<400> SEQUENCE: 1
actagcaggt gatttgcagg t                                              21

<210> SEQ ID NO 2
<211> LENGTH: 21
<212> TYPE: DNA
<213> ORGANISM: Homo sapiens

<400> SEQUENCE: 2
aggtgggctg atcacgaggt c                                              21

<210> SEQ ID NO 3
<211> LENGTH: 21
<212> TYPE: DNA
<213> ORGANISM: Homo sapiens

<400> SEQUENCE: 3
tctccgggct gcaggcagga g                                              21

<210> SEQ ID NO 4
<211> LENGTH: 21
<212> TYPE: DNA
<213> ORGANISM: Homo sapiens

<400> SEQUENCE: 4
cggaaggcaa aaaggcaaac a                                              21

<210> SEQ ID NO 5
<211> LENGTH: 21
<212> TYPE: DNA
<213> ORGANISM: Homo sapiens

<400> SEQUENCE: 5
tgaacaagtc ccggtttccc a                                              21

<210> SEQ ID NO 6
<211> LENGTH: 21
<212> TYPE: DNA
<213> ORGANISM: Homo sapiens

<400> SEQUENCE: 6
tggggaggga gaggagcctt a                                              21

<210> SEQ ID NO 7
<211> LENGTH: 21
<212> TYPE: DNA
<213> ORGANISM: Homo sapiens

<400> SEQUENCE: 7
cagtgcttcc atcatgaatg c                                              21

<210> SEQ ID NO 8
<211> LENGTH: 21
<212> TYPE: DNA
<213> ORGANISM: Homo sapiens

<400> SEQUENCE: 8

```
catgacaatg ggcgtattcc c                                              21

<210> SEQ ID NO 9
<211> LENGTH: 21
<212> TYPE: DNA
<213> ORGANISM: Homo sapiens

<400> SEQUENCE: 9
gggttgtccc ccaaaaggga a                                              21

<210> SEQ ID NO 10
<211> LENGTH: 21
<212> TYPE: DNA
<213> ORGANISM: Homo sapiens

<400> SEQUENCE: 10
gcccacggtc aatcccgcgc a                                              21

<210> SEQ ID NO 11
<211> LENGTH: 21
<212> TYPE: DNA
<213> ORGANISM: Homo sapiens

<400> SEQUENCE: 11
tcagtgccct ggacgccgcc t                                              21

<210> SEQ ID NO 12
<211> LENGTH: 21
<212> TYPE: DNA
<213> ORGANISM: Homo sapiens

<400> SEQUENCE: 12
cggggctgtt ggccgggcgc g                                              21

<210> SEQ ID NO 13
<211> LENGTH: 21
<212> TYPE: DNA
<213> ORGANISM: Homo sapiens

<400> SEQUENCE: 13
ggctttaacc tcctcgggct t                                              21

<210> SEQ ID NO 14
<211> LENGTH: 21
<212> TYPE: DNA
<213> ORGANISM: Homo sapiens

<400> SEQUENCE: 14
ggcgcgcatc ctgatccacc t                                              21

<210> SEQ ID NO 15
<211> LENGTH: 21
<212> TYPE: DNA
<213> ORGANISM: Homo sapiens

<400> SEQUENCE: 15
tctcgcctcc gccgccactc g                                              21

<210> SEQ ID NO 16
<211> LENGTH: 21
<212> TYPE: DNA
<213> ORGANISM: Homo sapiens
```

<400> SEQUENCE: 16
ctgccctggc ccgccgctc c　　　　　　　　　　　　　　　　　　　　21

<210> SEQ ID NO 17
<211> LENGTH: 21
<212> TYPE: DNA
<213> ORGANISM: Homo sapiens

<400> SEQUENCE: 17
tgacagggaa cgtctaacaa t　　　　　　　　　　　　　　　　　　　　21

<210> SEQ ID NO 18
<211> LENGTH: 21
<212> TYPE: DNA
<213> ORGANISM: Homo sapiens

<400> SEQUENCE: 18
tgcagtctcc gggctgcagg c　　　　　　　　　　　　　　　　　　　　21

<210> SEQ ID NO 19
<211> LENGTH: 21
<212> TYPE: DNA
<213> ORGANISM: Homo sapiens

<400> SEQUENCE: 19
tgctcaagga ggctagttag g　　　　　　　　　　　　　　　　　　　　21

<210> SEQ ID NO 20
<211> LENGTH: 21
<212> TYPE: DNA
<213> ORGANISM: Homo sapiens

<400> SEQUENCE: 20
gttaggaagg gtgagggttg g　　　　　　　　　　　　　　　　　　　　21

<210> SEQ ID NO 21
<211> LENGTH: 21
<212> TYPE: DNA
<213> ORGANISM: Homo sapiens

<400> SEQUENCE: 21
tcggcacttg gcctggcggt t　　　　　　　　　　　　　　　　　　　　21

<210> SEQ ID NO 22
<211> LENGTH: 21
<212> TYPE: DNA
<213> ORGANISM: Homo sapiens

<400> SEQUENCE: 22
accttcagca gcctgataga c　　　　　　　　　　　　　　　　　　　　21

<210> SEQ ID NO 23
<211> LENGTH: 21
<212> TYPE: DNA
<213> ORGANISM: Homo sapiens

<400> SEQUENCE: 23
cgcagagcca ggctgggaag a　　　　　　　　　　　　　　　　　　　　21

<210> SEQ ID NO 24
<211> LENGTH: 21
<212> TYPE: DNA
<213> ORGANISM: Homo sapiens -continued

```
<400> SEQUENCE: 24
gaaacgcagc attgaatagc t                                              21

<210> SEQ ID NO 25
<211> LENGTH: 21
<212> TYPE: DNA
<213> ORGANISM: Homo sapiens

<400> SEQUENCE: 25
accggagctg gaaacgcagc a                                              21

<210> SEQ ID NO 26
<211> LENGTH: 21
<212> TYPE: DNA
<213> ORGANISM: Homo sapiens

<400> SEQUENCE: 26
ctccggtcca gtgcttccat c                                              21

<210> SEQ ID NO 27
<211> LENGTH: 21
<212> TYPE: DNA
<213> ORGANISM: Homo sapiens

<400> SEQUENCE: 27
gcttccatca tgaatgcttg a                                              21

<210> SEQ ID NO 28
<211> LENGTH: 21
<212> TYPE: DNA
<213> ORGANISM: Homo sapiens

<400> SEQUENCE: 28
aacgtgtgtt tgggcattgt g                                              21

<210> SEQ ID NO 29
<211> LENGTH: 21
<212> TYPE: DNA
<213> ORGANISM: Homo sapiens

<400> SEQUENCE: 29
attcgagtca aaagtagtgg g                                              21

<210> SEQ ID NO 30
<211> LENGTH: 21
<212> TYPE: DNA
<213> ORGANISM: Homo sapiens

<400> SEQUENCE: 30
tttaatgaag tttatattcg t                                              21

<210> SEQ ID NO 31
<211> LENGTH: 21
<212> TYPE: DNA
<213> ORGANISM: Homo sapiens

<400> SEQUENCE: 31
ccacgctgcg aagacagctc t                                              21

<210> SEQ ID NO 32
<211> LENGTH: 21
<212> TYPE: DNA
```

<213> ORGANISM: Homo sapiens

<400> SEQUENCE: 32
gaagacagct ctagggtgg c    21

<210> SEQ ID NO 33
<211> LENGTH: 21
<212> TYPE: DNA
<213> ORGANISM: Homo sapiens

<400> SEQUENCE: 33 tctagggtg gcgtgggtga c    21

<210> SEQ ID NO 34
<211> LENGTH: 21
<212> TYPE: DNA
<213> ORGANISM: Homo sapiens

<400> SEQUENCE: 34
gattgagaag agaaactcag a    21

<210> SEQ ID NO 35
<211> LENGTH: 21
<212> TYPE: DNA
<213> ORGANISM: Homo sapiens

<400> SEQUENCE: 35
agcaccttgc atgcgcgttg c    21

<210> SEQ ID NO 36
<211> LENGTH: 21
<212> TYPE: DNA
<213> ORGANISM: Homo sapiens

<400> SEQUENCE: 36
caaacccgct cattcactgc g    21

<210> SEQ ID NO 37
<211> LENGTH: 21
<212> TYPE: DNA
<213> ORGANISM: Homo sapiens

<400> SEQUENCE: 37
tcaatcccgc gcagtgaatg a    21

<210> SEQ ID NO 38
<211> LENGTH: 21
<212> TYPE: DNA
<213> ORGANISM: Homo sapiens

<400> SEQUENCE: 38
ttcgcctatt gcacaaaaag c    21

<210> SEQ ID NO 39
<211> LENGTH: 21
<212> TYPE: DNA
<213> ORGANISM: Homo sapiens

<400> SEQUENCE: 39
gcttggctgc caggggcccc g    21

<210> SEQ ID NO 40
<211> LENGTH: 21

<212> TYPE: DNA
<213> ORGANISM: Homo sapiens

<400> SEQUENCE: 40
ggtcgcggcg gccgggaaag g                                            21

<210> SEQ ID NO 41
<211> LENGTH: 21
<212> TYPE: DNA
<213> ORGANISM: Homo sapiens

<400> SEQUENCE: 41
ctcattgtcc ggctgcgcaa g                                            21

<210> SEQ ID NO 42
<211> LENGTH: 21
<212> TYPE: DNA
<213> ORGANISM: Homo sapiens

<400> SEQUENCE: 42
atgaatggag aaagagctct c                                            21

<210> SEQ ID NO 43
<211> LENGTH: 21
<212> TYPE: DNA
<213> ORGANISM: Homo sapiens

<400> SEQUENCE: 43
tagtgccccg gctgcgcggg c                                            21

<210> SEQ ID NO 44
<211> LENGTH: 21
<212> TYPE: DNA
<213> ORGANISM: Homo sapiens

<400> SEQUENCE: 44
gggcgcccgg agcggggcgc c                                            21

<210> SEQ ID NO 45
<211> LENGTH: 21
<212> TYPE: DNA
<213> ORGANISM: Homo sapiens

<400> SEQUENCE: 45
gccatctacg cgagcagtgc t                                            21

<210> SEQ ID NO 46
<211> LENGTH: 21
<212> TYPE: DNA
<213> ORGANISM: Homo sapiens

<400> SEQUENCE: 46
ctgctcgcgt agatggcgct c                                            21

<210> SEQ ID NO 47
<211> LENGTH: 21
<212> TYPE: DNA
<213> ORGANISM: Homo sapiens

<400> SEQUENCE: 47
tcccgcgctt gccggggagg g                                            21

<210> SEQ ID NO 48

```
<211> LENGTH: 21
<212> TYPE: DNA
<213> ORGANISM: Homo sapiens

<400> SEQUENCE: 48
cggagtgggt gtctcggcca c                                              21

<210> SEQ ID NO 49
<211> LENGTH: 21
<212> TYPE: DNA
<213> ORGANISM: Homo sapiens

<400> SEQUENCE: 49
ggccgagaca cccactccga g                                              21

<210> SEQ ID NO 50
<211> LENGTH: 21
<212> TYPE: DNA
<213> ORGANISM: Homo sapiens

<400> SEQUENCE: 50
cgcatcctga tccacctcgg a                                              21

<210> SEQ ID NO 51
<211> LENGTH: 21
<212> TYPE: DNA
<213> ORGANISM: Homo sapiens

<400> SEQUENCE: 51
gacacccact ccgaggtgga t                                              21

<210> SEQ ID NO 52
<211> LENGTH: 21
<212> TYPE: DNA
<213> ORGANISM: Homo sapiens

<400> SEQUENCE: 52
agcccgtcgc gttggggctg c                                              21

<210> SEQ ID NO 53
<211> LENGTH: 21
<212> TYPE: DNA
<213> ORGANISM: Homo sapiens

<400> SEQUENCE: 53
aggtgagccc ggcccgggtc c                                              21

<210> SEQ ID NO 54
<211> LENGTH: 21
<212> TYPE: DNA
<213> ORGANISM: Homo sapiens

<400> SEQUENCE: 54
cggcagagag gtgagcccgg c                                              21

<210> SEQ ID NO 55
<211> LENGTH: 21
<212> TYPE: DNA
<213> ORGANISM: Homo sapiens

<400> SEQUENCE: 55
gcggctttct ccccagaccc a                                              21
```

-continued

<210> SEQ ID NO 56
<211> LENGTH: 21
<212> TYPE: DNA
<213> ORGANISM: Homo sapiens

<400> SEQUENCE: 56
gcctggaacg ctccacggga c                                              21

<210> SEQ ID NO 57
<211> LENGTH: 21
<212> TYPE: DNA
<213> ORGANISM: Homo sapiens

<400> SEQUENCE: 57
gggcggggcg gggcgcagcc g                                              21

<210> SEQ ID NO 58
<211> LENGTH: 21
<212> TYPE: DNA
<213> ORGANISM: Homo sapiens

<400> SEQUENCE: 58
gggcgccccc gggggagggg t                                              21

<210> SEQ ID NO 59
<211> LENGTH: 21
<212> TYPE: DNA
<213> ORGANISM: Homo sapiens

<400> SEQUENCE: 59
caagctgggc gcccccgggg g                                              21

<210> SEQ ID NO 60
<211> LENGTH: 21
<212> TYPE: DNA
<213> ORGANISM: Homo sapiens

<400> SEQUENCE: 60 cggggggcgcc cagcttggcc t                                             21

<210> SEQ ID NO 61
<211> LENGTH: 21
<212> TYPE: DNA
<213> ORGANISM: Homo sapiens

<400> SEQUENCE: 61
gtcagcccgg cctccccgac t                                              21

<210> SEQ ID NO 62
<211> LENGTH: 20
<212> TYPE: DNA
<213> ORGANISM: Artificial Sequence
<220> FEATURE:
<223> OTHER INFORMATION: Synthetic DNA, control non-targeting targeting
      sequence

<400> SEQUENCE: 62
acggaggcta agcgtcgcaa                                                20

<210> SEQ ID NO 63
<211> LENGTH: 20
<212> TYPE: DNA
<213> ORGANISM: Artificial Sequence
<220> FEATURE:
<223> OTHER INFORMATION: Synthetic DNA, control non-targeting targeting -continued sequence

<400> SEQUENCE: 63
cgcttccgcg gcccgttcaa					20

<210> SEQ ID NO 64
<211> LENGTH: 20
<212> TYPE: DNA
<213> ORGANISM: Artificial Sequence
<220> FEATURE:
<223> OTHER INFORMATION: Synthetic DNA, control non-targeting targeting
      sequence

<400> SEQUENCE: 64
gtaggcgcgc cgctctctac					20

<210> SEQ ID NO 65
<211> LENGTH: 19
<212> TYPE: RNA
<213> ORGANISM: Francisella novicid
<220> FEATURE:
<221> NAME/KEY: misc_structure
<222> LOCATION: (1)..(19)
<223> OTHER INFORMATION: 5'-handle of crRNA

<400> SEQUENCE: 65
aauuucuacu guuguagau					19

<210> SEQ ID NO 66
<211> LENGTH: 1053
<212> TYPE: PRT
<213> ORGANISM: Staphylococcus aureus
<220> FEATURE:
<221> NAME/KEY: VARIANT
<222> LOCATION: (10)..(10)
<223> OTHER INFORMATION: conversion of Asp residue into Ala residue
<220> FEATURE:
<221> NAME/KEY: VARIANT
<222> LOCATION: (580)..(580)
<223> OTHER INFORMATION: conversion of Asn residue into Ala residue

<400> SEQUENCE: 66

Met Lys Arg Asn Tyr Ile Leu Gly Leu Ala Ile Gly Ile Thr Ser Val
1               5                   10                  15

Gly Tyr Gly Ile Ile Asp Tyr Glu Thr Arg Asp Val Ile Asp Ala Gly
            20                  25                  30

Val Arg Leu Phe Lys Glu Ala Asn Val Glu Asn Asn Glu Gly Arg Arg
        35                  40                  45

Ser Lys Arg Gly Ala Arg Arg Leu Lys Arg Arg Arg Arg His Arg Ile
    50                  55                  60

Gln Arg Val Lys Lys Leu Leu Phe Asp Tyr Asn Leu Leu Thr Asp His
65                  70                  75                  80

Ser Glu Leu Ser Gly Ile Asn Pro Tyr Glu Ala Arg Val Lys Gly Leu
                85                  90                  95

Ser Gln Lys Leu Ser Glu Glu Glu Phe Ser Ala Ala Leu Leu His Leu
            100                 105                 110

Ala Lys Arg Arg Gly Val His Asn Val Asn Glu Val Glu Glu Asp Thr
        115                 120                 125

Gly Asn Glu Leu Ser Thr Lys Glu Gln Ile Ser Arg Asn Ser Lys Ala
    130                 135                 140

Leu Glu Glu Lys Tyr Val Ala Glu Leu Gln Leu Glu Arg Leu Lys Lys
145                 150                 155                 160

```
Asp Gly Glu Val Arg Gly Ser Ile Asn Arg Phe Lys Thr Ser Asp Tyr
            165                 170                 175

Val Lys Glu Ala Lys Gln Leu Leu Lys Val Gln Lys Ala Tyr His Gln
        180                 185                 190

Leu Asp Gln Ser Phe Ile Asp Thr Tyr Ile Asp Leu Leu Glu Thr Arg
        195                 200                 205

Arg Thr Tyr Tyr Glu Gly Pro Gly Glu Gly Ser Pro Phe Gly Trp Lys
    210                 215                 220

Asp Ile Lys Glu Trp Tyr Glu Met Leu Met Gly His Cys Thr Tyr Phe
225                 230                 235                 240

Pro Glu Glu Leu Arg Ser Val Lys Tyr Ala Tyr Asn Ala Asp Leu Tyr
                245                 250                 255

Asn Ala Leu Asn Asp Leu Asn Asn Leu Val Ile Thr Arg Asp Glu Asn
            260                 265                 270

Glu Lys Leu Glu Tyr Tyr Glu Lys Phe Gln Ile Ile Glu Asn Val Phe
        275                 280                 285

Lys Gln Lys Lys Lys Pro Thr Leu Lys Gln Ile Ala Lys Glu Ile Leu
    290                 295                 300

Val Asn Glu Glu Asp Ile Lys Gly Tyr Arg Val Thr Ser Thr Gly Lys
305                 310                 315                 320

Pro Glu Phe Thr Asn Leu Lys Val Tyr His Asp Ile Lys Asp Ile Thr
                325                 330                 335

Ala Arg Lys Glu Ile Ile Glu Asn Ala Glu Leu Leu Asp Gln Ile Ala
            340                 345                 350

Lys Ile Leu Thr Ile Tyr Gln Ser Ser Glu Asp Ile Gln Glu Glu Leu
        355                 360                 365

Thr Asn Leu Asn Ser Glu Leu Thr Gln Glu Glu Ile Glu Gln Ile Ser
    370                 375                 380

Asn Leu Lys Gly Tyr Thr Gly Thr His Asn Leu Ser Leu Lys Ala Ile
385                 390                 395                 400

Asn Leu Ile Leu Asp Glu Leu Trp His Thr Asn Asp Asn Gln Ile Ala
                405                 410                 415

Ile Phe Asn Arg Leu Lys Leu Val Pro Lys Lys Val Asp Leu Ser Gln
            420                 425                 430

Gln Lys Glu Ile Pro Thr Thr Leu Val Asp Asp Phe Ile Leu Ser Pro
        435                 440                 445

Val Val Lys Arg Ser Phe Ile Gln Ser Ile Lys Val Ile Asn Ala Ile
    450                 455                 460

Ile Lys Lys Tyr Gly Leu Pro Asn Asp Ile Ile Glu Leu Ala Arg
465                 470                 475                 480

Glu Lys Asn Ser Lys Asp Ala Gln Lys Met Ile Asn Glu Met Gln Lys
                485                 490                 495

Arg Asn Arg Gln Thr Asn Glu Arg Ile Glu Glu Ile Ile Arg Thr Thr
            500                 505                 510

Gly Lys Glu Asn Ala Lys Tyr Leu Ile Glu Lys Ile Lys Leu His Asp
        515                 520                 525

Met Gln Glu Gly Lys Cys Leu Tyr Ser Leu Glu Ala Ile Pro Leu Glu
    530                 535                 540

Asp Leu Leu Asn Asn Pro Phe Asn Tyr Glu Val Asp His Ile Ile Pro
545                 550                 555                 560

Arg Ser Val Ser Phe Asp Asn Ser Phe Asn Asn Lys Val Leu Val Lys
                565                 570                 575

Gln Glu Glu Ala Ser Lys Lys Gly Asn Arg Thr Pro Phe Gln Tyr Leu
```

```
                580             585             590
Ser Ser Ser Asp Ser Lys Ile Ser Tyr Glu Thr Phe Lys Lys His Ile
            595             600             605
Leu Asn Leu Ala Lys Gly Lys Gly Arg Ile Ser Lys Thr Lys Lys Glu
            610             615             620
Tyr Leu Leu Glu Glu Arg Asp Ile Asn Arg Phe Ser Val Gln Lys Asp
625             630             635             640
Phe Ile Asn Arg Asn Leu Val Asp Thr Arg Tyr Ala Thr Arg Gly Leu
                645             650             655
Met Asn Leu Leu Arg Ser Tyr Phe Arg Val Asn Asn Leu Asp Val Lys
            660             665             670
Val Lys Ser Ile Asn Gly Gly Phe Thr Ser Phe Leu Arg Arg Lys Trp
            675             680             685
Lys Phe Lys Lys Glu Arg Asn Lys Gly Tyr Lys His His Ala Glu Asp
            690             695             700
Ala Leu Ile Ile Ala Asn Ala Asp Phe Ile Phe Lys Glu Trp Lys Lys
705             710             715             720
Leu Asp Lys Ala Lys Lys Val Met Glu Asn Gln Met Phe Glu Glu Lys
                725             730             735
Gln Ala Glu Ser Met Pro Glu Ile Glu Thr Glu Gln Glu Tyr Lys Glu
            740             745             750
Ile Phe Ile Thr Pro His Gln Ile Lys His Ile Lys Asp Phe Lys Asp
            755             760             765
Tyr Lys Tyr Ser His Arg Val Asp Lys Lys Pro Asn Arg Glu Leu Ile
            770             775             780
Asn Asp Thr Leu Tyr Ser Thr Arg Lys Asp Asp Lys Gly Asn Thr Leu
785             790             795             800
Ile Val Asn Asn Leu Asn Gly Leu Tyr Asp Lys Asp Asn Asp Lys Leu
                805             810             815
Lys Lys Leu Ile Asn Lys Ser Pro Glu Lys Leu Leu Met Tyr His His
            820             825             830
Asp Pro Gln Thr Tyr Gln Lys Leu Lys Leu Ile Met Glu Gln Tyr Gly
            835             840             845
Asp Glu Lys Asn Pro Leu Tyr Lys Tyr Tyr Glu Glu Thr Gly Asn Tyr
            850             855             860
Leu Thr Lys Tyr Ser Lys Lys Asp Asn Gly Pro Val Ile Lys Lys Ile
865             870             875             880
Lys Tyr Tyr Gly Asn Lys Leu Asn Ala His Leu Asp Ile Thr Asp Asp
                885             890             895
Tyr Pro Asn Ser Arg Asn Lys Val Val Lys Leu Ser Leu Lys Pro Tyr
            900             905             910
Arg Phe Asp Val Tyr Leu Asp Asn Gly Val Tyr Lys Phe Val Thr Val
            915             920             925
Lys Asn Leu Asp Val Ile Lys Lys Glu Asn Tyr Glu Val Asn Ser
            930             935             940
Lys Cys Tyr Glu Glu Ala Lys Lys Leu Lys Lys Ile Ser Asn Gln Ala
945             950             955             960
Glu Phe Ile Ala Ser Phe Tyr Asn Asn Asp Leu Ile Lys Ile Asn Gly
                965             970             975
Glu Leu Tyr Arg Val Ile Gly Val Asn Asn Asp Leu Leu Asn Arg Ile
            980             985             990
Glu Val Asn Met Ile Asp Ile Thr Tyr Arg Glu Tyr Leu Glu Asn Met
            995             1000            1005
```

-continued

```
Asn Asp Lys Arg Pro Pro Arg Ile Ile Lys Thr Ile Ala Ser Lys
    1010                1015                1020

Thr Gln Ser Ile Lys Lys Tyr Ser Thr Asp Ile Leu Gly Asn Leu
    1025                1030                1035

Tyr Glu Val Lys Ser Lys Lys His Pro Gln Ile Ile Lys Lys Gly
    1040                1045                1050
```

<210> SEQ ID NO 67
<211> LENGTH: 1053
<212> TYPE: PRT
<213> ORGANISM: Staphylococcus aureus
<220> FEATURE:
<221> NAME/KEY: VARIANT
<222> LOCATION: (10)..(10)
<223> OTHER INFORMATION: conversion of Asp residue into Ala residue
<220> FEATURE:
<221> NAME/KEY: VARIANT
<222> LOCATION: (557)..(557)
<223> OTHER INFORMATION: conversion of His residue into Ala residue

<400> SEQUENCE: 67

```
Met Lys Arg Asn Tyr Ile Leu Gly Leu Ala Ile Gly Ile Thr Ser Val
1               5                   10                  15

Gly Tyr Gly Ile Ile Asp Tyr Glu Thr Arg Asp Val Ile Asp Ala Gly
                20                  25                  30

Val Arg Leu Phe Lys Glu Ala Asn Val Glu Asn Asn Glu Gly Arg Arg
            35                  40                  45

Ser Lys Arg Gly Ala Arg Arg Leu Lys Arg Arg Arg Arg His Arg Ile
        50                  55                  60

Gln Arg Val Lys Lys Leu Leu Phe Asp Tyr Asn Leu Leu Thr Asp His
65                  70                  75                  80

Ser Glu Leu Ser Gly Ile Asn Pro Tyr Glu Ala Arg Val Lys Gly Leu
                85                  90                  95

Ser Gln Lys Leu Ser Glu Glu Glu Phe Ser Ala Ala Leu Leu His Leu
            100                 105                 110

Ala Lys Arg Arg Gly Val His Asn Val Asn Glu Val Glu Glu Asp Thr
        115                 120                 125

Gly Asn Glu Leu Ser Thr Lys Glu Gln Ile Ser Arg Asn Ser Lys Ala
    130                 135                 140

Leu Glu Glu Lys Tyr Val Ala Glu Leu Gln Leu Glu Arg Leu Lys Lys
145                 150                 155                 160

Asp Gly Glu Val Arg Gly Ser Ile Asn Arg Phe Lys Thr Ser Asp Tyr
                165                 170                 175

Val Lys Glu Ala Lys Gln Leu Leu Lys Val Gln Lys Ala Tyr His Gln
            180                 185                 190

Leu Asp Gln Ser Phe Ile Asp Thr Tyr Ile Asp Leu Leu Glu Thr Arg
        195                 200                 205

Arg Thr Tyr Tyr Glu Gly Pro Gly Glu Gly Ser Pro Phe Gly Trp Lys
    210                 215                 220

Asp Ile Lys Glu Trp Tyr Glu Met Leu Met Gly His Cys Thr Tyr Phe
225                 230                 235                 240

Pro Glu Glu Leu Arg Ser Val Lys Tyr Ala Tyr Asn Ala Asp Leu Tyr
                245                 250                 255

Asn Ala Leu Asn Asp Leu Asn Asn Leu Val Ile Thr Arg Asp Glu Asn
            260                 265                 270

Glu Lys Leu Glu Tyr Tyr Glu Lys Phe Gln Ile Ile Glu Asn Val Phe
        275                 280                 285
```

```
Lys Gln Lys Lys Lys Pro Thr Leu Lys Gln Ile Ala Lys Glu Ile Leu
            290                 295                 300

Val Asn Glu Glu Asp Ile Lys Gly Tyr Arg Val Thr Ser Thr Gly Lys
305                 310                 315                 320

Pro Glu Phe Thr Asn Leu Lys Val Tyr His Asp Ile Lys Asp Ile Thr
                325                 330                 335

Ala Arg Lys Glu Ile Ile Glu Asn Ala Glu Leu Leu Asp Gln Ile Ala
            340                 345                 350

Lys Ile Leu Thr Ile Tyr Gln Ser Ser Glu Asp Ile Gln Glu Glu Leu
            355                 360                 365

Thr Asn Leu Asn Ser Glu Leu Thr Gln Glu Glu Ile Glu Gln Ile Ser
370                 375                 380

Asn Leu Lys Gly Tyr Thr Gly Thr His Asn Leu Ser Leu Lys Ala Ile
385                 390                 395                 400

Asn Leu Ile Leu Asp Glu Leu Trp His Thr Asn Asp Asn Gln Ile Ala
                405                 410                 415

Ile Phe Asn Arg Leu Lys Leu Val Pro Lys Lys Val Asp Leu Ser Gln
                420                 425                 430

Gln Lys Glu Ile Pro Thr Thr Leu Val Asp Asp Phe Ile Leu Ser Pro
            435                 440                 445

Val Val Lys Arg Ser Phe Ile Gln Ser Ile Lys Val Ile Asn Ala Ile
450                 455                 460

Ile Lys Lys Tyr Gly Leu Pro Asn Asp Ile Ile Glu Leu Ala Arg
465                 470                 475                 480

Glu Lys Asn Ser Lys Asp Ala Gln Lys Met Ile Asn Glu Met Gln Lys
                485                 490                 495

Arg Asn Arg Gln Thr Asn Glu Arg Ile Glu Glu Ile Arg Thr Thr
            500                 505                 510

Gly Lys Glu Asn Ala Lys Tyr Leu Ile Glu Lys Ile Lys Leu His Asp
            515                 520                 525

Met Gln Glu Gly Lys Cys Leu Tyr Ser Leu Glu Ala Ile Pro Leu Glu
530                 535                 540

Asp Leu Leu Asn Asn Pro Phe Asn Tyr Glu Val Asp Ala Ile Ile Pro
545                 550                 555                 560

Arg Ser Val Ser Phe Asp Asn Ser Phe Asn Asn Lys Val Leu Val Lys
                565                 570                 575

Gln Glu Glu Asn Ser Lys Lys Gly Asn Arg Thr Pro Phe Gln Tyr Leu
                580                 585                 590

Ser Ser Ser Asp Ser Lys Ile Ser Tyr Glu Thr Phe Lys Lys His Ile
            595                 600                 605

Leu Asn Leu Ala Lys Gly Lys Gly Arg Ile Ser Lys Thr Lys Lys Glu
            610                 615                 620

Tyr Leu Leu Glu Glu Arg Asp Ile Asn Arg Phe Ser Val Gln Lys Asp
625                 630                 635                 640

Phe Ile Asn Arg Asn Leu Val Asp Thr Arg Tyr Ala Thr Arg Gly Leu
                645                 650                 655

Met Asn Leu Leu Arg Ser Tyr Phe Arg Val Asn Asn Leu Asp Val Lys
                660                 665                 670

Val Lys Ser Ile Asn Gly Gly Phe Thr Ser Phe Leu Arg Arg Lys Trp
            675                 680                 685

Lys Phe Lys Lys Glu Arg Asn Lys Gly Tyr Lys His His Ala Glu Asp
            690                 695                 700
```

Ala Leu Ile Ile Ala Asn Ala Asp Phe Ile Phe Lys Glu Trp Lys Lys
705                 710                 715                 720

Leu Asp Lys Ala Lys Lys Val Met Glu Asn Gln Met Phe Glu Glu Lys
            725                 730                 735

Gln Ala Glu Ser Met Pro Glu Ile Glu Thr Glu Gln Glu Tyr Lys Glu
            740                 745                 750

Ile Phe Ile Thr Pro His Gln Ile Lys His Ile Lys Asp Phe Lys Asp
            755                 760                 765

Tyr Lys Tyr Ser His Arg Val Asp Lys Lys Pro Asn Arg Glu Leu Ile
770                 775                 780

Asn Asp Thr Leu Tyr Ser Thr Arg Lys Asp Asp Lys Gly Asn Thr Leu
785                 790                 795                 800

Ile Val Asn Asn Leu Asn Gly Leu Tyr Asp Lys Asp Asn Asp Lys Leu
                805                 810                 815

Lys Lys Leu Ile Asn Lys Ser Pro Glu Lys Leu Leu Met Tyr His His
                820                 825                 830

Asp Pro Gln Thr Tyr Gln Lys Leu Lys Leu Ile Met Glu Gln Tyr Gly
            835                 840                 845

Asp Glu Lys Asn Pro Leu Tyr Lys Tyr Tyr Glu Glu Thr Gly Asn Tyr
850                 855                 860

Leu Thr Lys Tyr Ser Lys Lys Asp Asn Gly Pro Val Ile Lys Lys Ile
865                 870                 875                 880

Lys Tyr Tyr Gly Asn Lys Leu Asn Ala His Leu Asp Ile Thr Asp Asp
                885                 890                 895

Tyr Pro Asn Ser Arg Asn Lys Val Val Lys Leu Ser Leu Lys Pro Tyr
            900                 905                 910

Arg Phe Asp Val Tyr Leu Asp Asn Gly Val Tyr Lys Phe Val Thr Val
            915                 920                 925

Lys Asn Leu Asp Val Ile Lys Lys Glu Asn Tyr Tyr Glu Val Asn Ser
            930                 935                 940

Lys Cys Tyr Glu Glu Ala Lys Lys Leu Lys Lys Ile Ser Asn Gln Ala
945                 950                 955                 960

Glu Phe Ile Ala Ser Phe Tyr Asn Asn Asp Leu Ile Lys Ile Asn Gly
                965                 970                 975

Glu Leu Tyr Arg Val Ile Gly Val Asn Asn Asp Leu Leu Asn Arg Ile
            980                 985                 990

Glu Val Asn Met Ile Asp Ile Thr Tyr Arg Glu Tyr Leu Glu Asn Met
            995                 1000                1005

Asn Asp Lys Arg Pro Pro Arg Ile Ile Lys Thr Ile Ala Ser Lys
    1010                1015                1020

Thr Gln Ser Ile Lys Lys Tyr Ser Thr Asp Ile Leu Gly Asn Leu
    1025                1030                1035

Tyr Glu Val Lys Ser Lys Lys His Pro Gln Ile Ile Lys Lys Gly
    1040                1045                1050

<210> SEQ ID NO 68
<211> LENGTH: 1028
<212> TYPE: PRT
<213> ORGANISM: Artificial Sequence
<220> FEATURE:
<223> OTHER INFORMATION: Synthetic polypeptide, amino acid residues
      (721st to 745th amino acid residues of dSaCas9) deletion mutant
<220> FEATURE:
<221> NAME/KEY: VARIANT
<222> LOCATION: (10)..(10)
<223> OTHER INFORMATION: conversion of Asp residue into Ala residue
<220> FEATURE:

-continued

```
<221> NAME/KEY: VARIANT
<222> LOCATION: (580)..(580)
<223> OTHER INFORMATION: conversion of Asn residue into Ala residue

<400> SEQUENCE: 68

Met Lys Arg Asn Tyr Ile Leu Gly Leu Ala Ile Gly Ile Thr Ser Val
1               5                   10                  15

Gly Tyr Gly Ile Ile Asp Tyr Glu Thr Arg Asp Val Ile Asp Ala Gly
            20                  25                  30

Val Arg Leu Phe Lys Glu Ala Asn Val Glu Asn Asn Glu Gly Arg Arg
        35                  40                  45

Ser Lys Arg Gly Ala Arg Arg Leu Lys Arg Arg Arg His Arg Ile
    50                  55                  60

Gln Arg Val Lys Lys Leu Leu Phe Asp Tyr Asn Leu Leu Thr Asp His
65              70                  75                  80

Ser Glu Leu Ser Gly Ile Asn Pro Tyr Glu Ala Arg Val Lys Gly Leu
                85                  90                  95

Ser Gln Lys Leu Ser Glu Glu Phe Ser Ala Ala Leu Leu His Leu
            100                 105                 110

Ala Lys Arg Arg Gly Val His Asn Val Asn Glu Val Glu Glu Asp Thr
        115                 120                 125

Gly Asn Glu Leu Ser Thr Lys Glu Gln Ile Ser Arg Asn Ser Lys Ala
    130                 135                 140

Leu Glu Glu Lys Tyr Val Ala Glu Leu Gln Leu Glu Arg Leu Lys Lys
145                 150                 155                 160

Asp Gly Glu Val Arg Gly Ser Ile Asn Arg Phe Lys Thr Ser Asp Tyr
                165                 170                 175

Val Lys Glu Ala Lys Gln Leu Leu Lys Val Gln Lys Ala Tyr His Gln
            180                 185                 190

Leu Asp Gln Ser Phe Ile Asp Thr Tyr Ile Asp Leu Leu Glu Thr Arg
        195                 200                 205

Arg Thr Tyr Tyr Glu Gly Pro Gly Glu Gly Ser Pro Phe Gly Trp Lys
210                 215                 220

Asp Ile Lys Glu Trp Tyr Glu Met Leu Met Gly His Cys Thr Tyr Phe
225                 230                 235                 240

Pro Glu Glu Leu Arg Ser Val Lys Tyr Ala Tyr Asn Ala Asp Leu Tyr
                245                 250                 255

Asn Ala Leu Asn Asp Leu Asn Asn Leu Val Ile Thr Arg Asp Glu Asn
            260                 265                 270

Glu Lys Leu Glu Tyr Tyr Glu Lys Phe Gln Ile Ile Glu Asn Val Phe
        275                 280                 285

Lys Gln Lys Lys Lys Pro Thr Leu Lys Gln Ile Ala Lys Glu Ile Leu
    290                 295                 300

Val Asn Glu Glu Asp Ile Lys Gly Tyr Arg Val Thr Ser Thr Gly Lys
305                 310                 315                 320

Pro Glu Phe Thr Asn Leu Lys Val Tyr His Asp Ile Lys Asp Ile Thr
                325                 330                 335

Ala Arg Lys Glu Ile Ile Glu Asn Ala Glu Leu Leu Asp Gln Ile Ala
            340                 345                 350

Lys Ile Leu Thr Ile Tyr Gln Ser Ser Glu Asp Ile Gln Glu Glu Leu
        355                 360                 365

Thr Asn Leu Asn Ser Glu Leu Thr Gln Glu Glu Ile Glu Gln Ile Ser
    370                 375                 380

Asn Leu Lys Gly Tyr Thr Gly Thr His Asn Leu Ser Leu Lys Ala Ile
```

-continued

```
        385                 390                 395                 400
Asn Leu Ile Leu Asp Glu Leu Trp His Thr Asn Asp Asn Gln Ile Ala
                    405                 410                 415
Ile Phe Asn Arg Leu Lys Leu Val Pro Lys Lys Val Asp Leu Ser Gln
                420                 425                 430
Gln Lys Glu Ile Pro Thr Thr Leu Val Asp Asp Phe Ile Leu Ser Pro
            435                 440                 445
Val Val Lys Arg Ser Phe Ile Gln Ser Ile Lys Val Ile Asn Ala Ile
        450                 455                 460
Ile Lys Lys Tyr Gly Leu Pro Asn Asp Ile Ile Glu Leu Ala Arg
465                 470                 475                 480
Glu Lys Asn Ser Lys Asp Ala Gln Lys Met Ile Asn Glu Met Gln Lys
                485                 490                 495
Arg Asn Arg Gln Thr Asn Glu Arg Ile Glu Glu Ile Ile Arg Thr Thr
                500                 505                 510
Gly Lys Glu Asn Ala Lys Tyr Leu Ile Glu Lys Ile Lys Leu His Asp
            515                 520                 525
Met Gln Glu Gly Lys Cys Leu Tyr Ser Leu Glu Ala Ile Pro Leu Glu
        530                 535                 540
Asp Leu Leu Asn Asn Pro Phe Asn Tyr Glu Val Asp His Ile Ile Pro
545                 550                 555                 560
Arg Ser Val Ser Phe Asp Asn Ser Phe Asn Asn Lys Val Leu Val Lys
                565                 570                 575
Gln Glu Glu Ala Ser Lys Lys Gly Asn Arg Thr Pro Phe Gln Tyr Leu
                580                 585                 590
Ser Ser Ser Asp Ser Lys Ile Ser Tyr Glu Thr Phe Lys Lys His Ile
            595                 600                 605
Leu Asn Leu Ala Lys Gly Lys Gly Arg Ile Ser Lys Thr Lys Lys Glu
        610                 615                 620
Tyr Leu Leu Glu Glu Arg Asp Ile Asn Arg Phe Ser Val Gln Lys Asp
625                 630                 635                 640
Phe Ile Asn Arg Asn Leu Val Asp Thr Arg Tyr Ala Thr Arg Gly Leu
                645                 650                 655
Met Asn Leu Leu Arg Ser Tyr Phe Arg Val Asn Asn Leu Asp Val Lys
                660                 665                 670
Val Lys Ser Ile Asn Gly Gly Phe Thr Ser Phe Leu Arg Arg Lys Trp
            675                 680                 685
Lys Phe Lys Lys Glu Arg Asn Lys Gly Tyr Lys His His Ala Glu Asp
        690                 695                 700
Ala Leu Ile Ile Ala Asn Ala Asp Phe Ile Phe Lys Glu Trp Lys Lys
705                 710                 715                 720
Thr Glu Gln Glu Tyr Lys Glu Ile Phe Ile Thr Pro His Gln Ile Lys
                725                 730                 735
His Ile Lys Asp Phe Lys Asp Tyr Lys Tyr Ser His Arg Val Asp Lys
                740                 745                 750
Lys Pro Asn Arg Glu Leu Ile Asn Asp Thr Leu Tyr Ser Thr Arg Lys
            755                 760                 765
Asp Asp Lys Gly Asn Thr Leu Ile Val Asn Asn Leu Asn Gly Leu Tyr
        770                 775                 780
Asp Lys Asp Asn Asp Lys Leu Lys Lys Leu Ile Asn Lys Ser Pro Glu
785                 790                 795                 800
Lys Leu Leu Met Tyr His His Asp Pro Gln Thr Tyr Gln Lys Leu Lys
                805                 810                 815
```

```
Leu Ile Met Glu Gln Tyr Gly Asp Glu Lys Asn Pro Leu Tyr Lys Tyr
                820                 825                 830

Tyr Glu Glu Thr Gly Asn Tyr Leu Thr Lys Tyr Ser Lys Lys Asp Asn
            835                 840                 845

Gly Pro Val Ile Lys Lys Ile Lys Tyr Tyr Gly Asn Lys Leu Asn Ala
        850                 855                 860

His Leu Asp Ile Thr Asp Asp Tyr Pro Asn Ser Arg Asn Lys Val Val
865                 870                 875                 880

Lys Leu Ser Leu Lys Pro Tyr Arg Phe Asp Val Tyr Leu Asp Asn Gly
                885                 890                 895

Val Tyr Lys Phe Val Thr Val Lys Asn Leu Asp Val Ile Lys Lys Glu
            900                 905                 910

Asn Tyr Tyr Glu Val Asn Ser Lys Cys Tyr Glu Glu Ala Lys Lys Leu
        915                 920                 925

Lys Lys Ile Ser Asn Gln Ala Glu Phe Ile Ala Ser Phe Tyr Asn Asn
    930                 935                 940

Asp Leu Ile Lys Ile Asn Gly Glu Leu Tyr Arg Val Ile Gly Val Asn
945                 950                 955                 960

Asn Asp Leu Leu Asn Arg Ile Glu Val Asn Met Ile Asp Ile Thr Tyr
                965                 970                 975

Arg Glu Tyr Leu Glu Asn Met Asn Asp Lys Arg Pro Pro Arg Ile Ile
            980                 985                 990

Lys Thr Ile Ala Ser Lys Thr Gln Ser Ile Lys Lys Tyr Ser Thr Asp
        995                 1000                1005

Ile Leu Gly Asn Leu Tyr Glu Val Lys Ser Lys Lys His Pro Gln
    1010                1015                1020

Ile Ile Lys Lys Gly
    1025

<210> SEQ ID NO 69
<211> LENGTH: 6
<212> TYPE: PRT
<213> ORGANISM: Artificial Sequence
<220> FEATURE:
<223> OTHER INFORMATION: Synthetic Peptide, GGSGGS linker

<400> SEQUENCE: 69

Gly Gly Ser Gly Gly Ser
1               5

<210> SEQ ID NO 70
<211> LENGTH: 1034
<212> TYPE: PRT
<213> ORGANISM: Artificial Sequence
<220> FEATURE:
<223> OTHER INFORMATION: Synthetic Polypeptide, amino acid residues
      (721st to 745th amino acid residues of dSaCas9) deletion mutant
      with GGSGGS linker
<220> FEATURE:
<221> NAME/KEY: VARIANT
<222> LOCATION: (10)..(10)
<223> OTHER INFORMATION: conversion of Asp residue into Ala residue
<220> FEATURE:
<221> NAME/KEY: VARIANT
<222> LOCATION: (580)..(580)
<223> OTHER INFORMATION: conversion of Asn residue into Ala residue
<220> FEATURE:
<221> NAME/KEY: MISC_FEATURE
<222> LOCATION: (721)..(726)
<223> OTHER INFORMATION: GGSGGS linker

<400> SEQUENCE: 70
```

```
Met Lys Arg Asn Tyr Ile Leu Gly Leu Ala Ile Gly Ile Thr Ser Val
1               5                   10                  15

Gly Tyr Gly Ile Ile Asp Tyr Glu Thr Arg Asp Val Ile Asp Ala Gly
                20                  25                  30

Val Arg Leu Phe Lys Glu Ala Asn Val Glu Asn Asn Glu Gly Arg Arg
            35                  40                  45

Ser Lys Arg Gly Ala Arg Arg Leu Lys Arg Arg Arg His Arg Ile
    50                  55                  60

Gln Arg Val Lys Lys Leu Leu Phe Asp Tyr Asn Leu Leu Thr Asp His
65                  70                  75                  80

Ser Glu Leu Ser Gly Ile Asn Pro Tyr Glu Ala Arg Val Lys Gly Leu
                85                  90                  95

Ser Gln Lys Leu Ser Glu Glu Phe Ser Ala Leu Leu His Leu
                100                 105                 110

Ala Lys Arg Arg Gly Val His Asn Val Asn Glu Val Glu Glu Asp Thr
        115                 120                 125

Gly Asn Glu Leu Ser Thr Lys Glu Gln Ile Ser Arg Asn Ser Lys Ala
        130                 135                 140

Leu Glu Glu Lys Tyr Val Ala Glu Leu Gln Leu Glu Arg Leu Lys Lys
145                 150                 155                 160

Asp Gly Glu Val Arg Gly Ser Ile Asn Arg Phe Lys Thr Ser Asp Tyr
                165                 170                 175

Val Lys Glu Ala Lys Gln Leu Leu Lys Val Gln Lys Ala Tyr His Gln
                180                 185                 190

Leu Asp Gln Ser Phe Ile Asp Thr Tyr Ile Asp Leu Leu Glu Thr Arg
        195                 200                 205

Arg Thr Tyr Tyr Glu Gly Pro Gly Glu Gly Ser Pro Phe Gly Trp Lys
        210                 215                 220

Asp Ile Lys Glu Trp Tyr Glu Met Leu Met Gly His Cys Thr Tyr Phe
225                 230                 235                 240

Pro Glu Glu Leu Arg Ser Val Lys Tyr Ala Tyr Asn Ala Asp Leu Tyr
                245                 250                 255

Asn Ala Leu Asn Asp Leu Asn Asn Leu Val Ile Thr Arg Asp Glu Asn
            260                 265                 270

Glu Lys Leu Glu Tyr Tyr Glu Lys Phe Gln Ile Ile Glu Asn Val Phe
        275                 280                 285

Lys Gln Lys Lys Lys Pro Thr Leu Lys Gln Ile Ala Lys Glu Ile Leu
290                 295                 300

Val Asn Glu Glu Asp Ile Lys Gly Tyr Arg Val Thr Ser Thr Gly Lys
305                 310                 315                 320

Pro Glu Phe Thr Asn Leu Lys Val Tyr His Asp Ile Lys Asp Ile Thr
            325                 330                 335

Ala Arg Lys Glu Ile Ile Glu Asn Ala Glu Leu Leu Asp Gln Ile Ala
        340                 345                 350

Lys Ile Leu Thr Ile Tyr Gln Ser Ser Glu Asp Ile Gln Glu Glu Leu
        355                 360                 365

Thr Asn Leu Asn Ser Glu Leu Thr Gln Glu Glu Ile Glu Gln Ile Ser
    370                 375                 380

Asn Leu Lys Gly Tyr Thr Gly Thr His Asn Leu Ser Leu Lys Ala Ile
385                 390                 395                 400

Asn Leu Ile Leu Asp Glu Leu Trp His Thr Asn Asp Asn Gln Ile Ala
                405                 410                 415
```

```
Ile Phe Asn Arg Leu Lys Leu Val Pro Lys Lys Val Asp Leu Ser Gln
                420                 425                 430

Gln Lys Glu Ile Pro Thr Thr Leu Val Asp Asp Phe Ile Leu Ser Pro
            435                 440                 445

Val Val Lys Arg Ser Phe Ile Gln Ser Ile Lys Val Ile Asn Ala Ile
        450                 455                 460

Ile Lys Lys Tyr Gly Leu Pro Asn Asp Ile Ile Glu Leu Ala Arg
465                 470                 475                 480

Glu Lys Asn Ser Lys Asp Ala Gln Lys Met Ile Asn Glu Met Gln Lys
                485                 490                 495

Arg Asn Arg Gln Thr Asn Glu Arg Ile Glu Glu Ile Ile Arg Thr Thr
            500                 505                 510

Gly Lys Glu Asn Ala Lys Tyr Leu Ile Glu Lys Ile Lys Leu His Asp
        515                 520                 525

Met Gln Glu Gly Lys Cys Leu Tyr Ser Leu Glu Ala Ile Pro Leu Glu
    530                 535                 540

Asp Leu Leu Asn Asn Pro Phe Asn Tyr Glu Val Asp His Ile Ile Pro
545                 550                 555                 560

Arg Ser Val Ser Phe Asp Asn Ser Phe Asn Asn Lys Val Leu Val Lys
                565                 570                 575

Gln Glu Glu Ala Ser Lys Lys Gly Asn Arg Thr Pro Phe Gln Tyr Leu
            580                 585                 590

Ser Ser Ser Asp Ser Lys Ile Ser Tyr Glu Thr Phe Lys Lys His Ile
        595                 600                 605

Leu Asn Leu Ala Lys Gly Lys Gly Arg Ile Ser Lys Thr Lys Lys Glu
    610                 615                 620

Tyr Leu Leu Glu Glu Arg Asp Ile Asn Arg Phe Ser Val Gln Lys Asp
625                 630                 635                 640

Phe Ile Asn Arg Asn Leu Val Asp Thr Arg Tyr Ala Thr Arg Gly Leu
                645                 650                 655

Met Asn Leu Leu Arg Ser Tyr Phe Arg Val Asn Asn Leu Asp Val Lys
            660                 665                 670

Val Lys Ser Ile Asn Gly Gly Phe Thr Ser Phe Leu Arg Arg Lys Trp
        675                 680                 685

Lys Phe Lys Lys Glu Arg Asn Lys Gly Tyr Lys His His Ala Glu Asp
    690                 695                 700

Ala Leu Ile Ile Ala Asn Ala Asp Phe Ile Phe Lys Glu Trp Lys Lys
705                 710                 715                 720

Gly Gly Ser Gly Gly Ser Thr Glu Gln Glu Tyr Lys Glu Ile Phe Ile
                725                 730                 735

Thr Pro His Gln Ile Lys His Ile Lys Asp Phe Lys Asp Tyr Lys Tyr
            740                 745                 750

Ser His Arg Val Asp Lys Lys Pro Asn Arg Glu Leu Ile Asn Asp Thr
        755                 760                 765

Leu Tyr Ser Thr Arg Lys Asp Asp Lys Gly Asn Thr Leu Ile Val Asn
    770                 775                 780

Asn Leu Asn Gly Leu Tyr Asp Lys Asp Asn Asp Lys Leu Lys Lys Leu
785                 790                 795                 800

Ile Asn Lys Ser Pro Glu Lys Leu Leu Met Tyr His His Asp Pro Gln
                805                 810                 815

Thr Tyr Gln Lys Leu Lys Leu Ile Met Glu Gln Tyr Gly Asp Glu Lys
            820                 825                 830

Asn Pro Leu Tyr Lys Tyr Tyr Glu Glu Thr Gly Asn Tyr Leu Thr Lys
```

-continued

```
                      835                 840                 845
Tyr Ser Lys Lys Asp Asn Gly Pro Val Ile Lys Lys Ile Lys Tyr Tyr
    850                 855                 860
Gly Asn Lys Leu Asn Ala His Leu Asp Ile Thr Asp Asp Tyr Pro Asn
865                 870                 875                 880
Ser Arg Asn Lys Val Val Lys Leu Ser Leu Lys Pro Tyr Arg Phe Asp
                885                 890                 895
Val Tyr Leu Asp Asn Gly Val Tyr Lys Phe Val Thr Val Lys Asn Leu
            900                 905                 910
Asp Val Ile Lys Lys Glu Asn Tyr Tyr Glu Val Asn Ser Lys Cys Tyr
        915                 920                 925
Glu Glu Ala Lys Lys Leu Lys Lys Ile Ser Asn Gln Ala Glu Phe Ile
    930                 935                 940
Ala Ser Phe Tyr Asn Asn Asp Leu Ile Lys Ile Asn Gly Glu Leu Tyr
945                 950                 955                 960
Arg Val Ile Gly Val Asn Asn Asp Leu Leu Asn Arg Ile Glu Val Asn
                965                 970                 975
Met Ile Asp Ile Thr Tyr Arg Glu Tyr Leu Glu Asn Met Asn Asp Lys
            980                 985                 990
Arg Pro Pro Arg Ile Ile Lys Thr  Ile Ala Ser Lys Thr  Gln Ser Ile
        995                 1000                1005
Lys Lys  Tyr Ser Thr Asp Ile  Leu Gly Asn Leu Tyr  Glu Val Lys
    1010                1015                1020
Ser Lys  Lys His Pro Gln Ile  Ile Lys Lys Gly
    1025                1030
```

```
<210> SEQ ID NO 71
<211> LENGTH: 886
<212> TYPE: PRT
<213> ORGANISM: Artificial Sequence
<220> FEATURE:
<223> OTHER INFORMATION: Synthetic polypeptide, amino acid residues
      (482nd to 648th amino acid residues of dSaCas9) deletion mutant
<220> FEATURE:
<221> NAME/KEY: VARIANT
<222> LOCATION: (10)..(10)
<223> OTHER INFORMATION: conversion of Asp residue into Ala residue

<400> SEQUENCE: 71

Met Lys Arg Asn Tyr Ile Leu Gly Leu Ala Ile Gly Ile Thr Ser Val
1               5                   10                  15
Gly Tyr Gly Ile Ile Asp Tyr Glu Thr Arg Asp Val Ile Asp Ala Gly
            20                  25                  30
Val Arg Leu Phe Lys Glu Ala Asn Val Glu Asn Asn Glu Gly Arg Arg
        35                  40                  45
Ser Lys Arg Gly Ala Arg Arg Leu Lys Arg Arg Arg His Arg Ile
    50                  55                  60
Gln Arg Val Lys Lys Leu Leu Phe Asp Tyr Asn Leu Leu Thr Asp His
65                  70                  75                  80
Ser Glu Leu Ser Gly Ile Asn Pro Tyr Glu Ala Arg Val Lys Gly Leu
                85                  90                  95
Ser Gln Lys Leu Ser Glu Glu Phe Ser Ala Ala Leu Leu His Leu
            100                 105                 110
Ala Lys Arg Arg Gly Val His Asn Val Asn Glu Val Glu Glu Asp Thr
        115                 120                 125
Gly Asn Glu Leu Ser Thr Lys Glu Gln Ile Ser Arg Asn Ser Lys Ala
    130                 135                 140
```

```
Leu Glu Glu Lys Tyr Val Ala Glu Leu Gln Leu Arg Leu Lys Lys
145                 150                 155                 160

Asp Gly Glu Val Arg Gly Ser Ile Asn Arg Phe Lys Thr Ser Asp Tyr
                165                 170                 175

Val Lys Glu Ala Lys Gln Leu Leu Lys Val Gln Lys Ala Tyr His Gln
                180                 185                 190

Leu Asp Gln Ser Phe Ile Asp Thr Tyr Ile Asp Leu Leu Glu Thr Arg
                195                 200                 205

Arg Thr Tyr Tyr Glu Gly Pro Gly Glu Gly Ser Pro Phe Gly Trp Lys
            210                 215                 220

Asp Ile Lys Glu Trp Tyr Glu Met Leu Met Gly His Cys Thr Tyr Phe
225                 230                 235                 240

Pro Glu Glu Leu Arg Ser Val Lys Tyr Ala Tyr Asn Ala Asp Leu Tyr
                245                 250                 255

Asn Ala Leu Asn Asp Leu Asn Asn Leu Val Ile Thr Arg Asp Glu Asn
                260                 265                 270

Glu Lys Leu Glu Tyr Tyr Glu Lys Phe Gln Ile Ile Glu Asn Val Phe
            275                 280                 285

Lys Gln Lys Lys Lys Pro Thr Leu Lys Gln Ile Ala Lys Glu Ile Leu
290                 295                 300

Val Asn Glu Glu Asp Ile Lys Gly Tyr Arg Val Thr Ser Thr Gly Lys
305                 310                 315                 320

Pro Glu Phe Thr Asn Leu Lys Val Tyr His Asp Ile Lys Asp Ile Thr
                325                 330                 335

Ala Arg Lys Glu Ile Ile Glu Asn Ala Glu Leu Leu Asp Gln Ile Ala
                340                 345                 350

Lys Ile Leu Thr Ile Tyr Gln Ser Ser Glu Asp Ile Gln Glu Glu Leu
                355                 360                 365

Thr Asn Leu Asn Ser Glu Leu Thr Gln Glu Glu Ile Glu Gln Ile Ser
            370                 375                 380

Asn Leu Lys Gly Tyr Thr Gly Thr His Asn Leu Ser Leu Lys Ala Ile
385                 390                 395                 400

Asn Leu Ile Leu Asp Glu Leu Trp His Thr Asn Asp Asn Gln Ile Ala
                405                 410                 415

Ile Phe Asn Arg Leu Lys Leu Val Pro Lys Lys Val Asp Leu Ser Gln
                420                 425                 430

Gln Lys Glu Ile Pro Thr Thr Leu Val Asp Asp Phe Ile Leu Ser Pro
            435                 440                 445

Val Val Lys Arg Ser Phe Ile Gln Ser Ile Lys Val Ile Asn Ala Ile
            450                 455                 460

Ile Lys Lys Tyr Gly Leu Pro Asn Asp Ile Ile Ile Glu Leu Ala Arg
465                 470                 475                 480

Glu Thr Arg Tyr Ala Thr Arg Gly Leu Met Asn Leu Leu Arg Ser Tyr
                485                 490                 495

Phe Arg Val Asn Asn Leu Asp Val Lys Val Lys Ser Ile Asn Gly Gly
                500                 505                 510

Phe Thr Ser Phe Leu Arg Arg Lys Trp Lys Phe Lys Lys Glu Arg Asn
                515                 520                 525

Lys Gly Tyr Lys His His Ala Glu Asp Ala Leu Ile Ile Ala Asn Ala
            530                 535                 540

Asp Phe Ile Phe Lys Glu Trp Lys Lys Leu Asp Lys Ala Lys Lys Val
545                 550                 555                 560
```

```
Met Glu Asn Gln Met Phe Glu Glu Lys Gln Ala Glu Ser Met Pro Glu
                565                 570                 575
Ile Glu Thr Glu Gln Glu Tyr Lys Glu Ile Phe Ile Thr Pro His Gln
            580                 585                 590
Ile Lys His Ile Lys Asp Phe Lys Asp Tyr Lys Tyr Ser His Arg Val
        595                 600                 605
Asp Lys Lys Pro Asn Arg Glu Leu Ile Asn Asp Thr Leu Tyr Ser Thr
    610                 615                 620
Arg Lys Asp Asp Lys Gly Asn Thr Leu Ile Val Asn Asn Leu Asn Gly
625                 630                 635                 640
Leu Tyr Asp Lys Asp Asn Asp Lys Leu Lys Lys Leu Ile Asn Lys Ser
            645                 650                 655
Pro Glu Lys Leu Leu Met Tyr His His Asp Pro Gln Thr Tyr Gln Lys
            660                 665                 670
Leu Lys Leu Ile Met Glu Gln Tyr Gly Asp Glu Lys Asn Pro Leu Tyr
        675                 680                 685
Lys Tyr Tyr Glu Glu Thr Gly Asn Tyr Leu Thr Lys Tyr Ser Lys Lys
    690                 695                 700
Asp Asn Gly Pro Val Ile Lys Lys Ile Lys Tyr Tyr Gly Asn Lys Leu
705                 710                 715                 720
Asn Ala His Leu Asp Ile Thr Asp Asp Tyr Pro Asn Ser Arg Asn Lys
                725                 730                 735
Val Val Lys Leu Ser Leu Lys Pro Tyr Arg Phe Asp Val Tyr Leu Asp
            740                 745                 750
Asn Gly Val Tyr Lys Phe Val Thr Val Lys Asn Leu Asp Val Ile Lys
        755                 760                 765
Lys Glu Asn Tyr Tyr Glu Val Asn Ser Lys Cys Tyr Glu Glu Ala Lys
    770                 775                 780
Lys Leu Lys Lys Ile Ser Asn Gln Ala Glu Phe Ile Ala Ser Phe Tyr
785                 790                 795                 800
Asn Asn Asp Leu Ile Lys Ile Asn Gly Glu Leu Tyr Arg Val Ile Gly
                805                 810                 815
Val Asn Asn Asp Leu Leu Asn Arg Ile Glu Val Asn Met Ile Asp Ile
            820                 825                 830
Thr Tyr Arg Glu Tyr Leu Glu Asn Met Asn Asp Lys Arg Pro Pro Arg
        835                 840                 845
Ile Ile Lys Thr Ile Ala Ser Lys Thr Gln Ser Ile Lys Lys Tyr Ser
    850                 855                 860
Thr Asp Ile Leu Gly Asn Leu Tyr Glu Val Lys Ser Lys Lys His Pro
865                 870                 875                 880
Gln Ile Ile Lys Lys Gly
                885

<210> SEQ ID NO 72
<211> LENGTH: 892
<212> TYPE: PRT
<213> ORGANISM: Artificial Sequence
<220> FEATURE:
<223> OTHER INFORMATION: Synthetic Polypeptide, amino acid residues
      (482nd to 648th amino acid residues of dSaCas9) deletion mutant
      with GGSGGS linker
<220> FEATURE:
<221> NAME/KEY: VARIANT
<222> LOCATION: (10)..(10)
<223> OTHER INFORMATION: conversion of Asp residue into Ala residue
<220> FEATURE:
<221> NAME/KEY: MISC_FEATURE
<222> LOCATION: (482)..(487)
```

<223> OTHER INFORMATION: GGSGGS linker

<400> SEQUENCE: 72

Met Lys Arg Asn Tyr Ile Leu Gly Leu Ala Ile Gly Ile Thr Ser Val
1               5                   10                  15

Gly Tyr Gly Ile Ile Asp Tyr Glu Thr Arg Asp Val Ile Asp Ala Gly
                20                  25                  30

Val Arg Leu Phe Lys Glu Ala Asn Val Glu Asn Asn Glu Gly Arg Arg
            35                  40                  45

Ser Lys Arg Gly Ala Arg Arg Leu Lys Arg Arg Arg His Arg Ile
    50                  55                  60

Gln Arg Val Lys Lys Leu Leu Phe Asp Tyr Asn Leu Leu Thr Asp His
65                  70                  75                  80

Ser Glu Leu Ser Gly Ile Asn Pro Tyr Glu Ala Arg Val Lys Gly Leu
                85                  90                  95

Ser Gln Lys Leu Ser Glu Glu Phe Ser Ala Ala Leu Leu His Leu
                100                 105                 110

Ala Lys Arg Arg Gly Val His Asn Val Asn Glu Val Glu Glu Asp Thr
            115                 120                 125

Gly Asn Glu Leu Ser Thr Lys Glu Gln Ile Ser Arg Asn Ser Lys Ala
    130                 135                 140

Leu Glu Glu Lys Tyr Val Ala Glu Leu Gln Leu Glu Arg Leu Lys Lys
145                 150                 155                 160

Asp Gly Glu Val Arg Gly Ser Ile Asn Arg Phe Lys Thr Ser Asp Tyr
                165                 170                 175

Val Lys Glu Ala Lys Gln Leu Leu Lys Val Gln Lys Ala Tyr His Gln
                180                 185                 190

Leu Asp Gln Ser Phe Ile Asp Thr Tyr Ile Asp Leu Leu Glu Thr Arg
            195                 200                 205

Arg Thr Tyr Tyr Glu Gly Pro Gly Glu Gly Ser Pro Phe Gly Trp Lys
    210                 215                 220

Asp Ile Lys Glu Trp Tyr Glu Met Leu Met Gly His Cys Thr Tyr Phe
225                 230                 235                 240

Pro Glu Glu Leu Arg Ser Val Lys Tyr Ala Tyr Asn Ala Asp Leu Tyr
                245                 250                 255

Asn Ala Leu Asn Asp Leu Asn Asn Leu Val Ile Thr Arg Asp Glu Asn
            260                 265                 270

Glu Lys Leu Glu Tyr Tyr Glu Lys Phe Gln Ile Ile Glu Asn Val Phe
    275                 280                 285

Lys Gln Lys Lys Lys Pro Thr Leu Lys Gln Ile Ala Lys Glu Ile Leu
290                 295                 300

Val Asn Glu Glu Asp Ile Lys Gly Tyr Arg Val Thr Ser Thr Gly Lys
305                 310                 315                 320

Pro Glu Phe Thr Asn Leu Lys Val Tyr His Asp Ile Lys Asp Ile Thr
                325                 330                 335

Ala Arg Lys Glu Ile Ile Glu Asn Ala Glu Leu Leu Asp Gln Ile Ala
            340                 345                 350

Lys Ile Leu Thr Ile Tyr Gln Ser Ser Glu Asp Ile Gln Glu Glu Leu
    355                 360                 365

Thr Asn Leu Asn Ser Glu Leu Thr Gln Glu Glu Ile Glu Gln Ile Ser
370                 375                 380

Asn Leu Lys Gly Tyr Thr Gly Thr His Asn Leu Ser Leu Lys Ala Ile
385                 390                 395                 400

```
Asn Leu Ile Leu Asp Glu Leu Trp His Thr Asn Asp Asn Gln Ile Ala
                405                 410                 415
Ile Phe Asn Arg Leu Lys Leu Val Pro Lys Lys Val Asp Leu Ser Gln
            420                 425                 430
Gln Lys Glu Ile Pro Thr Thr Leu Val Asp Asp Phe Ile Leu Ser Pro
        435                 440                 445
Val Val Lys Arg Ser Phe Ile Gln Ser Ile Lys Val Ile Asn Ala Ile
    450                 455                 460
Ile Lys Lys Tyr Gly Leu Pro Asn Asp Ile Ile Glu Leu Ala Arg
465                 470                 475                 480
Glu Gly Gly Ser Gly Gly Ser Thr Arg Tyr Ala Thr Arg Gly Leu Met
                485                 490                 495
Asn Leu Leu Arg Ser Tyr Phe Arg Val Asn Asn Leu Asp Val Lys Val
            500                 505                 510
Lys Ser Ile Asn Gly Gly Phe Thr Ser Phe Leu Arg Arg Lys Trp Lys
        515                 520                 525
Phe Lys Lys Glu Arg Asn Lys Gly Tyr Lys His His Ala Glu Asp Ala
    530                 535                 540
Leu Ile Ile Ala Asn Ala Asp Phe Ile Phe Lys Glu Trp Lys Lys Leu
545                 550                 555                 560
Asp Lys Ala Lys Lys Val Met Glu Asn Gln Met Phe Glu Lys Gln
                565                 570                 575
Ala Glu Ser Met Pro Glu Ile Glu Thr Glu Gln Glu Tyr Lys Glu Ile
            580                 585                 590
Phe Ile Thr Pro His Gln Ile Lys His Ile Lys Asp Phe Lys Asp Tyr
            595                 600                 605
Lys Tyr Ser His Arg Val Asp Lys Lys Pro Asn Arg Glu Leu Ile Asn
        610                 615                 620
Asp Thr Leu Tyr Ser Thr Arg Lys Asp Asp Lys Gly Asn Thr Leu Ile
625                 630                 635                 640
Val Asn Asn Leu Asn Gly Leu Tyr Asp Lys Asp Asn Asp Lys Leu Lys
                645                 650                 655
Lys Leu Ile Asn Lys Ser Pro Glu Lys Leu Leu Met Tyr His His Asp
            660                 665                 670
Pro Gln Thr Tyr Gln Lys Leu Lys Leu Ile Met Glu Gln Tyr Gly Asp
        675                 680                 685
Glu Lys Asn Pro Leu Tyr Lys Tyr Tyr Glu Glu Thr Gly Asn Tyr Leu
    690                 695                 700
Thr Lys Tyr Ser Lys Lys Asp Asn Gly Pro Val Ile Lys Lys Ile Lys
705                 710                 715                 720
Tyr Tyr Gly Asn Lys Leu Asn Ala His Leu Asp Ile Thr Asp Asp Tyr
                725                 730                 735
Pro Asn Ser Arg Asn Lys Val Val Lys Leu Ser Leu Lys Pro Tyr Arg
            740                 745                 750
Phe Asp Val Tyr Leu Asp Asn Gly Val Tyr Lys Phe Val Thr Val Lys
        755                 760                 765
Asn Leu Asp Val Ile Lys Lys Glu Asn Tyr Tyr Glu Val Asn Ser Lys
    770                 775                 780
Cys Tyr Glu Glu Ala Lys Lys Leu Lys Lys Ile Ser Asn Gln Ala Glu
785                 790                 795                 800
Phe Ile Ala Ser Phe Tyr Asn Asn Asp Leu Ile Lys Ile Asn Gly Glu
                805                 810                 815
Leu Tyr Arg Val Ile Gly Val Asn Asn Asp Leu Leu Asn Arg Ile Glu
```

```
                820                 825                 830
Val Asn Met Ile Asp Ile Thr Tyr Arg Glu Tyr Leu Glu Asn Met Asn
                835                 840                 845

Asp Lys Arg Pro Pro Arg Ile Ile Lys Thr Ile Ala Ser Lys Thr Gln
    850                 855                 860

Ser Ile Lys Lys Tyr Ser Thr Asp Ile Leu Gly Asn Leu Tyr Glu Val
865                 870                 875                 880

Lys Ser Lys Lys His Pro Gln Ile Ile Lys Lys Gly
                885                 890
```

```
<210> SEQ ID NO 73
<211> LENGTH: 50
<212> TYPE: PRT
<213> ORGANISM: Artificial Sequence
<220> FEATURE:
<223> OTHER INFORMATION: Synthetic Peptide VP64

<400> SEQUENCE: 73
```

```
Asp Ala Leu Asp Asp Phe Asp Leu Asp Met Leu Gly Ser Asp Ala Leu
1               5                   10                  15

Asp Asp Phe Asp Leu Asp Met Leu Gly Ser Asp Ala Leu Asp Asp Phe
                20                  25                  30

Asp Leu Asp Met Leu Gly Ser Asp Ala Leu Asp Asp Phe Asp Leu Asp
        35                  40                  45

Met Leu
    50
```

```
<210> SEQ ID NO 74
<211> LENGTH: 376
<212> TYPE: PRT
<213> ORGANISM: Artificial Sequence
<220> FEATURE:
<223> OTHER INFORMATION: Synthetic Polypeptide VPH

<400> SEQUENCE: 74
```

```
Asp Ala Leu Asp Asp Phe Asp Leu Asp Met Leu Gly Ser Asp Ala Leu
1               5                   10                  15

Asp Asp Phe Asp Leu Asp Met Leu Gly Ser Asp Ala Leu Asp Asp Phe
                20                  25                  30

Asp Leu Asp Met Leu Gly Ser Asp Ala Leu Asp Asp Phe Asp Leu Asp
        35                  40                  45

Met Leu Ser Ser Gly Ser Pro Lys Lys Lys Arg Lys Val Gly Ser Pro
    50                  55                  60

Ser Gly Gln Ile Ser Asn Gln Ala Leu Ala Leu Ala Pro Ser Ser Ala
65                  70                  75                  80

Pro Val Leu Ala Gln Thr Met Val Pro Ser Ser Ala Met Val Pro Leu
                85                  90                  95

Ala Gln Pro Pro Ala Pro Ala Pro Val Leu Thr Pro Gly Pro Pro Gln
                100                 105                 110

Ser Leu Ser Ala Pro Val Pro Lys Ser Thr Gln Ala Gly Glu Gly Thr
        115                 120                 125

Leu Ser Glu Ala Leu Leu His Leu Gln Phe Asp Ala Asp Glu Asp Leu
    130                 135                 140

Gly Ala Leu Leu Gly Asn Ser Thr Asp Pro Gly Val Phe Thr Asp Leu
145                 150                 155                 160

Ala Ser Val Asp Asn Ser Glu Phe Gln Gln Leu Leu Asn Gln Gly Val
                165                 170                 175
```

```
Ser Met Ser His Ser Thr Ala Glu Pro Met Leu Met Glu Tyr Pro Glu
            180                 185                 190

Ala Ile Thr Arg Leu Val Thr Gly Ser Gln Arg Pro Pro Asp Pro Ala
        195                 200                 205

Pro Thr Pro Leu Gly Thr Ser Gly Leu Pro Asn Gly Leu Ser Gly Asp
    210                 215                 220

Glu Asp Phe Ser Ser Ile Ala Asp Met Asp Phe Ser Ala Leu Leu Ser
225                 230                 235                 240

Gln Ile Ser Ser Ser Gly Gln Gly Gly Gly Ser Gly Phe Ser Val
                245                 250                 255

Asp Thr Ser Ala Leu Leu Asp Leu Phe Ser Pro Ser Val Thr Val Pro
        260                 265                 270

Asp Met Ser Leu Pro Asp Leu Asp Ser Ser Leu Ala Ser Ile Gln Glu
    275                 280                 285

Leu Leu Ser Pro Gln Glu Pro Pro Arg Pro Pro Glu Ala Glu Asn Ser
290                 295                 300

Ser Pro Asp Ser Gly Lys Gln Leu Val His Tyr Thr Ala Gln Pro Leu
305                 310                 315                 320

Phe Leu Leu Asp Pro Gly Ser Val Asp Thr Gly Ser Asn Asp Leu Pro
                325                 330                 335

Val Leu Phe Glu Leu Gly Glu Gly Ser Tyr Phe Ser Glu Gly Asp Gly
            340                 345                 350

Phe Ala Glu Asp Pro Thr Ile Ser Leu Leu Thr Gly Ser Glu Pro Pro
        355                 360                 365

Lys Ala Lys Asp Pro Thr Val Ser
    370                 375

<210> SEQ ID NO 75
<211> LENGTH: 523
<212> TYPE: PRT
<213> ORGANISM: Artificial Sequence
<220> FEATURE:
<223> OTHER INFORMATION: Synthetic Polypeptide VPR

<400> SEQUENCE: 75

Glu Ala Ser Gly Ser Gly Arg Ala Asp Ala Leu Asp Asp Phe Asp Leu
1               5                   10                  15

Asp Met Leu Gly Ser Asp Ala Leu Asp Asp Phe Asp Leu Asp Met Leu
            20                  25                  30

Gly Ser Asp Ala Leu Asp Asp Phe Asp Leu Asp Met Leu Gly Ser Asp
        35                  40                  45

Ala Leu Asp Asp Phe Asp Leu Asp Met Leu Ile Asn Ser Arg Ser Ser
50                  55                  60

Gly Ser Pro Gln Tyr Leu Pro Asp Thr Asp Asp Arg His Arg Ile Glu
65                  70                  75                  80

Glu Lys Arg Lys Arg Thr Tyr Glu Thr Phe Lys Ser Ile Met Lys Lys
            85                  90                  95

Ser Pro Phe Ser Gly Pro Thr Asp Pro Arg Pro Pro Arg Arg Ile
        100                 105                 110

Ala Val Pro Ser Arg Ser Ser Ala Ser Val Pro Lys Pro Ala Pro Gln
    115                 120                 125

Pro Tyr Pro Phe Thr Ser Ser Leu Ser Thr Ile Asn Tyr Asp Glu Phe
130                 135                 140

Pro Thr Met Val Phe Pro Ser Gly Gln Ile Ser Gln Ala Ser Ala Leu
145                 150                 155                 160
```

```
Ala Pro Ala Pro Pro Gln Val Leu Pro Gln Ala Pro Ala Pro
            165                 170                 175
Ala Pro Ala Met Val Ser Ala Leu Ala Gln Ala Pro Ala Pro Val Pro
        180                 185                 190
Val Leu Ala Pro Gly Pro Pro Gln Ala Val Ala Pro Ala Pro Lys
            195                 200                 205
Pro Thr Gln Ala Gly Glu Gly Thr Leu Ser Glu Ala Leu Leu Gln Leu
        210                 215                 220
Gln Phe Asp Asp Glu Asp Leu Gly Ala Leu Leu Gly Asn Ser Thr Asp
225                 230                 235                 240
Pro Ala Val Phe Thr Asp Leu Ala Ser Val Asp Asn Ser Glu Phe Gln
                245                 250                 255
Gln Leu Leu Asn Gln Gly Ile Pro Val Ala Pro His Thr Thr Glu Pro
            260                 265                 270
Met Leu Met Glu Tyr Pro Glu Ala Ile Thr Arg Leu Val Thr Gly Ala
        275                 280                 285
Gln Arg Pro Pro Asp Pro Ala Pro Ala Pro Leu Gly Ala Pro Gly Leu
    290                 295                 300
Pro Asn Gly Leu Leu Ser Gly Asp Glu Asp Phe Ser Ser Ile Ala Asp
305                 310                 315                 320
Met Asp Phe Ser Ala Leu Leu Gly Ser Gly Ser Gly Ser Arg Asp Ser
                325                 330                 335
Arg Glu Gly Met Phe Leu Pro Lys Pro Glu Ala Gly Ser Ala Ile Ser
            340                 345                 350
Asp Val Phe Glu Gly Arg Glu Val Cys Gln Pro Lys Arg Ile Arg Pro
        355                 360                 365
Phe His Pro Pro Gly Ser Pro Trp Ala Asn Arg Pro Leu Pro Ala Ser
    370                 375                 380
Leu Ala Pro Thr Pro Thr Gly Pro Val His Glu Pro Val Gly Ser Leu
385                 390                 395                 400
Thr Pro Ala Pro Val Pro Gln Pro Leu Asp Pro Ala Pro Ala Val Thr
                405                 410                 415
Pro Glu Ala Ser His Leu Leu Glu Asp Pro Asp Glu Glu Thr Ser Gln
            420                 425                 430
Ala Val Lys Ala Leu Arg Glu Met Ala Asp Thr Val Ile Pro Gln Lys
        435                 440                 445
Glu Glu Ala Ala Ile Cys Gly Gln Met Asp Leu Ser His Pro Pro Pro
    450                 455                 460
Arg Gly His Leu Asp Glu Leu Thr Thr Thr Leu Glu Ser Met Thr Glu
465                 470                 475                 480
Asp Leu Asn Leu Asp Ser Pro Leu Thr Pro Glu Leu Asn Glu Ile Leu
                485                 490                 495
Asp Thr Phe Leu Asn Asp Glu Cys Leu Leu His Ala Met His Ile Ser
            500                 505                 510
Thr Gly Leu Ser Ile Phe Asp Thr Ser Leu Phe
        515                 520

<210> SEQ ID NO 76
<211> LENGTH: 167
<212> TYPE: PRT
<213> ORGANISM: Artificial Sequence
<220> FEATURE:
<223> OTHER INFORMATION: Synthetic Polypeptide MiniVR

<400> SEQUENCE: 76
```

Asp Ala Leu Asp Asp Phe Asp Leu Asp Met Leu Gly Ser Asp Ala Leu
1               5                   10                  15

Asp Asp Phe Asp Leu Asp Met Leu Gly Ser Asp Ala Leu Asp Asp Phe
            20                  25                  30

Asp Leu Asp Met Leu Gly Ser Asp Ala Leu Asp Phe Asp Leu Asp
        35                  40                  45

Met Leu Gly Ser Gly Ser Pro Ala Pro Ala Val Thr Pro Glu Ala Ser
50                  55                  60

His Leu Leu Glu Asp Pro Asp Glu Glu Thr Ser Gln Ala Val Lys Ala
65                  70                  75                  80

Leu Arg Glu Met Ala Asp Thr Val Ile Pro Gln Lys Glu Glu Ala Ala
                85                  90                  95

Ile Cys Gly Gln Met Asp Leu Ser His Pro Pro Arg Gly His Leu
                100                 105                 110

Asp Glu Leu Thr Thr Thr Leu Glu Ser Met Thr Glu Asp Leu Asn Leu
                115                 120                 125

Asp Ser Pro Leu Thr Pro Glu Leu Asn Glu Ile Leu Asp Thr Phe Leu
    130                 135                 140

Asn Asp Glu Cys Leu Leu His Ala Met His Ile Ser Thr Gly Leu Ser
145                 150                 155                 160

Ile Phe Asp Thr Ser Leu Phe
                165

<210> SEQ ID NO 77
<211> LENGTH: 140
<212> TYPE: PRT
<213> ORGANISM: Artificial Sequence
<220> FEATURE:
<223> OTHER INFORMATION: Synthetic Polypeptide MicroVR

<400> SEQUENCE: 77

Asp Ala Leu Asp Asp Phe Asp Leu Asp Met Leu Gly Ser Asp Ala Leu
1               5                   10                  15

Asp Asp Phe Asp Leu Asp Met Leu Gly Ser Asp Ala Leu Asp Asp Phe
            20                  25                  30

Asp Leu Asp Met Leu Gly Ser Asp Ala Leu Asp Phe Asp Leu Asp
        35                  40                  45

Met Leu Gly Ser Gly Ser Arg Glu Met Ala Asp Thr Val Ile Pro Gln
50                  55                  60

Lys Glu Glu Ala Ala Ile Cys Gly Gln Met Asp Leu Ser His Pro Pro
65                  70                  75                  80

Pro Arg Gly His Leu Asp Glu Leu Thr Thr Thr Leu Glu Ser Met Thr
                85                  90                  95

Glu Asp Leu Asn Leu Asp Ser Pro Leu Thr Pro Glu Leu Asn Glu Ile
                100                 105                 110

Leu Asp Thr Phe Leu Asn Asp Glu Cys Leu Leu His Ala Met His Ile
                115                 120                 125

Ser Thr Gly Leu Ser Ile Phe Asp Thr Ser Leu Phe
            130                 135                 140

<210> SEQ ID NO 78
<211> LENGTH: 4
<212> TYPE: PRT
<213> ORGANISM: Artificial Sequence
<220> FEATURE:
<223> OTHER INFORMATION: Synthetic Peptide GSGS linker

<400> SEQUENCE: 78

Gly Ser Gly Ser

<210> SEQ ID NO 79
<211> LENGTH: 21
<212> TYPE: RNA
<213> ORGANISM: Homo sapiens
<220> FEATURE:
<221> NAME/KEY: misc_feature
<222> LOCATION: (1)..(21)
<223> OTHER INFORMATION: crRNA corresponding to the target sequence (SEQ
      ID NO:15)

<400> SEQUENCE: 79
ucucgccucc gccgccacuc g                                              21

<210> SEQ ID NO 80
<211> LENGTH: 21
<212> TYPE: DNA
<213> ORGANISM: Homo sapiens
<220> FEATURE:
<221> NAME/KEY: misc_feature
<222> LOCATION: (1)..(21)
<223> OTHER INFORMATION: sequence complementary to the target sequence
      (SEQ ID NO:15)

<400> SEQUENCE: 80
cgagtggcgg cggaggcgag a                                              21

<210> SEQ ID NO 81
<211> LENGTH: 19
<212> TYPE: DNA
<213> ORGANISM: Francisella novicid
<220> FEATURE:
<221> NAME/KEY: misc_structure
<222> LOCATION: (1)..(19)
<223> OTHER INFORMATION: 5'-handle of crRNA

<400> SEQUENCE: 81
aatttctact gttgtagat                                                 19

<210> SEQ ID NO 82
<211> LENGTH: 83
<212> TYPE: DNA
<213> ORGANISM: Staphylococcus aureus
<220> FEATURE:
<221> NAME/KEY: misc_feature
<222> LOCATION: (1)..(83)
<223> OTHER INFORMATION: sequence encoding tracrRNA

<400> SEQUENCE: 82
gttttagtac tctggaaaca gaatctacta aacaaggca aaatgccgtg tttatctcgt     60
caacttgttg gcgagatttt ttt                                            83

<210> SEQ ID NO 83
<211> LENGTH: 82
<212> TYPE: RNA
<213> ORGANISM: Staphylococcus aureus
<220> FEATURE:
<221> NAME/KEY: misc_feature
<222> LOCATION: (1)..(82)
<223> OTHER INFORMATION: tracrRNA

<400> SEQUENCE: 83
guuuuaguac ucuggaaaca gaaucuacua aacaaggca aaaugccgug uuuaucucgu     60
caacuuguug gcgagauuuu uu                                             82

<210> SEQ ID NO 84
<211> LENGTH: 131
<212> TYPE: PRT
<213> ORGANISM: Artificial sequence
<220> FEATURE:
<223> OTHER INFORMATION: Synthetic Polypeptide

<400> SEQUENCE: 84

```
Asp Ala Leu Asp Asp Phe Asp Leu Asp Met Leu Gly Ser Asp Ala Leu
1               5                   10                  15
Asp Asp Phe Asp Leu Asp Met Leu Gly Ser Asp Ala Leu Asp Asp Phe
            20                  25                  30
Asp Leu Asp Met Leu Gly Ser Asp Ala Leu Asp Asp Phe Asp Leu Asp
        35                  40                  45
Met Leu Gly Ser Asp Ala Leu Asp Asp Phe Asp Leu Asp Met Leu Gly
    50                  55                  60
Ser Asp Ala Leu Asp Asp Phe Asp Leu Asp Met Leu Gly Ser Asp Ala
65                  70                  75                  80
Leu Asp Asp Phe Asp Leu Asp Met Leu Gly Ser Asp Ala Leu Asp Asp
                85                  90                  95
Phe Asp Leu Asp Met Leu Gly Ser Asp Ala Leu Asp Asp Phe Asp Leu
            100                 105                 110
Asp Met Leu Gly Ser Asp Ala Leu Asp Asp Phe Asp Leu Asp Met Leu
        115                 120                 125
Tyr Ile Asp
    130
```

<210> SEQ ID NO 85
<211> LENGTH: 21
<212> TYPE: DNA
<213> ORGANISM: Homo sapiens

<400> SEQUENCE: 85
aaaattaaga ttttctttct g                                    21

<210> SEQ ID NO 86
<211> LENGTH: 21
<212> TYPE: DNA
<213> ORGANISM: Homo sapiens

<400> SEQUENCE: 86
aacttgtttt gtatatttt a                                     21

<210> SEQ ID NO 87
<211> LENGTH: 21
<212> TYPE: DNA
<213> ORGANISM: Homo sapiens

<400> SEQUENCE: 87
taataattga gatgcattct c                                    21

<210> SEQ ID NO 88
<211> LENGTH: 21
<212> TYPE: DNA
<213> ORGANISM: Homo sapiens

<400> SEQUENCE: 88
aagctcacat ttaggaacag a                                    21

<210> SEQ ID NO 89

```
<211> LENGTH: 21
<212> TYPE: DNA
<213> ORGANISM: Homo sapiens

<400> SEQUENCE: 89
ctatggcaaa ctaaacaaag c                                              21

<210> SEQ ID NO 90
<211> LENGTH: 21
<212> TYPE: DNA
<213> ORGANISM: Homo sapiens

<400> SEQUENCE: 90
cagaagagca gaagttctta t                                              21

<210> SEQ ID NO 91
<211> LENGTH: 21
<212> TYPE: DNA
<213> ORGANISM: Homo sapiens

<400> SEQUENCE: 91
catctgagac atcgctacct g                                              21

<210> SEQ ID NO 92
<211> LENGTH: 21
<212> TYPE: DNA
<213> ORGANISM: Homo sapiens

<400> SEQUENCE: 92
gtttacctta aaacaaatt c                                               21

<210> SEQ ID NO 93
<211> LENGTH: 21
<212> TYPE: DNA
<213> ORGANISM: Homo sapiens

<400> SEQUENCE: 93
ctcctggtcc tttacaagtg g                                              21

<210> SEQ ID NO 94
<211> LENGTH: 21
<212> TYPE: DNA
<213> ORGANISM: Homo sapiens

<400> SEQUENCE: 94 agcaggggc aacgaagaag a                                               21

<210> SEQ ID NO 95
<211> LENGTH: 21
<212> TYPE: DNA
<213> ORGANISM: Homo sapiens

<400> SEQUENCE: 95
ttctggggtg atgggttcaa c                                              21

<210> SEQ ID NO 96
<211> LENGTH: 21
<212> TYPE: DNA
<213> ORGANISM: Homo sapiens

<400> SEQUENCE: 96
cccagagggc cgtggggcca t                                              21
```

```
<210> SEQ ID NO 97
<211> LENGTH: 21
<212> TYPE: DNA
<213> ORGANISM: Homo sapiens

<400> SEQUENCE: 97
tttccataga gaaatgtgtg t                                              21

<210> SEQ ID NO 98
<211> LENGTH: 21
<212> TYPE: DNA
<213> ORGANISM: Homo sapiens

<400> SEQUENCE: 98
tgggaggcgc catctgcgcg g                                              21

<210> SEQ ID NO 99
<211> LENGTH: 21
<212> TYPE: DNA
<213> ORGANISM: Homo sapiens

<400> SEQUENCE: 99
cctcaacgtt ttcctgtaag t                                              21

<210> SEQ ID NO 100
<211> LENGTH: 21
<212> TYPE: DNA
<213> ORGANISM: Homo sapiens

<400> SEQUENCE: 100
ctaagatctc cagccttgtt c                                              21

<210> SEQ ID NO 101
<211> LENGTH: 21
<212> TYPE: DNA
<213> ORGANISM: Homo sapiens

<400> SEQUENCE: 101
tgtgcctaag actgcacagg t                                              21

<210> SEQ ID NO 102
<211> LENGTH: 21
<212> TYPE: DNA
<213> ORGANISM: Homo sapiens

<400> SEQUENCE: 102
attaaacgca gatatgctat t                                              21

<210> SEQ ID NO 103
<211> LENGTH: 21
<212> TYPE: DNA
<213> ORGANISM: Homo sapiens

<400> SEQUENCE: 103
tcatagaaaa tacataagca a                                              21

<210> SEQ ID NO 104
<211> LENGTH: 21
<212> TYPE: DNA
<213> ORGANISM: Homo sapiens

<400> SEQUENCE: 104
aagaagtcac agaaatgcct c                                              21
```

```
<210> SEQ ID NO 105
<211> LENGTH: 21
<212> TYPE: DNA
<213> ORGANISM: Homo sapiens

<400> SEQUENCE: 105
ggcttggaga aaggggcaa g                                          21

<210> SEQ ID NO 106
<211> LENGTH: 21
<212> TYPE: DNA
<213> ORGANISM: Homo sapiens

<400> SEQUENCE: 106
gctcatcact ggcactgccc a                                         21

<210> SEQ ID NO 107
<211> LENGTH: 21
<212> TYPE: DNA
<213> ORGANISM: Homo sapiens

<400> SEQUENCE: 107
taaacctctt ttgccttcat g                                         21

<210> SEQ ID NO 108
<211> LENGTH: 21
<212> TYPE: DNA
<213> ORGANISM: Homo sapiens

<400> SEQUENCE: 108
ttcttatgaa taaagtttta t                                         21

<210> SEQ ID NO 109
<211> LENGTH: 21
<212> TYPE: DNA
<213> ORGANISM: Homo sapiens

<400> SEQUENCE: 109
cttcttcaaa atgttaagtt a                                         21

<210> SEQ ID NO 110
<211> LENGTH: 21
<212> TYPE: DNA
<213> ORGANISM: Homo sapiens

<400> SEQUENCE: 110
caaatgttca tcaactgatg a                                         21

<210> SEQ ID NO 111
<211> LENGTH: 21
<212> TYPE: DNA
<213> ORGANISM: Homo sapiens

<400> SEQUENCE: 111
atatggttcc atttctaagt t                                         21

<210> SEQ ID NO 112
<211> LENGTH: 21
<212> TYPE: DNA
<213> ORGANISM: Homo sapiens

<400> SEQUENCE: 112
ttgcaccaat acaccaaaac a                                         21
```

```
<210> SEQ ID NO 113
<211> LENGTH: 21
<212> TYPE: DNA
<213> ORGANISM: Homo sapiens

<400> SEQUENCE: 113
actgctctga gctacagcaa a                                              21

<210> SEQ ID NO 114
<211> LENGTH: 21
<212> TYPE: DNA
<213> ORGANISM: Homo sapiens

<400> SEQUENCE: 114
tttttgtaat tttagtagag a                                              21

<210> SEQ ID NO 115
<211> LENGTH: 21
<212> TYPE: DNA
<213> ORGANISM: Homo sapiens

<400> SEQUENCE: 115
actgcactcc agcctgggca a                                              21

<210> SEQ ID NO 116
<211> LENGTH: 21
<212> TYPE: DNA
<213> ORGANISM: Homo sapiens

<400> SEQUENCE: 116 cttttttgccc agactggtaa a                                             21

<210> SEQ ID NO 117
<211> LENGTH: 21
<212> TYPE: DNA
<213> ORGANISM: Homo sapiens

<400> SEQUENCE: 117 ttggtttttac acataaaaat c                                             21

<210> SEQ ID NO 118
<211> LENGTH: 21
<212> TYPE: DNA
<213> ORGANISM: Homo sapiens

<400> SEQUENCE: 118
tcttccactc aggacacaca a                                              21

<210> SEQ ID NO 119
<211> LENGTH: 21
<212> TYPE: DNA
<213> ORGANISM: Homo sapiens

<400> SEQUENCE: 119
tttttcacct aatgtttata a                                              21

<210> SEQ ID NO 120
<211> LENGTH: 21
<212> TYPE: DNA
<213> ORGANISM: Homo sapiens

<400> SEQUENCE: 120
```

```
ggttttttgga tttcttccca g                                          21

<210> SEQ ID NO 121
<211> LENGTH: 21
<212> TYPE: DNA
<213> ORGANISM: Homo sapiens

<400> SEQUENCE: 121
aacatcacct tgattttgag t                                           21

<210> SEQ ID NO 122
<211> LENGTH: 21
<212> TYPE: DNA
<213> ORGANISM: Homo sapiens

<400> SEQUENCE: 122
atcagggtgg cttctggtgt t                                           21

<210> SEQ ID NO 123
<211> LENGTH: 21
<212> TYPE: DNA
<213> ORGANISM: Homo sapiens

<400> SEQUENCE: 123
aaagaagaag aagaagaaaa a                                           21

<210> SEQ ID NO 124
<211> LENGTH: 21
<212> TYPE: DNA
<213> ORGANISM: Homo sapiens

<400> SEQUENCE: 124
aaaaattagc cgggcttggt g                                           21

<210> SEQ ID NO 125
<211> LENGTH: 21
<212> TYPE: DNA
<213> ORGANISM: Homo sapiens

<400> SEQUENCE: 125
aaattataga tgttcacttg g                                           21

<210> SEQ ID NO 126
<211> LENGTH: 21
<212> TYPE: DNA
<213> ORGANISM: Homo sapiens

<400> SEQUENCE: 126
aataccttga tattattatc c                                           21

<210> SEQ ID NO 127
<211> LENGTH: 21
<212> TYPE: DNA
<213> ORGANISM: Homo sapiens

<400> SEQUENCE: 127
tatgcgtcag aaaaagcggc t                                           21

<210> SEQ ID NO 128
<211> LENGTH: 21
<212> TYPE: DNA
<213> ORGANISM: Homo sapiens

<400> SEQUENCE: 128
```

-continued

| | |
|---|---|
| gagaagcttc ttctcaccga t | 21 |

<210> SEQ ID NO 129
<211> LENGTH: 21
<212> TYPE: DNA
<213> ORGANISM: Homo sapiens

<400> SEQUENCE: 129

| | |
|---|---|
| ggaaggatga atagggcgtg a | 21 |

<210> SEQ ID NO 130
<211> LENGTH: 21
<212> TYPE: DNA
<213> ORGANISM: Homo sapiens

<400> SEQUENCE: 130

| | |
|---|---|
| cgcctcggcc tcccaaagtg c | 21 |

<210> SEQ ID NO 131
<211> LENGTH: 21
<212> TYPE: DNA
<213> ORGANISM: Homo sapiens

<400> SEQUENCE: 131

| | |
|---|---|
| ccagcacttt gggaggccga g | 21 |

<210> SEQ ID NO 132
<211> LENGTH: 21
<212> TYPE: DNA
<213> ORGANISM: Homo sapiens

<400> SEQUENCE: 132

| | |
|---|---|
| cactttggga ggccgaggcg g | 21 |

<210> SEQ ID NO 133
<211> LENGTH: 21
<212> TYPE: DNA
<213> ORGANISM: Homo sapiens

<400> SEQUENCE: 133

| | |
|---|---|
| gcgggtggat cacttgaggt c | 21 |

<210> SEQ ID NO 134
<211> LENGTH: 21
<212> TYPE: DNA
<213> ORGANISM: Homo sapiens

<400> SEQUENCE: 134

| | |
|---|---|
| ctacttggga ggctgaggca g | 21 |

<210> SEQ ID NO 135
<211> LENGTH: 21
<212> TYPE: DNA
<213> ORGANISM: Homo sapiens

<400> SEQUENCE: 135

| | |
|---|---|
| agataatttc ctctcacttg t | 21 |

<210> SEQ ID NO 136
<211> LENGTH: 21
<212> TYPE: DNA
<213> ORGANISM: Homo sapiens

```
<400> SEQUENCE: 136
cctcagaaaa acaggaattg a                                              21

<210> SEQ ID NO 137
<211> LENGTH: 21
<212> TYPE: DNA
<213> ORGANISM: Homo sapiens

<400> SEQUENCE: 137
aaaaggatgc aatatagttc a                                              21

<210> SEQ ID NO 138
<211> LENGTH: 21
<212> TYPE: DNA
<213> ORGANISM: Homo sapiens

<400> SEQUENCE: 138
cattttaaat ttagtactgt a                                              21

<210> SEQ ID NO 139
<211> LENGTH: 21
<212> TYPE: DNA
<213> ORGANISM: Homo sapiens

<400> SEQUENCE: 139
aggcacatag ctattaaaat g                                              21

<210> SEQ ID NO 140
<211> LENGTH: 21
<212> TYPE: DNA
<213> ORGANISM: Homo sapiens

<400> SEQUENCE: 140
agatcccaaa agataatcta t                                              21

<210> SEQ ID NO 141
<211> LENGTH: 21
<212> TYPE: DNA
<213> ORGANISM: Homo sapiens

<400> SEQUENCE: 141
gcattcatat agattatctt t                                              21

<210> SEQ ID NO 142
<211> LENGTH: 21
<212> TYPE: DNA
<213> ORGANISM: Homo sapiens

<400> SEQUENCE: 142
cgcctcggcc tcccaaagtg c                                              21

<210> SEQ ID NO 143
<211> LENGTH: 21
<212> TYPE: DNA
<213> ORGANISM: Homo sapiens

<400> SEQUENCE: 143 ccagcactt gggaggccga g                                               21

<210> SEQ ID NO 144
<211> LENGTH: 21
<212> TYPE: DNA
<213> ORGANISM: Homo sapiens
```

-continued

<400> SEQUENCE: 144
cactttggga ggccgaggcg g                                              21

<210> SEQ ID NO 145
<211> LENGTH: 21
<212> TYPE: DNA
<213> ORGANISM: Homo sapiens

<400> SEQUENCE: 145
tttttgtatt tttagtggag a                                              21

<210> SEQ ID NO 146
<211> LENGTH: 21
<212> TYPE: DNA
<213> ORGANISM: Homo sapiens

<400> SEQUENCE: 146
gctcactgca agctccgcct c                                              21

<210> SEQ ID NO 147
<211> LENGTH: 21
<212> TYPE: DNA
<213> ORGANISM: Homo sapiens

<400> SEQUENCE: 147
gtcttgctct gtcgcccagg c                                              21

<210> SEQ ID NO 148
<211> LENGTH: 21
<212> TYPE: DNA
<213> ORGANISM: Homo sapiens

<400> SEQUENCE: 148
cacaaggggt gtccccatat t                                              21

<210> SEQ ID NO 149
<211> LENGTH: 21
<212> TYPE: DNA
<213> ORGANISM: Homo sapiens

<400> SEQUENCE: 149
ccttatcttt gaactgcaag c                                              21

<210> SEQ ID NO 150
<211> LENGTH: 21
<212> TYPE: DNA
<213> ORGANISM: Homo sapiens

<400> SEQUENCE: 150
gcagggtttt tagaagatgt g                                              21

<210> SEQ ID NO 151
<211> LENGTH: 21
<212> TYPE: DNA
<213> ORGANISM: Homo sapiens

<400> SEQUENCE: 151
aatcagaatg tctatgttat t                                              21

<210> SEQ ID NO 152
<211> LENGTH: 21
<212> TYPE: DNA

<213> ORGANISM: Homo sapiens

<400> SEQUENCE: 152
cgcctcagcc tcccaaagtg c                                              21

<210> SEQ ID NO 153
<211> LENGTH: 21
<212> TYPE: DNA
<213> ORGANISM: Homo sapiens

<400> SEQUENCE: 153
ccagcacttt gggaggctga g                                              21

<210> SEQ ID NO 154
<211> LENGTH: 21
<212> TYPE: DNA
<213> ORGANISM: Homo sapiens

<400> SEQUENCE: 154
cactttggga ggctgaggcg g                                              21

<210> SEQ ID NO 155
<211> LENGTH: 21
<212> TYPE: DNA
<213> ORGANISM: Homo sapiens

<400> SEQUENCE: 155
tttttgtatt tttagtagag a                                              21

<210> SEQ ID NO 156
<211> LENGTH: 21
<212> TYPE: DNA
<213> ORGANISM: Homo sapiens

<400> SEQUENCE: 156
ccattctcct gcctcagcct c                                              21

<210> SEQ ID NO 157
<211> LENGTH: 21
<212> TYPE: DNA
<213> ORGANISM: Homo sapiens

<400> SEQUENCE: 157
ctactcagga ggctgaggca g                                              21

<210> SEQ ID NO 158
<211> LENGTH: 21
<212> TYPE: DNA
<213> ORGANISM: Homo sapiens

<400> SEQUENCE: 158
gctcactgca agctccgcct c                                              21

<210> SEQ ID NO 159
<211> LENGTH: 21
<212> TYPE: DNA
<213> ORGANISM: Homo sapiens

<400> SEQUENCE: 159
gtgggcagat cacttgagct c                                              21

<210> SEQ ID NO 160
<211> LENGTH: 21

<212> TYPE: DNA
<213> ORGANISM: Homo sapiens

<400> SEQUENCE: 160
cacctcagcc tcccaaagtg c    21

<210> SEQ ID NO 161
<211> LENGTH: 21
<212> TYPE: DNA
<213> ORGANISM: Homo sapiens

<400> SEQUENCE: 161
agcctcccaa agtgctggaa t    21

<210> SEQ ID NO 162
<211> LENGTH: 21
<212> TYPE: DNA
<213> ORGANISM: Homo sapiens

<400> SEQUENCE: 162
ggatttcaac aggatcaccc a    21

<210> SEQ ID NO 163
<211> LENGTH: 21
<212> TYPE: DNA
<213> ORGANISM: Homo sapiens

<400> SEQUENCE: 163
gaactagaat ctggatttca a    21

<210> SEQ ID NO 164
<211> LENGTH: 21
<212> TYPE: DNA
<213> ORGANISM: Homo sapiens

<400> SEQUENCE: 164
cagggatcca gccacggtgc c    21

<210> SEQ ID NO 165
<211> LENGTH: 21
<212> TYPE: DNA
<213> ORGANISM: Homo sapiens

<400> SEQUENCE: 165
tactagaatt ggttatggtg t    21

<210> SEQ ID NO 166
<211> LENGTH: 21
<212> TYPE: DNA
<213> ORGANISM: Homo sapiens

<400> SEQUENCE: 166
actttgcaga tgtgattaaa t    21

<210> SEQ ID NO 167
<211> LENGTH: 21
<212> TYPE: DNA
<213> ORGANISM: Homo sapiens

<400> SEQUENCE: 167
agagccagct gtaaggacac c    21

<210> SEQ ID NO 168

```
<211> LENGTH: 21
<212> TYPE: DNA
<213> ORGANISM: Homo sapiens

<400> SEQUENCE: 168
ggtgaaaccc attttggact t                                              21

<210> SEQ ID NO 169
<211> LENGTH: 21
<212> TYPE: DNA
<213> ORGANISM: Homo sapiens

<400> SEQUENCE: 169
tgtattgtta tcttatagtt c                                              21

<210> SEQ ID NO 170
<211> LENGTH: 21
<212> TYPE: DNA
<213> ORGANISM: Homo sapiens

<400> SEQUENCE: 170
aatactggaa aaagagaag g                                               21

<210> SEQ ID NO 171
<211> LENGTH: 21
<212> TYPE: DNA
<213> ORGANISM: Homo sapiens

<400> SEQUENCE: 171
gaaggaagaa tagaggtctc a                                              21

<210> SEQ ID NO 172
<211> LENGTH: 21
<212> TYPE: DNA
<213> ORGANISM: Homo sapiens

<400> SEQUENCE: 172
gaagagagcc ctcaccagaa a                                              21

<210> SEQ ID NO 173
<211> LENGTH: 21
<212> TYPE: DNA
<213> ORGANISM: Homo sapiens

<400> SEQUENCE: 173
cttacaagaa cacaaatcct a                                              21

<210> SEQ ID NO 174
<211> LENGTH: 21
<212> TYPE: DNA
<213> ORGANISM: Homo sapiens

<400> SEQUENCE: 174
aagaatgggg ctctgatcca a                                              21

<210> SEQ ID NO 175
<211> LENGTH: 21
<212> TYPE: DNA
<213> ORGANISM: Homo sapiens

<400> SEQUENCE: 175
tagtatttta catttacata g                                              21
```

-continued

```
<210> SEQ ID NO 176
<211> LENGTH: 21
<212> TYPE: DNA
<213> ORGANISM: Homo sapiens

<400> SEQUENCE: 176
atggggatat tttatagtaa a                                              21

<210> SEQ ID NO 177
<211> LENGTH: 21
<212> TYPE: DNA
<213> ORGANISM: Homo sapiens

<400> SEQUENCE: 177
gcatctccct aaagccaagg a                                              21

<210> SEQ ID NO 178
<211> LENGTH: 21
<212> TYPE: DNA
<213> ORGANISM: Homo sapiens

<400> SEQUENCE: 178
aggaagagga agccaaattg g                                              21

<210> SEQ ID NO 179
<211> LENGTH: 21
<212> TYPE: DNA
<213> ORGANISM: Homo sapiens

<400> SEQUENCE: 179
ccagcaggca gggatgtcct g                                              21

<210> SEQ ID NO 180
<211> LENGTH: 21
<212> TYPE: DNA
<213> ORGANISM: Homo sapiens

<400> SEQUENCE: 180
tctgcaggac atccctgcct g                                              21

<210> SEQ ID NO 181
<211> LENGTH: 21
<212> TYPE: DNA
<213> ORGANISM: Homo sapiens

<400> SEQUENCE: 181
ctactcggga ggctgaggca g                                              21

<210> SEQ ID NO 182
<211> LENGTH: 21
<212> TYPE: DNA
<213> ORGANISM: Homo sapiens

<400> SEQUENCE: 182
tgattctcct gcctcagcct c                                              21

<210> SEQ ID NO 183
<211> LENGTH: 21
<212> TYPE: DNA
<213> ORGANISM: Homo sapiens

<400> SEQUENCE: 183
gctcactgca agctctgcct c                                              21
```

<210> SEQ ID NO 184
<211> LENGTH: 21
<212> TYPE: DNA
<213> ORGANISM: Homo sapiens

<400> SEQUENCE: 184
ctactcggga ggctgaggca g                                    21

<210> SEQ ID NO 185
<211> LENGTH: 21
<212> TYPE: DNA
<213> ORGANISM: Homo sapiens

<400> SEQUENCE: 185
ccattctcct gcctcagcct c                                    21

<210> SEQ ID NO 186
<211> LENGTH: 21
<212> TYPE: DNA
<213> ORGANISM: Homo sapiens

<400> SEQUENCE: 186
tttttgtatt tttagtagag a                                    21

<210> SEQ ID NO 187
<211> LENGTH: 21
<212> TYPE: DNA
<213> ORGANISM: Homo sapiens

<400> SEQUENCE: 187
tactaaaaat acaaaaatta g                                    21

<210> SEQ ID NO 188
<211> LENGTH: 21
<212> TYPE: DNA
<213> ORGANISM: Homo sapiens

<400> SEQUENCE: 188
cactttggga ggccgaggtg g                                    21

<210> SEQ ID NO 189
<211> LENGTH: 21
<212> TYPE: DNA
<213> ORGANISM: Homo sapiens

<400> SEQUENCE: 189
cacctcggcc tcccaaagtg c                                    21

<210> SEQ ID NO 190
<211> LENGTH: 21
<212> TYPE: DNA
<213> ORGANISM: Homo sapiens

<400> SEQUENCE: 190
aacctaaagt gtaaaatatt g                                    21

<210> SEQ ID NO 191
<211> LENGTH: 21
<212> TYPE: DNA
<213> ORGANISM: Homo sapiens

<400> SEQUENCE: 191
cactaagcca atgccaggtt t                                    21

```
<210> SEQ ID NO 192
<211> LENGTH: 21
<212> TYPE: DNA
<213> ORGANISM: Homo sapiens

<400> SEQUENCE: 192
gctcactgca acctctgcct c                                              21

<210> SEQ ID NO 193
<211> LENGTH: 21
<212> TYPE: DNA
<213> ORGANISM: Homo sapiens

<400> SEQUENCE: 193
gtgggcagga gttgaaatga g                                              21

<210> SEQ ID NO 194
<211> LENGTH: 21
<212> TYPE: DNA
<213> ORGANISM: Homo sapiens

<400> SEQUENCE: 194
ggaaacgcag ctgagctctg a                                              21

<210> SEQ ID NO 195
<211> LENGTH: 21
<212> TYPE: DNA
<213> ORGANISM: Homo sapiens

<400> SEQUENCE: 195
ccacaaggga gcaagtggtt g                                              21

<210> SEQ ID NO 196
<211> LENGTH: 21
<212> TYPE: DNA
<213> ORGANISM: Homo sapiens

<400> SEQUENCE: 196
aaacaaaggc aagttaatca g                                              21

<210> SEQ ID NO 197
<211> LENGTH: 21
<212> TYPE: DNA
<213> ORGANISM: Homo sapiens

<400> SEQUENCE: 197
cagcagggag aatggggatc a                                              21

<210> SEQ ID NO 198
<211> LENGTH: 21
<212> TYPE: DNA
<213> ORGANISM: Homo sapiens

<400> SEQUENCE: 198
ggcttggaaa acaggaacca a                                              21

<210> SEQ ID NO 199
<211> LENGTH: 21
<212> TYPE: DNA
<213> ORGANISM: Homo sapiens

<400> SEQUENCE: 199
```
acatttgaag gtcagacagc t                                         21

<210> SEQ ID NO 200
<211> LENGTH: 21
<212> TYPE: DNA
<213> ORGANISM: Homo sapiens

<400> SEQUENCE: 200
ggacaggaag agctccacga a                                         21

<210> SEQ ID NO 201
<211> LENGTH: 21
<212> TYPE: DNA
<213> ORGANISM: Homo sapiens

<400> SEQUENCE: 201
ggtcagttta ctccccatgg g                                         21

<210> SEQ ID NO 202
<211> LENGTH: 21
<212> TYPE: DNA
<213> ORGANISM: Homo sapiens

<400> SEQUENCE: 202
tctcactaat tgctccatgc a                                         21

<210> SEQ ID NO 203
<211> LENGTH: 21
<212> TYPE: DNA
<213> ORGANISM: Homo sapiens

<400> SEQUENCE: 203
gtcttgctct gtcacccagg c                                         21

<210> SEQ ID NO 204
<211> LENGTH: 21
<212> TYPE: DNA
<213> ORGANISM: Homo sapiens

<400> SEQUENCE: 204
ctacttggga ggctgaggca g                                         21

<210> SEQ ID NO 205
<211> LENGTH: 21
<212> TYPE: DNA
<213> ORGANISM: Homo sapiens

<400> SEQUENCE: 205
tttttgtatt tttagtagag a                                         21

<210> SEQ ID NO 206
<211> LENGTH: 21
<212> TYPE: DNA
<213> ORGANISM: Homo sapiens

<400> SEQUENCE: 206
cactttggga ggctgaggca g                                         21

<210> SEQ ID NO 207
<211> LENGTH: 21
<212> TYPE: DNA
<213> ORGANISM: Homo sapiens

<400> SEQUENCE: 207

```
gaaacatgac ttagtgacta a                                              21

<210> SEQ ID NO 208
<211> LENGTH: 21
<212> TYPE: DNA
<213> ORGANISM: Homo sapiens

<400> SEQUENCE: 208
cagccacaat ctccatctgt c                                              21

<210> SEQ ID NO 209
<211> LENGTH: 21
<212> TYPE: DNA
<213> ORGANISM: Homo sapiens

<400> SEQUENCE: 209
gctcactgca acctctgctt c                                              21

<210> SEQ ID NO 210
<211> LENGTH: 21
<212> TYPE: DNA
<213> ORGANISM: Homo sapiens

<400> SEQUENCE: 210
ctacttggga ggctgaggca g                                              21

<210> SEQ ID NO 211
<211> LENGTH: 21
<212> TYPE: DNA
<213> ORGANISM: Homo sapiens

<400> SEQUENCE: 211
tgcctcagcc tcccaagtag c                                              21

<210> SEQ ID NO 212
<211> LENGTH: 21
<212> TYPE: DNA
<213> ORGANISM: Homo sapiens

<400> SEQUENCE: 212
caagcaggtt agccagcctc t                                              21

<210> SEQ ID NO 213
<211> LENGTH: 21
<212> TYPE: DNA
<213> ORGANISM: Homo sapiens

<400> SEQUENCE: 213
cacagaggct ggctaacctg c                                              21

<210> SEQ ID NO 214
<211> LENGTH: 21
<212> TYPE: DNA
<213> ORGANISM: Homo sapiens

<400> SEQUENCE: 214
gtcaaaggaa gctgatagat c                                              21

<210> SEQ ID NO 215
<211> LENGTH: 21
<212> TYPE: DNA
<213> ORGANISM: Homo sapiens
```

```
<400> SEQUENCE: 215
attagaaatt taaaacaaaa t                                              21

<210> SEQ ID NO 216
<211> LENGTH: 21
<212> TYPE: DNA
<213> ORGANISM: Homo sapiens

<400> SEQUENCE: 216
aatcaagatg aatccaggca g                                              21

<210> SEQ ID NO 217
<211> LENGTH: 21
<212> TYPE: DNA
<213> ORGANISM: Homo sapiens

<400> SEQUENCE: 217
aagcttatta ttggagcagc t                                              21

<210> SEQ ID NO 218
<211> LENGTH: 21
<212> TYPE: DNA
<213> ORGANISM: Homo sapiens

<400> SEQUENCE: 218
aaagaacctc cccatcctag c                                              21

<210> SEQ ID NO 219
<211> LENGTH: 21
<212> TYPE: DNA
<213> ORGANISM: Homo sapiens

<400> SEQUENCE: 219
gtaaagttct cattccacac c                                              21

<210> SEQ ID NO 220
<211> LENGTH: 21
<212> TYPE: DNA
<213> ORGANISM: Homo sapiens

<400> SEQUENCE: 220
aaggttaata tgagaatctg t                                              21

<210> SEQ ID NO 221
<211> LENGTH: 21
<212> TYPE: DNA
<213> ORGANISM: Homo sapiens

<400> SEQUENCE: 221
tctttaggtc ctagatacct t                                              21
```